United States Patent
Yaghi et al.

(10) Patent No.: US 11,059,838 B2
(45) Date of Patent: Jul. 13, 2021

(54) ATMOSPHERIC MOISTURE HARVESTER

(71) Applicant: The Regents of the University of California, Oakland, CA (US)

(72) Inventors: Omar M. Yaghi, Berkeley, CA (US); Farhad Fathieh, Berkeley, CA (US); Markus J. Kalmutzki, Berkeley, CA (US); Eugene A. Kapustin, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 16/936,448

(22) Filed: Jul. 23, 2020

(65) Prior Publication Data

US 2020/0361965 A1   Nov. 19, 2020

Related U.S. Application Data

(63) Continuation of application No. 16/270,666, filed on Feb. 8, 2019, now Pat. No. 10,766,911, which is a continuation of application No. PCT/US2019/016565, filed on Feb. 5, 2019.

(60) Provisional application No. 62/626,675, filed on Feb. 5, 2018.

(51) Int. Cl.
| | |
|---|---|
| *C07F 5/06* | (2006.01) |
| *B01D 53/04* | (2006.01) |
| *B01J 20/22* | (2006.01) |
| *G01N 23/2202* | (2018.01) |

(52) U.S. Cl.
CPC .............. *C07F 5/069* (2013.01); *B01D 53/04* (2013.01); *B01J 20/226* (2013.01); *G01N 23/2202* (2013.01); *C07B 2200/07* (2013.01); *C07B 2200/13* (2013.01); *Y02A 20/00* (2018.01); *Y02A 20/211* (2018.01)

(58) Field of Classification Search
CPC ....... C07F 5/06; B01D 53/04; G01N 23/2202; B01J 20/22; B01J 20/226; Y02A 20/00; Y02A 20/211
See application file for complete search history.

(56) References Cited

U.S. PATENT DOCUMENTS

| | | | |
|---|---|---|---|
| 7,008,515 B1 * | 3/2006 | Husson, Jr. ............... | C02F 1/14 202/83 |
| 2013/0192281 A1 * | 8/2013 | Nam .................... | B60H 1/3201 62/101 |

OTHER PUBLICATIONS

Kim et al. (Water harvesting from air with metal-organic frameworks powered by natural sunlight, 2017, Science, 356, 430-434) (Year: 2017).*

* cited by examiner

*Primary Examiner* — Youngsul Jeong
(74) *Attorney, Agent, or Firm* — Richard Aron Osman

(57) ABSTRACT

Provided herein are atmospheric moisture harvester systems, as well as methods using such systems, for capturing water from surrounding air. The systems and methods use adsorbents to adsorb water from the air. For example, the adsorbents may be metal-organic frameworks. The systems and methods desorb this water in the form of water vapor, and the water vapor is condensed into liquid water and collected. The liquid water is suitable for use as drinking water.

20 Claims, 84 Drawing Sheets

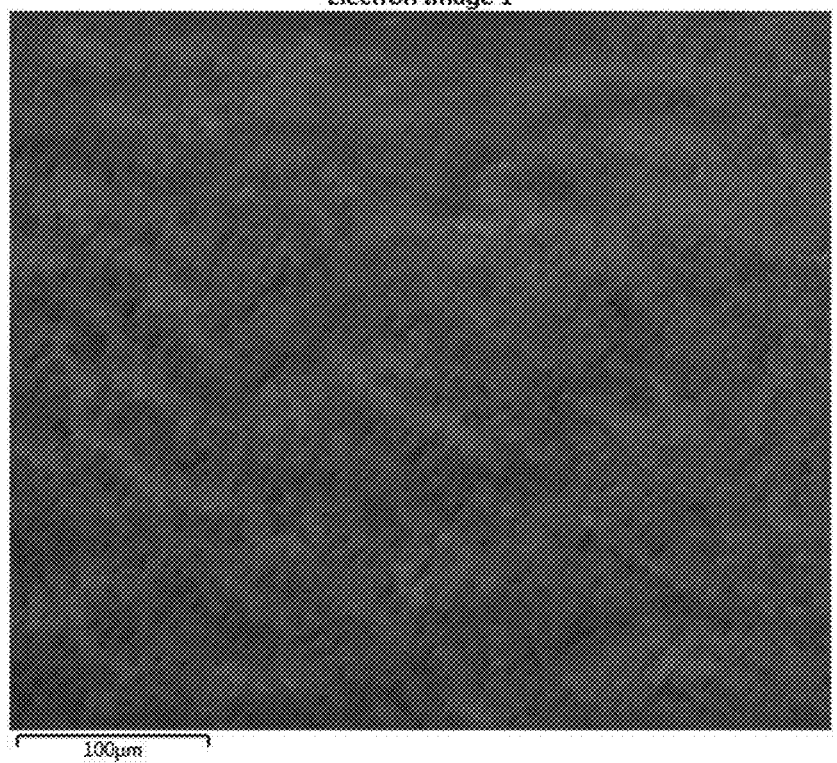
FIG. 3A
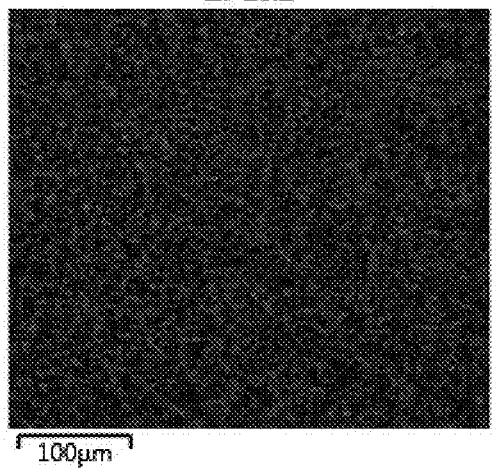 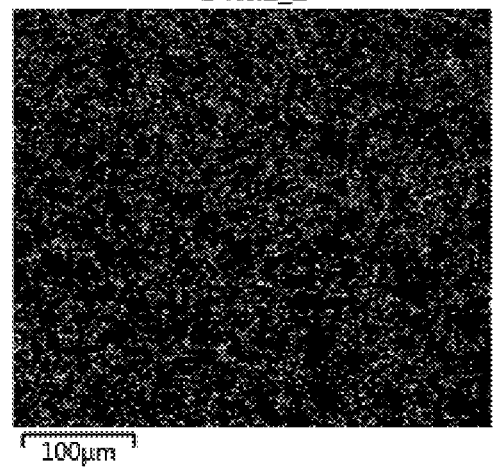
FIG. 3B  FIG. 3C

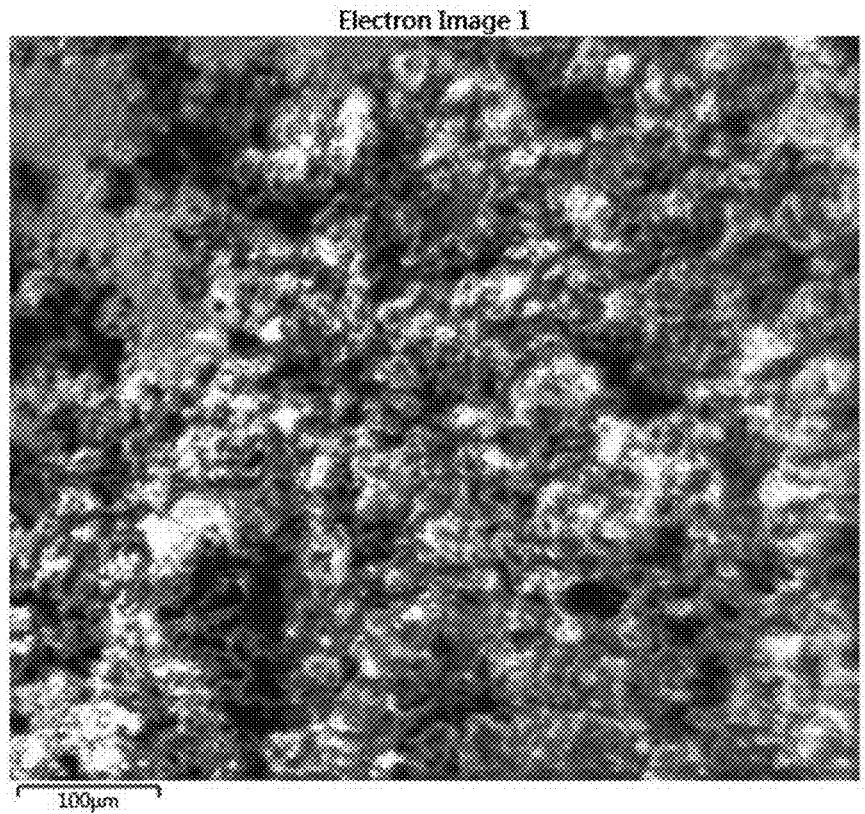
*FIG. 12A*
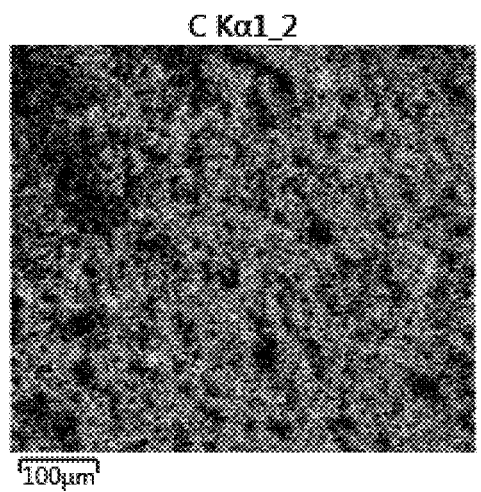 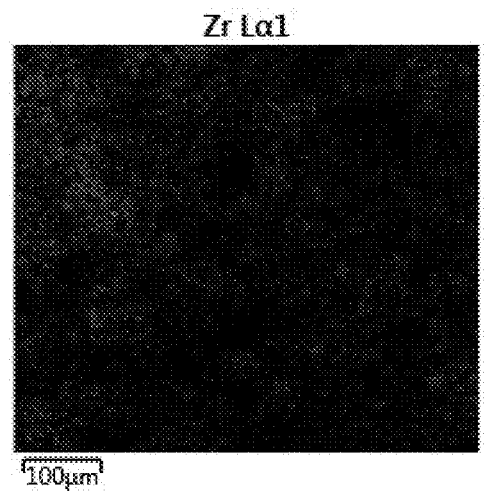
*FIG. 12B*  *FIG. 12C*

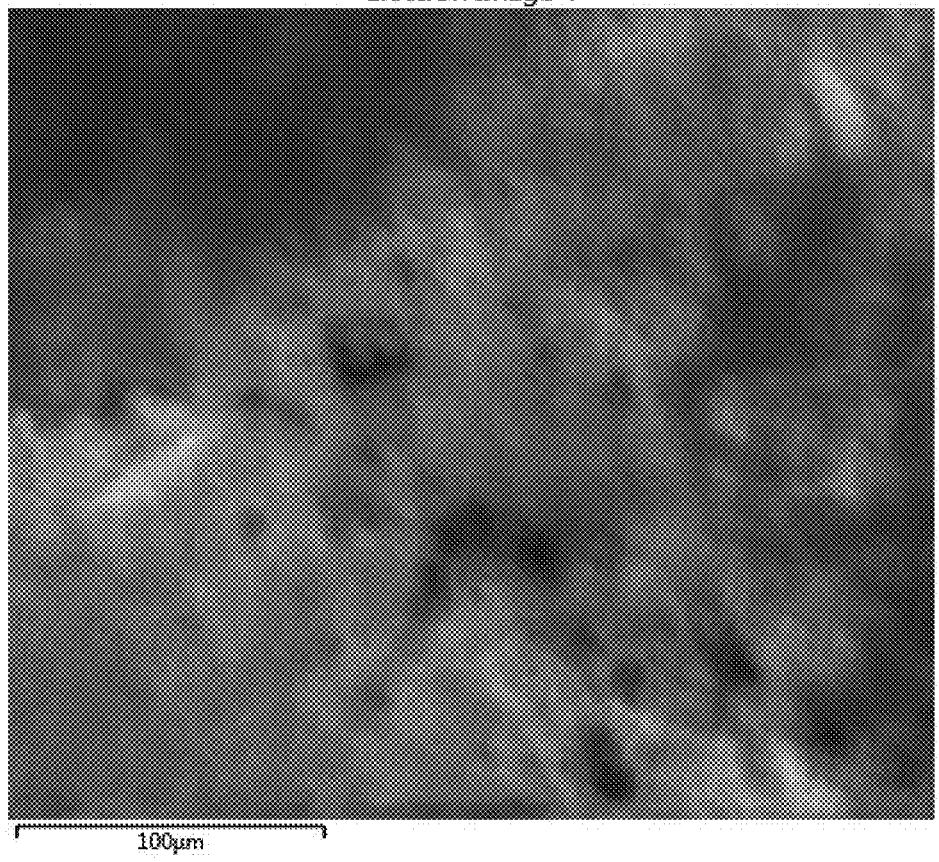
FIG. 19A
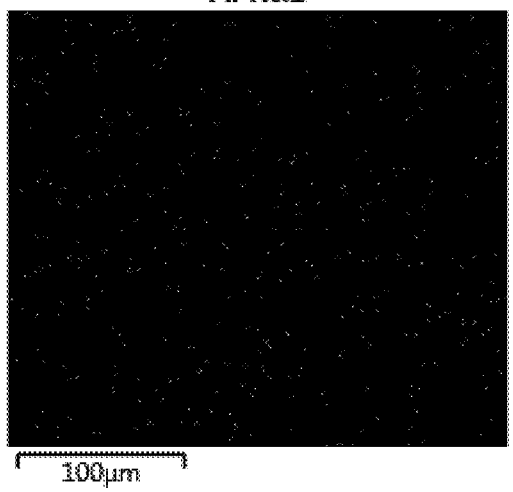 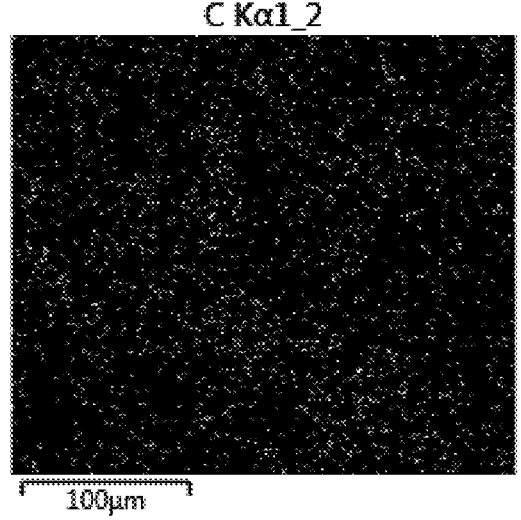
FIG. 19B  FIG. 19C

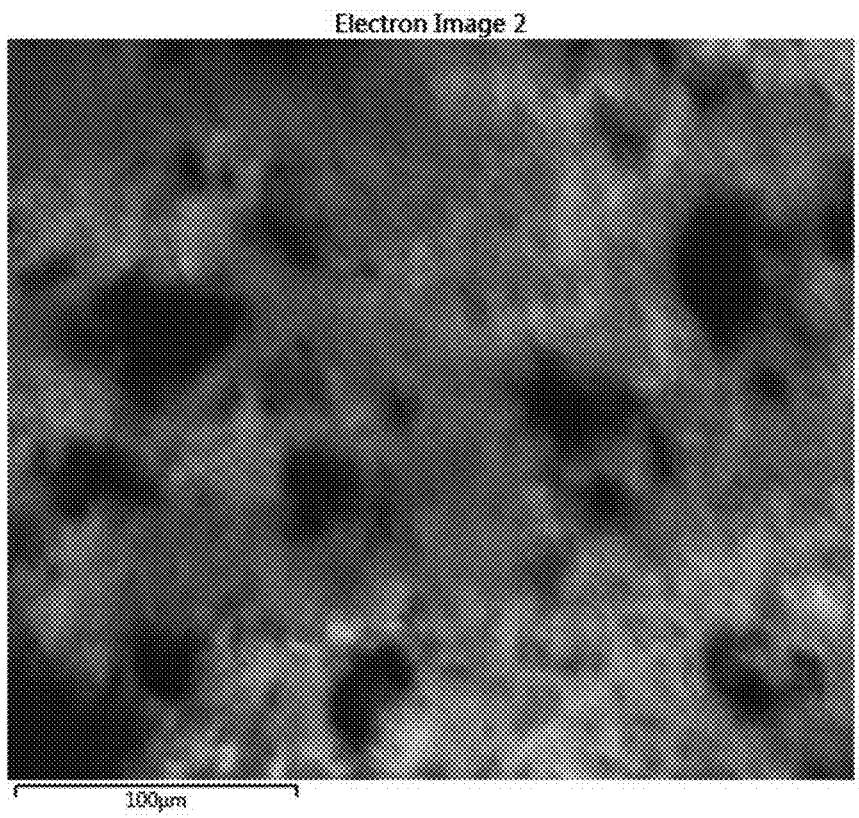
*FIG. 29A*
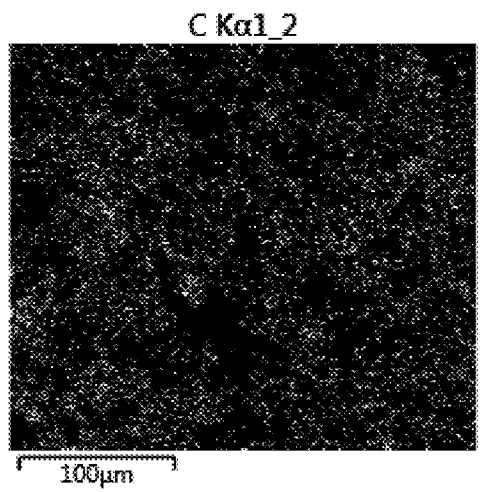 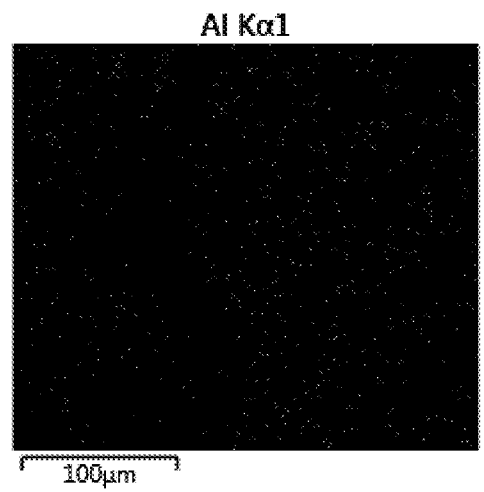
*FIG. 29B*   *FIG. 29C*

*FIG. 52A*
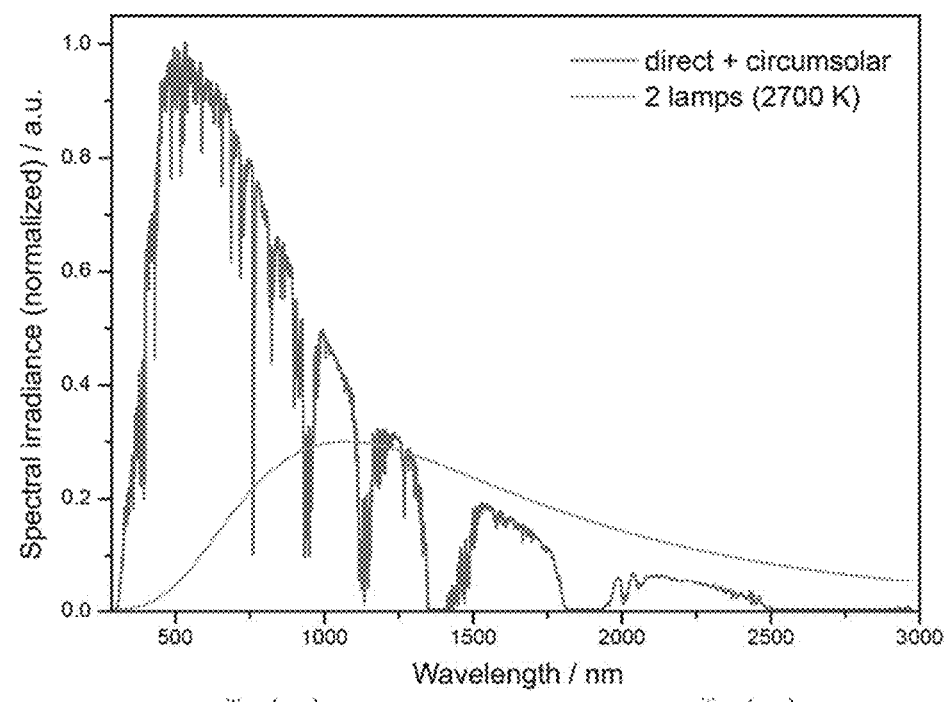
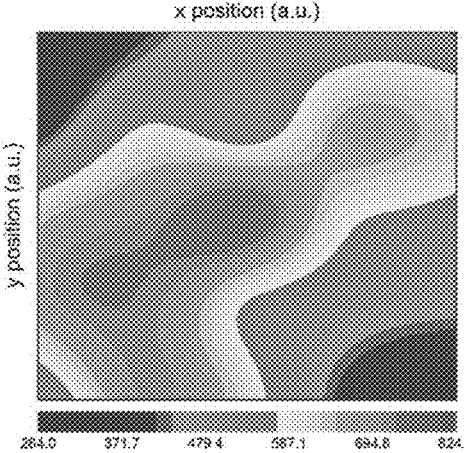
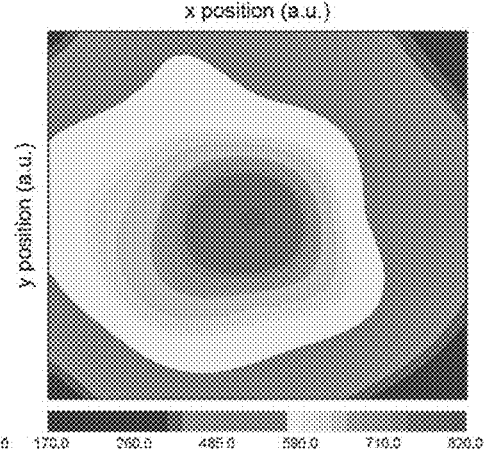
*FIG. 52B*  *FIG. 52C*

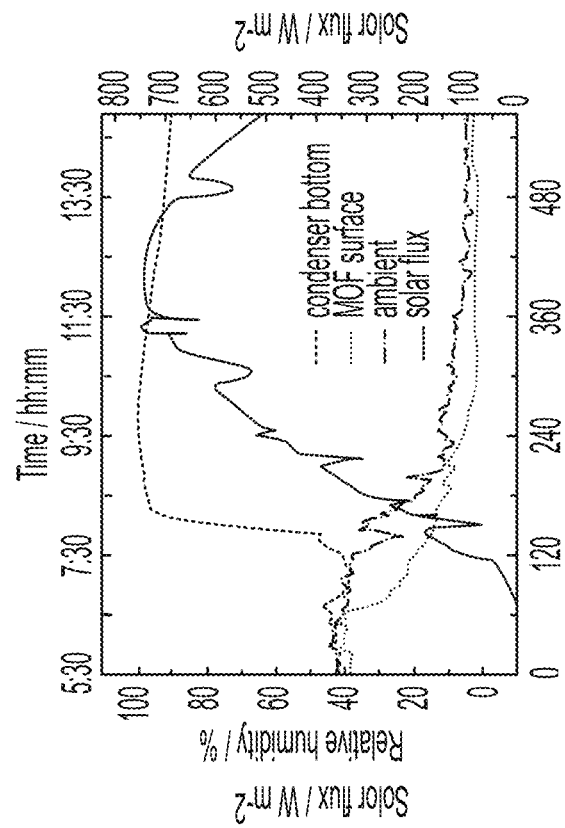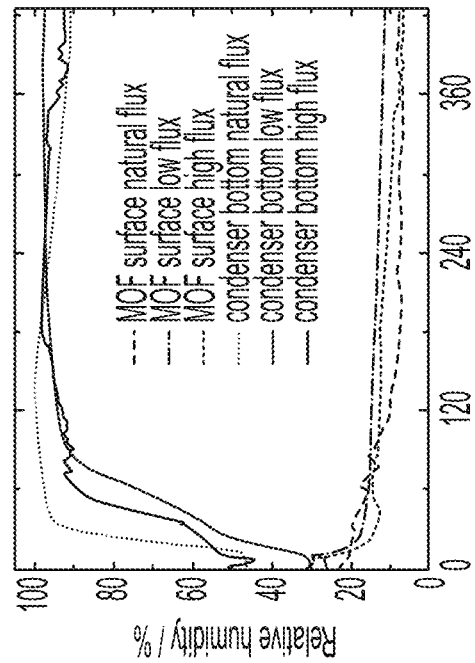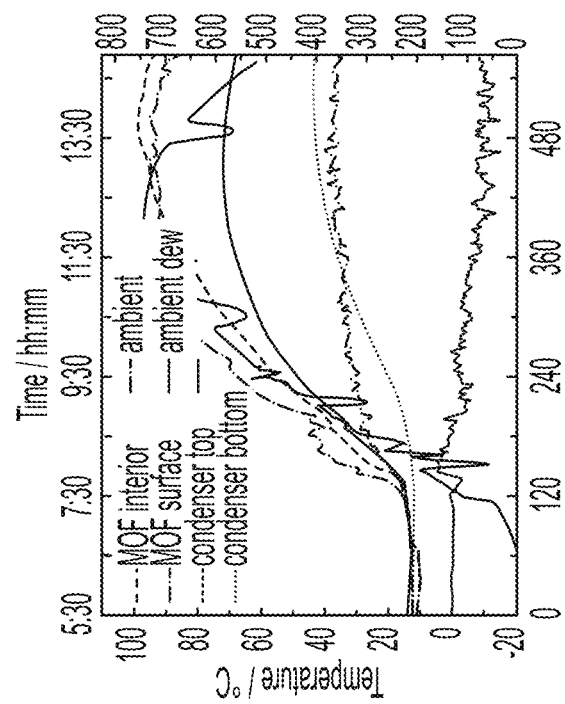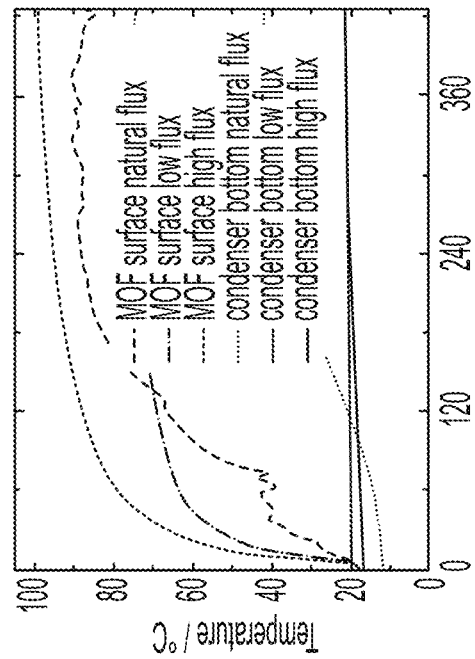
FIG. 97C
FIG. 97D
FIG. 97E
FIG. 97F

ATMOSPHERIC MOISTURE HARVESTER

CROSS-REFERENCE(S) TO RELATED APPLICATION(S)

This application claims priority to U.S. Provisional Patent Application No. 62/626,675, filed Feb. 5, 2018, which is incorporated herein by reference in its entirety.

FIELD

The present disclosure relates generally to water harvesting, and more specifically to systems and methods for harvesting water from surrounding air.

BACKGROUND

The global water demand remains growing and, by 2030 is projected to result in the shortage of one-fourth of current usage of fresh water. Enabling access to fresh potable water in desert and arid regions is a critical challenge and tightly coupled to social and economic development. Water scarcity is difficult to address in areas that are landlocked and have limited infrastructure, such that mature water purification technologies, i.e., reverse osmosis and multi-stage flash, is challenging to implement. Fortunately, in such regions, year round solar energy is abundant, which can be harnessed for grid-independent distributed production of drinking water.

Large portion of water on Earth cannot be accessed either due to high level of salt or because it is locked in ice form. Most of fresh water is harvested from lakes and rivers which is not necessarily available for most arid regions of the world. The moisture in the atmosphere is a natural resource, equivalent to 13,000 trillion liters or 10% of all water from lakes and rivers, and it is yet to be harvested. Currently, there is an interest in harvesting atmospheric moisture via fog capture systems or dewing, but these processes require either the presence of high moisture partial pressure (relative humidity) or a large energy input.

Atmospheric water generators based on porous adsorbents can take advantage of abundant solar energy and harvest water from thin air. Usually, atmospheric water generators operation requires to cool down large volumes of air below the dew point temperature, and the amount of heat consumed for dewing drastically increases as the relative humidity or ambient temperature decreases. Moreover, for the day conditions of dry regions (10% RH, 35° C.) the dew point can be subzero, requiring a large amount of energy to freeze and collect water out of thin air. This makes the deployment of such systems in arid, desert regions of the world unfeasible.

An atmospheric moisture harvester is a promising alternative to harvest and deliver water to remote households in arid, hot regions. The atmospheric moisture harvester operates based on an active chemical compound, which can capture moist air and release the captured moisture with the minimal input of energy. During the night time, the active chemical compound captures moisture from the surrounding air. During the daytime, it release the captured moisture due to solar radiation exposure. The released moisture is condensed at a condenser of the atmospheric moisture harvested with no or low energy input. The condensed water is further collected by a water collection system. By selecting the active chemical compound characteristics, solar-thermal driven atmospheric moisture harvesting process is viable and efficient even in low RH conditions.

BRIEF SUMMARY

In some aspects, provided are methods, devices and systems comprising a water capture material to produce water from atmospheric moist air for drinking, municipal and agriculture purposes. Embodiments include mobile water harvesting devices for personal use, off grid water harvesting devices for homes and municipalities, agriculture and food, and space/off-Earth based applications such as implementations on Moon and Mars.

In some embodiments, the water capture material comprises an active chemical compound, such as a metal-oxide framework (MOF). In some variations, the metal sites of the MOF are typically ions of transition metals, alkaline earth metals, or lanthanides, and the organic linkers are typically multidentate molecules with N- or O-donor atoms, such as pyridyl, polyamines, carboxylates, etc. A wide variety of MOFs are known in the art, including aluminum-based MOFs (e.g. US2012/0055880; U.S. Pat. Nos. 8,648,002; 9,102,691; Norbert Stock, Metal-Organic Frameworks: Aluminum-Based Frameworks, pub online 11 Dec. 2014, DOI: 10.1002/9781119951438.eibc219) and suitable MOFs are readily selected based on the disclosed criteria.

In some aspects, provided is an atmospheric moisture harvester system and/or device which captures, releases, and condenses moisture from air, and collects liquid water. In some embodiments, the system comprises a moisture sorption unit, and a moisture harvesting enclosure. The moisture sorption unit contains the water capture material, and is positioned inside the moisture harvesting enclosure. In some variations, the moisture harvesting enclosure condenses water vapor released from the water capture material to produce liquid water. In other variations, the system further comprises a condenser, which is used to condense the water vapor released from the water capture material to produce liquid water; and the moisture harvesting enclosure helps to hold the released water vapor upon desorption.

In some aspects, the system comprises: a moisture sorption unit with an active chemical compound operative to capture and release atmospheric moisture using solar energy; a moisture harvesting enclosure with airflow passages configured to direct the airflow circulation between the moisture sorption unit and the condenser; a condenser operative to generate liquid water from moisture with or without any energy input; and a water collecting system operative to collect liquid water from the condenser.

In another aspect, provided is a moisture sorption unit comprising an active chemical compound pan configured to perform 1, 2, 3, 4 or 5 functions: hold the active chemical compound; enhance the heat transfer from solar flux exposure to the active chemical compound; increase the contact surface of the active chemical compound for the moisture capture and release; provide a space for mass and heat transfer for the active chemical compound; and provide confinement for variety of different active chemical compound packings.

In another aspect, provided is a moisture sorption unit comprising one or more support walls configured to: provide structural support for the active chemical compound pan; and/or prevent solar infra-red exposure of a thermal insulation compartment.

In another aspect, provided is a moisture sorption unit comprising a thermal insulation compartment configured to perform 1, 2, 3 or 4 functions: enhance the structural stability for the active chemical compound pan and the support walls; insulate the active chemical compound pan from the support walls; prevent the natural convection air circulation within the moisture sorption unit and eliminates the convective heat transfer; and prevent the conductive heat transfer from the active chemical compound pan to the support walls, bottom wall, and the condenser.

In another aspect, provided is a moisture sorption unit comprising a bottom support plate configured to provide a rigid base for the thermal insulation compartment and the support walls; and/or in combination with the support walls and the active chemical compound pan eliminate the moisture transfer to the thermal insulator.

In yet another aspect, provided is an atmospheric moisture harvester system comprising spacers configured to perform 1, 2, 3 or 4 functions: spatially separate the moisture sorption unit from the condenser; thermally insulate the moisture sorption unit from the condenser; align and secure the position of the moisture sorption unit within the moisture harvesting enclosure; and adjust the spacing between the moisture sorption unit and the condenser.

In yet another aspect, provided is a moisture harvesting enclosure comprising one or more side walls configured to perform 1, 2, 3 or 4 functions: provides the structural support for the moisture harvesting enclosure; prevent solar infra-red exposure the moisture sorption unit and the condenser; in combination with the moisture sorption unit create airflow passages for pre-cooling and air circulation; and support for the installation of side-insulations.

In another aspect, provided is a moisture harvesting enclosure comprising one or more pre-cooler airflow passages configured to perform 1, 2 or 3 functions: cool the moist air flowing from the active chemical compound pan to the condenser by rejecting heat to the surrounding; facilitate the buoyant flow between the active chemical compound pan and the condenser; and modulate the temperature gradient between the active chemical compound pan and the condenser.

In other aspects, provided is a moisture harvesting enclosure comprising bottom plate configured to perform 1, 2, 3, 4 or 5 functions: provide a rigid base for the side walls; provide mass transfer from and to the surrounding; provide a support base for the installation of a condenser; provide a base for mounting the moisture sorption unit through the spacers; and provide a support base to mount the moisture sorption unit onto a portable stand frame.

In yet other aspects, provided is a moisture harvesting enclosure comprising a condenser configured to perform 1, 2, 3 or 4 functions: condense moisture released by the active chemical compound; spatially separated from all components of the moisture sorption unit; assist the moisture release from the active chemical compound by dehumidification of the moisture harvesting enclosure; and maintain the mass transfer by diffusion within the moisture harvesting enclosure.

In one aspect, provided is a subject device, system or unit or enclosure wherein the active chemical compound comprises a metal-oxide framework (MOF), wherein the MOF metal is selected from zirconium, nickel, iron, copper, manganese and aluminum, and particularly an aluminium-based metal-organic framework, such as MOF-303.

In some aspects, provided is an atmospheric moisture harvester system that can capture water from surrounding air. In some embodiments, the system comprises a moisture sorption unit that contains the water capture material; and a moisture harvesting enclosure. In some variations, the moisture sorption unit comprises: an insulation compartment containing insulation material, and a tray positioned at the top of the moisture sorption unit, above the insulation compartment. The tray contains water capture material, which adsorbs moisture from surrounding air during an adsorption phase, and desorbs water vapor during a desorption phase. In one variation, the bottom surface of the tray in contact with the water capture material is covered with or made from solar absorptive material. In another variation, the side surfaces of the moisture sorption unit are covered with or made from solar reflective material. In certain variations, the moisture sorption unit is positioned inside the moisture harvesting enclosure, and space exists between the moisture sorption unit and the moisture harvesting enclosure. In some variations, the moisture harvesting enclosure is transparent. In other variations, the moisture harvesting enclosure has a lid. The lid, when opened, exposes the water capture material to cold humid surrounding air to adsorb moisture during the adsorption phase. The lid, when closed, heats the water capture material using solar radiation to release water vapor during the desorption phase. In some variations, the moisture harvesting enclosure has one or more side walls configured to condense at least a portion of the released water vapor into liquid water during a condensation phase. In another embodiment that may be combined with any of the foregoing, the system may be buried in the ground, and one or more side walls of the moisture harvesting enclosure are in contact with soil in the ground, and provide surfaces for heat transfer with the soil.

In some embodiments of the foregoing aspect, the system comprises a moisture sorption unit that contains the water capture material; a moisture harvesting enclosure; and a condenser. In such embodiment, the moisture harvesting enclosure is configured to hold the released water vapor upon desorption. In some variation, the condenser positioned at the bottom of the moisture harvesting enclosure, separated from the moisture sorption unit. The condenser is configured to condense at least a portion of the released water vapor into liquid water during a condensation phase. In some variations of the foregoing, the system is positioned on an incline to maximize exposure to direct sunlight. In other variations of the foregoing, the system further comprises a water collecting unit configured to collect the liquid water.

In other aspects, provided is a method of harvesting water from surrounding air using any of the atmospheric moisture harvester systems described herein. In some embodiments, the method comprises: opening the lid of the moisture harvesting enclosure during night time, thereby allowing the water capture material to adsorb moisture from surrounding air; and closing the lid of the moisture harvesting enclosure during the following day time. This heats the water capture material using solar radiation, releases water vapor from the heated water capture material, and condenses the released water vapor on one or more side walls of the moisture harvesting enclosure, or using a condenser, to produce liquid water.

In another aspect, the method comprises: saturating water capture material with moisture from cold humid surrounding air during night time by adsorption. The water capture material is contained in a tray positioned at the top of a moisture sorption unit, above an insulation compartment in the moisture sorption unit, and the moisture sorption unit is positioned inside a moisture harvesting enclosure with a lid, wherein the lid is opened during the night time. In some embodiments, the method further comprises: heating the water capture material using solar radiation during the following day time and releasing water vapor from the water capture material, wherein the lid of the moisture harvesting enclosure is closed during the day time; and condensing the released water vapor on one or more side walls of the moisture harvesting enclosure, or using a condenser, to produce liquid water. In some variations of the foregoing aspect, the method further comprises: collecting the liquid water.

In some variations of the foregoing aspects, the atmospheric moisture harvester system is a completely passive system.

The invention encompasses all combination of the particular embodiments recited herein, as if each combination had been laboriously recited.

It is understood that the examples and embodiments described herein are for illustrative purposes only and that various modifications or changes in light thereof will be suggested to persons skilled in the art and are to be included within the spirit and purview of this application and scope of the appended claims.

DESCRIPTION OF THE FIGURES

The present application can be understood by reference to the following description taken in conjunction with the accompanying figures.

FIG. 3A depicts a SEM image of activated MOF-801; FIGS. 3B and 3C depict carbon and Zirconium EDS images, respectively of the MOF-801.

FIG. 12A depicts a SEM image of activated MOF-801/G. FIGS. 12B and 12C depict Carbon and Zirconium EDS images, respectively, of the MOF-801/G.

FIG. 19A depicts a SEM image of activated MOF-303. FIGS. 19C and 19B depict Carbon and Aluminum EDS images, respectively, of the activated MOF-303.

FIG. 29A depicts a SEM image of activated MOF-303/G. FIGS. 29B and 29C depict Carbon and Aluminum EDS images, respectively, of the MOF-303/G.

FIG. 52A depicts a comparison of the solar irradiance and the irradiance for a two-lamp configuration with a color temperature of 2700 K. FIG. 52B depicts a contour diagram of the distribution of the irradiance measured on the cover of the case for a two-lamp configuration in one orientation using 25 data points (lamps located at the bottom left and top right). FIG. 52C depicts a contour diagram of the distribution of the irradiance on the cover of the case for a two-lamp configuration and two different orientations with lamps located at the bottom left and top right, or on the top left and bottom right.

In FIG. 95A, the WHC is composed of the capture and collecting cycles. In FIG. 95B, the capture cycle is defined by the sorption isotherm of the MOF and several prerequisites for high-performance water harvesting materials can be established therefrom; a Type IV or V isotherm with minimal or no hysteresis, a steep uptake below 25% RH, a high capture capacity $\omega_{cap}$ below 35% RH, and a significant shift of the inflection point for isotherms recorded at different temperatures are ideal. In FIG. 95C, the collecting cycle is defined by the psychrometric chart. During the release of captured water, the air is humidified and heated (ii→iii). Natural convection transports the hot humid air to the condenser, cooling it below its dew point (iii→iv). Concomitant condensation yields liquid water and dehumidified air. The collecting cycle can continue until the humidity ratio is too low for the dew point to be reached.

In FIG. 96A, water sorption isotherms (adsorption filled symbols, desorption open symbols) of MOF-801 and MOF-801/G at 15° C., 25° C., and 85° C. In comparison to previously reported isotherms for MOF-801, a shift of the inflection point to higher relative pressures, a lower maximum capacity, and hysteresis were observed. These findings are related to a high degree of single crystallinity of the material (19). Blending MOF-801 with graphite led to a decrease of the gravimetric capacity corresponding to the added weight, while the general shape of the isotherm was fully retained. In FIG. 96B, a schematic of the water harvester that includes a water sorption unit and a case. During the night, the cover of the case is opened, allowing the MOF to be saturated with moisture from desert air. During the day, the case is sealed to create a closed system. Humid hot air flows from the MOF to the condenser and is cooled down by heat rejection to the surroundings. When the dew point is reached, condensation occurs, and liquid water collects at the bottom of the case.

FIGS. 97A-97F generally relate to water production and temperature, relative humidity, and solar flux profiles. FIGS. 97A-97B are photographs of the condenser showing (i) the formation of droplets (ii) flowing to make puddles (inset: water produced per day-and-night desert cycle). FIGS. 97C-97D depict humidity and temperature profiles acquired during testing in the desert on 22 Oct. 2017 in Scottsdale, Ariz., United States. Temperature and humidity sensors were placed at different positions within the water harvester; at the bottom and top of the condenser and at the surface of and in the MOF powder. The solar flux was recorded using a pyranometer mounted on the reflector. Ambient temperature and relative humidity were monitored in close proximity to the water harvester and the ambient dew temperature was calculated from these data. FIGS. 97E-97F depict a comparison of humidity and temperature profiles acquired under natural solar flux during testing in the desert and under laboratory conditions using low (558 W m$^{-2}$) and high (792 W m$^{-2}$) fluxes. The origin represents when the complete surface of MOF-801/G was exposed to artificial or natural solar radiation, for the laboratory experiments and the desert test, respectively.

FIG. 98A depicts the crystal structure of MOF-303 built from rod-like Al(OH)(—COO)$_2$ SBUs linked by HPDC linkers into an extended framework structure (xhh topology) with a 1D pore system. FIG. 98B depicts water sorption isotherms for MOF-303/G at 15° C., 25° C. and 85° C. FIG. 98C depicts a comparison of parameters defining the efficiency and productivity of the water harvester.

DETAILED DESCRIPTION

Figure 1:
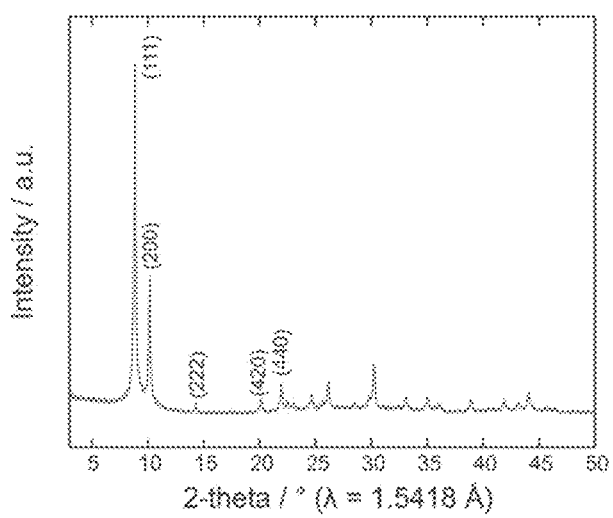
FIG. 1 depicts a PXRD pattern of activated MOF-801.
Figure 2:
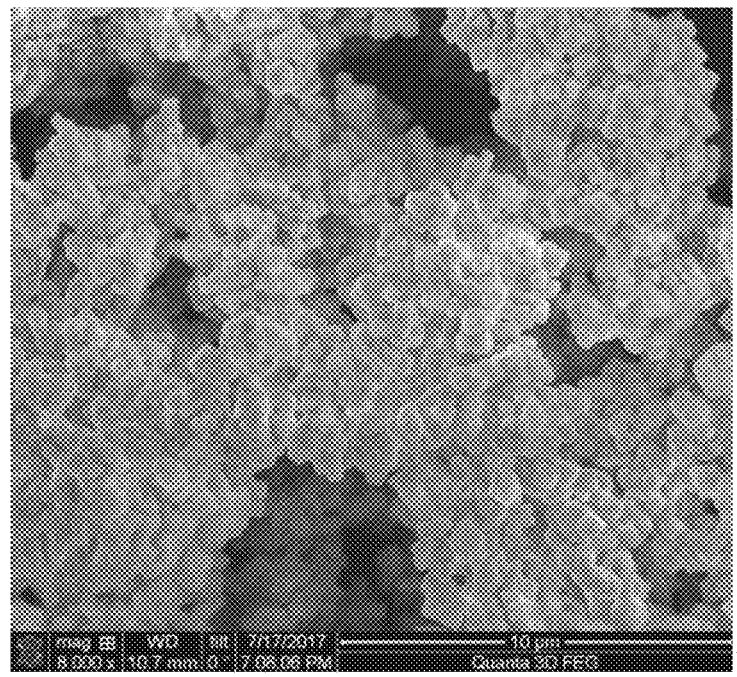
FIG. 2 depicts a SEM image of activated MOF-801.
Figure 4:
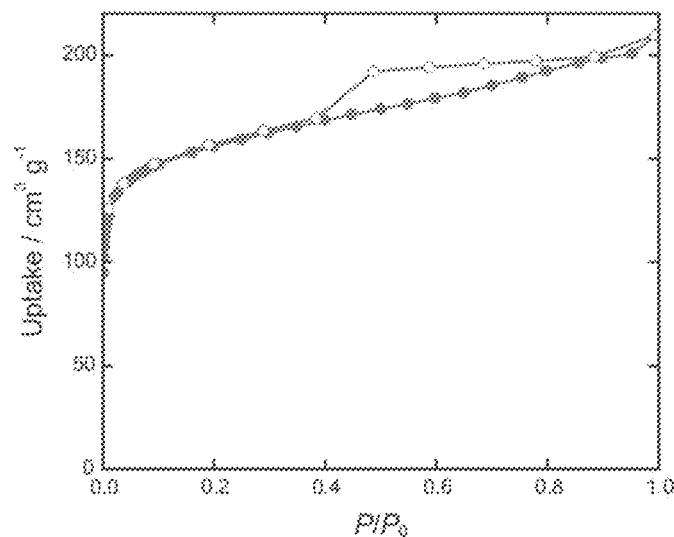
FIG. 4 depicts a $N_2$ isotherm of activated MOF-801 recorded at 77 K. The BET surface area is 582 $m^2 g^{-1}$.
Figure 5:
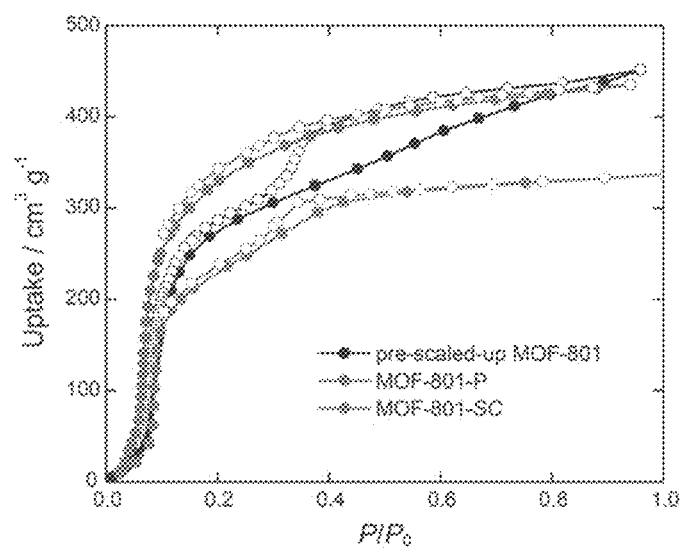
FIG. 5 depicts water sorption isotherms of pre-scaled-up MOF-801 sample, and MOF-801-P, MOF-801-SC.
Figure 6:
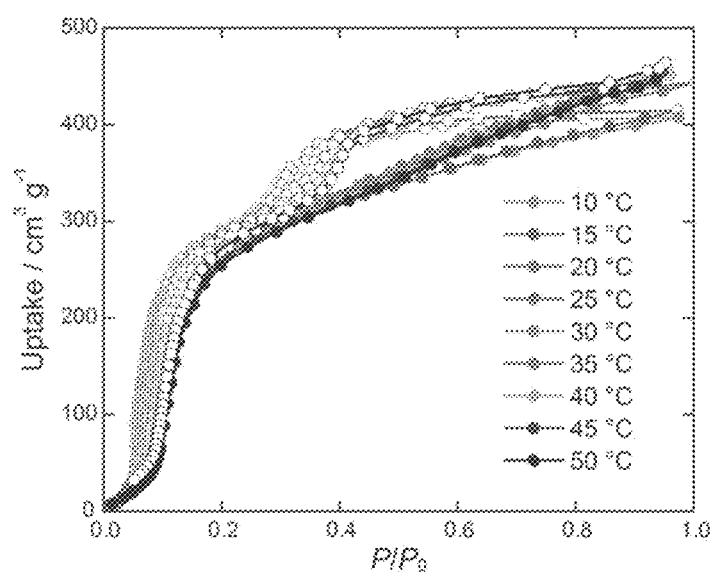
FIG. 6 depicts water sorption isotherms of pre-scaled-up MOF-801 recorded at different temperatures.
Figure 7:
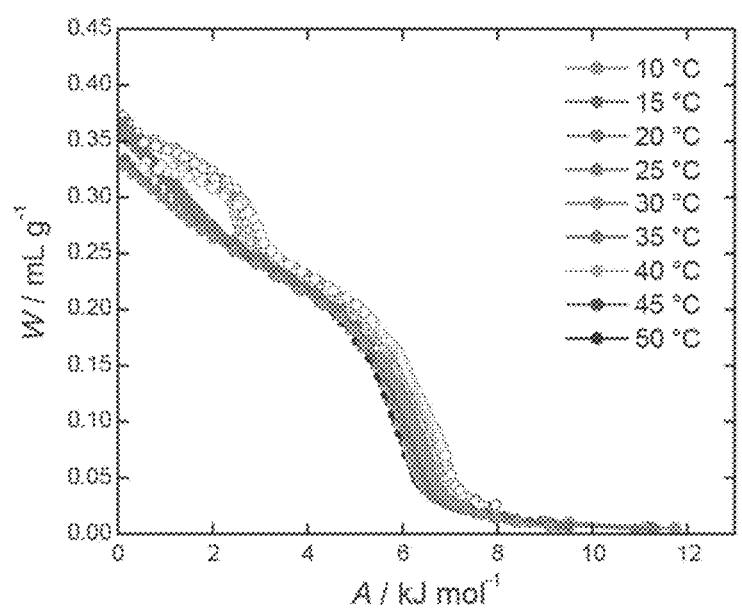
FIG. 7 depicts characteristic curves for activated pre-scaled-up MOF-801 determined using Eqns. S2,3 based on the sorption isotherms measured at different temperatures.
Figure 8:
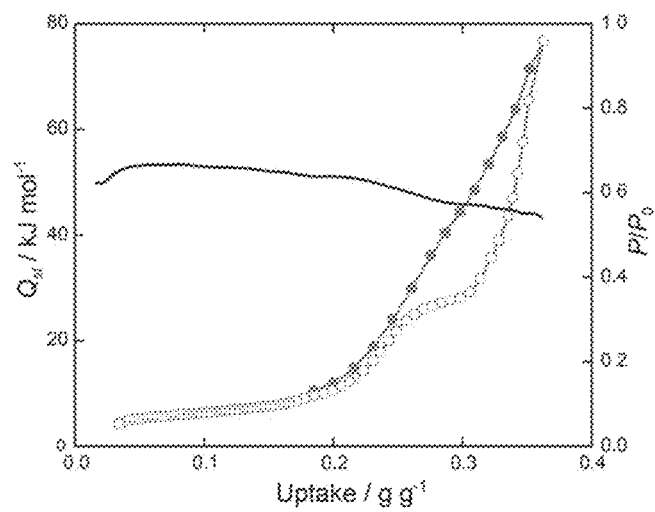
FIG. 8 depicts isosteric heat of adsorption and water sorption isotherm at 25° C. for activated MOF-801.
Figure 9:
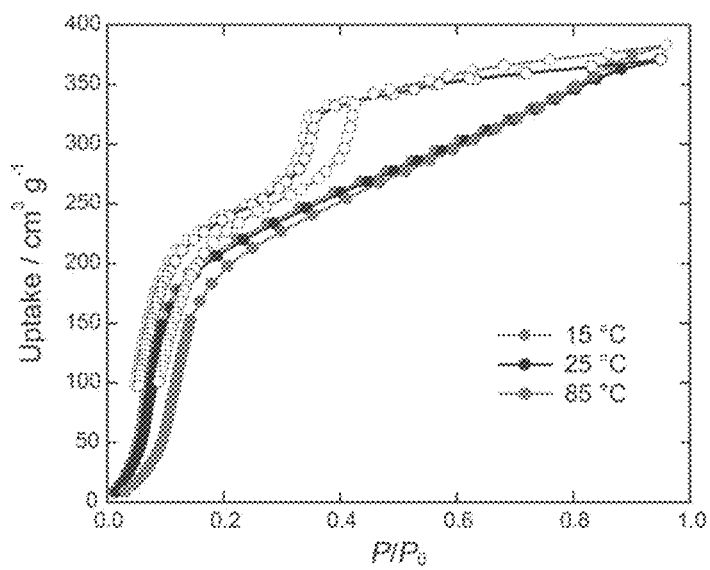
FIG. 9 depicts experimental water sorption isotherm for activated scaled-up MOF-801 recorded at 25° C. and calculated water sorption isotherms at 15 and 85° C. A 35 mg sample was taken from activated scaled-up MOF-801, transferred to a 9 mm bulb gas cell, and charged with $N_2$ to avoid air contamination. Then the cell was mounted on the instrument.
Figure 10:
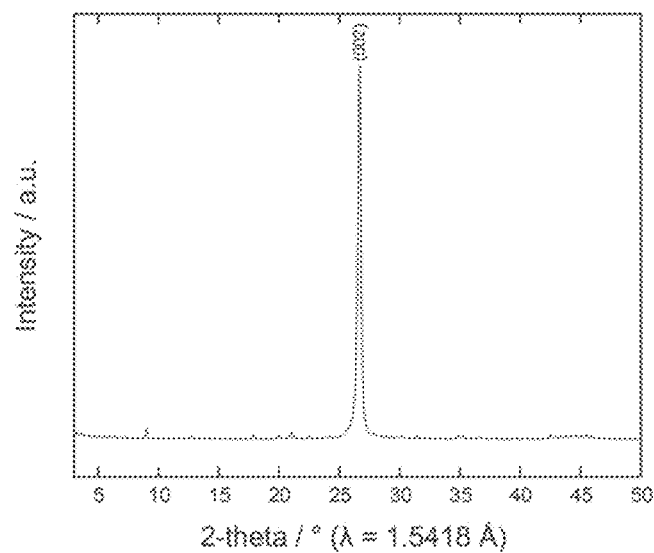
FIG. 10 depicts a PXRD pattern of the graphite sample.
Figure 11:
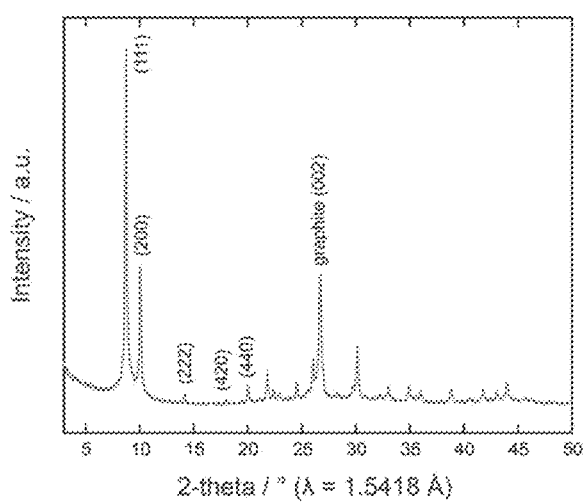
FIG. 11 depicts a PXRD pattern of activated sample of MOF-801/G. A ground sample was placed on a zero-background sample holder and mounted on the diffractometer. The data was collected from 3-50 degrees with a step width of 0.01 and a total data collection time of 30 minutes. The peak at 26.5° corresponds to the (002) reflection of graphite.
Figure 13:
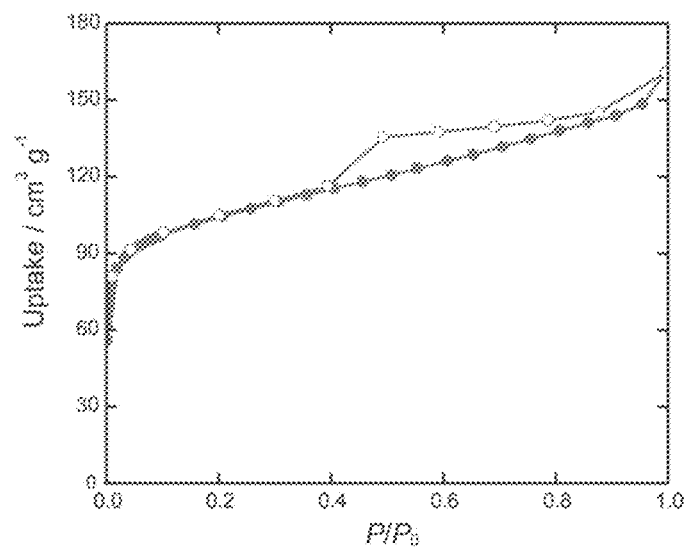
FIG. 13 depicts a $N_2$ isotherm of the activated MOF-801/G recorded at 77 K. The BET surface area is 383 $m^2 g^{-1}$.
Figure 14:
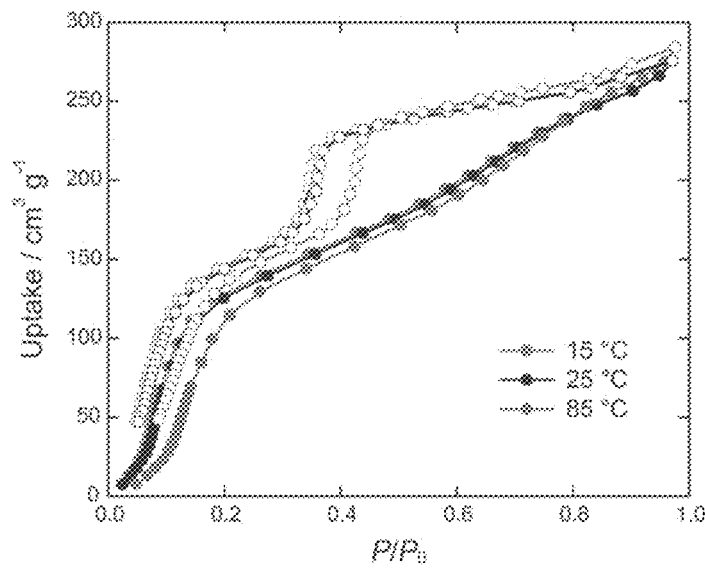
FIG. 14 depicts experimental water sorption isotherm for MOF-801/G at 25° C. and calculated water sorption isotherms at 15 and 85° C.
Figure 15:
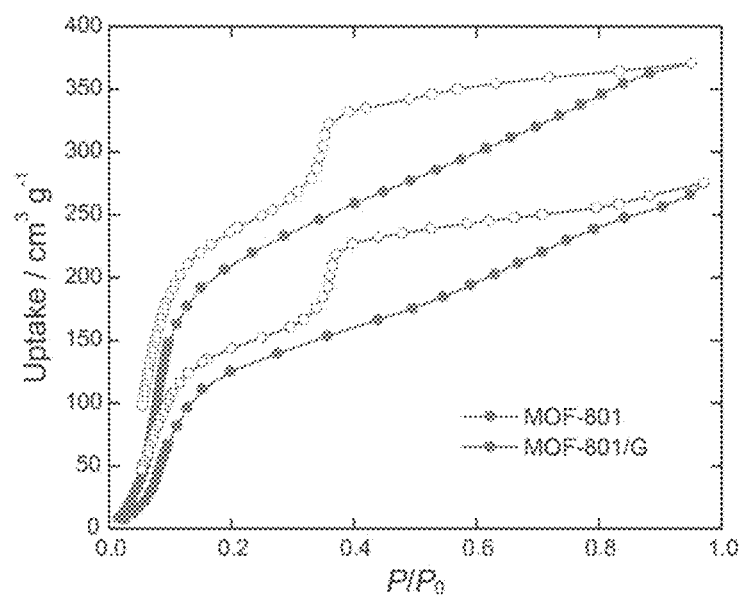
FIG. 15 depicts a comparison of water sorption isotherms for scaled-up MOF-801 and MOF-801/G at 25° C. As expected, the water uptake drops by ~33 wt % after mixing with non-porous graphite, however, the general shape of the isotherm remains the same.
Figure 16:
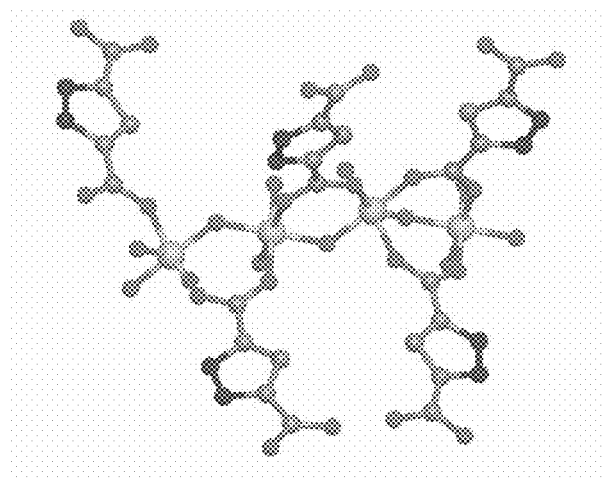
FIG. 16 depicts an asymmetric unit in the single-crystal structure of MOF-303 (atoms are shown isotropically). Hydrogen atoms are omitted for clarity.
Figure 17:
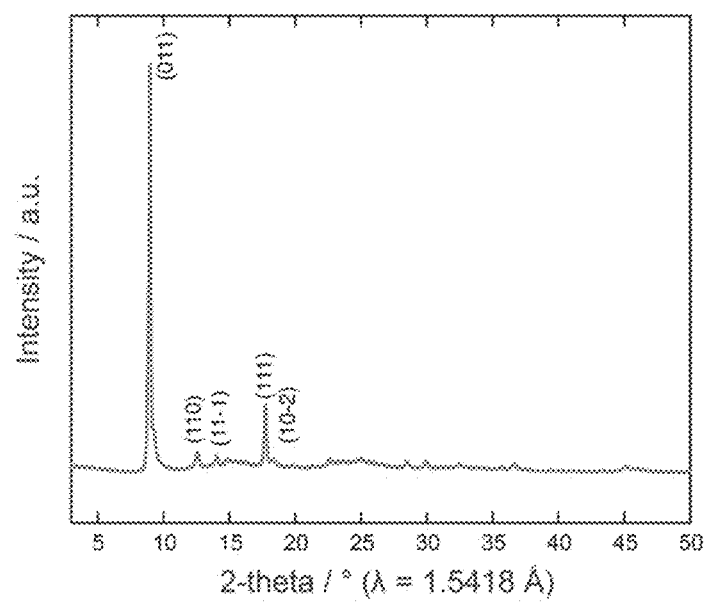
FIG. 17 depicts a PXRD pattern of activated MOF-303.
Figure 18:
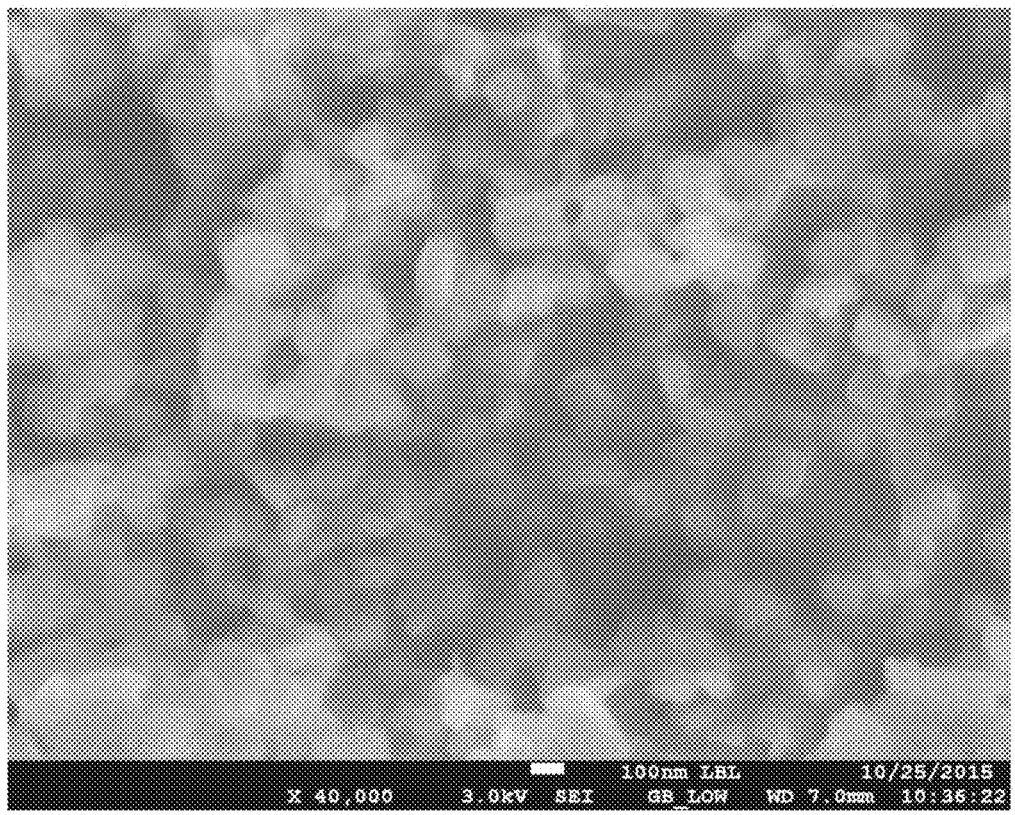
FIG. 18 depicts a SEM image of activated MOF-303.
Figure 20:
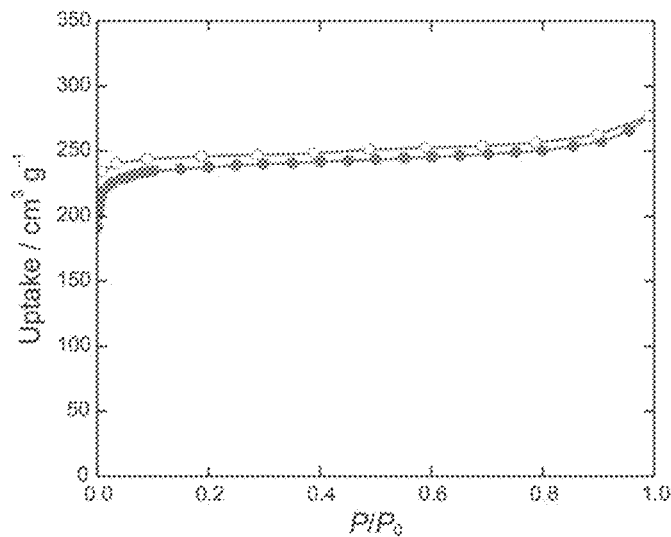
FIG. 20 depicts a $N_2$ isotherm of activated scaled-up MOF-303 at 77 K. BET surface area is 989 $m^2g^{-1}$.
Figure 21:
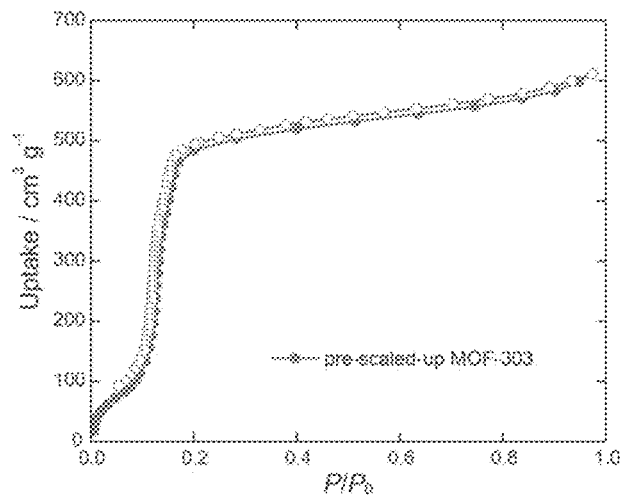
FIG. 21 depicts a water sorption isotherm of pre-scaled-up activated MOF-303 recorded at 25° C.
Figure 22:
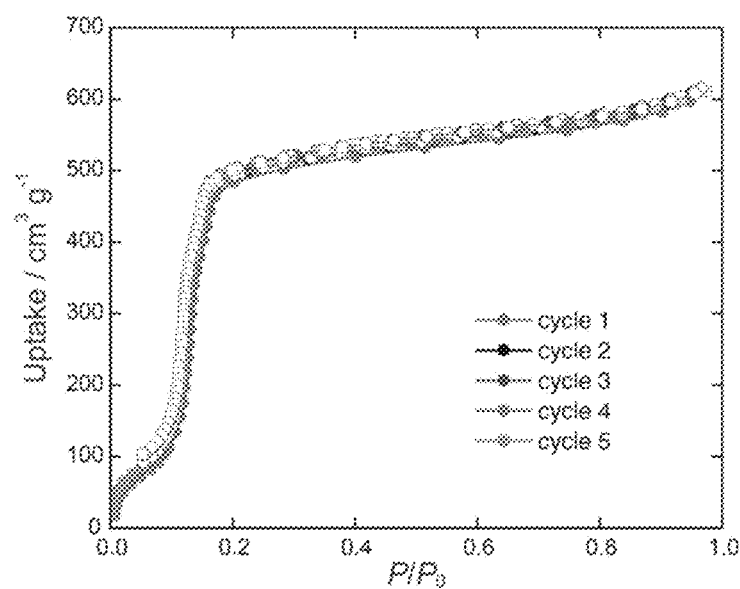
FIG. 22 depicts cycling experiment of MOF-303. Five subsequent adsorption-desorption cycles recorded 25° C. are shown.
Figure 23:
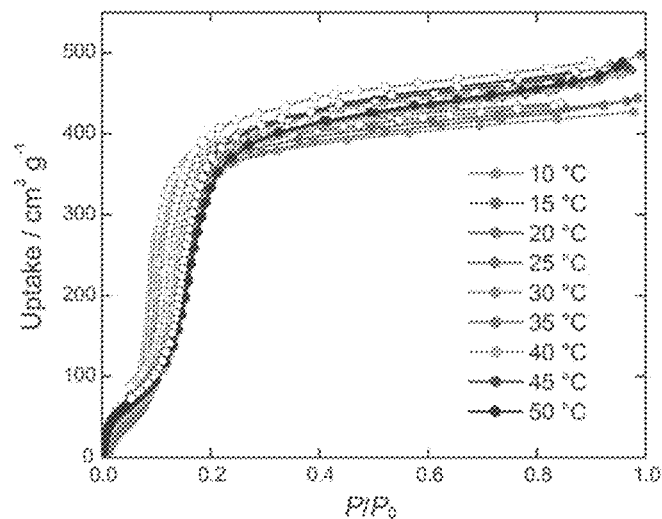
FIG. 23 depicts water sorption isotherms of activated scaled-up MOF-303 at different temperatures.
Figure 24:
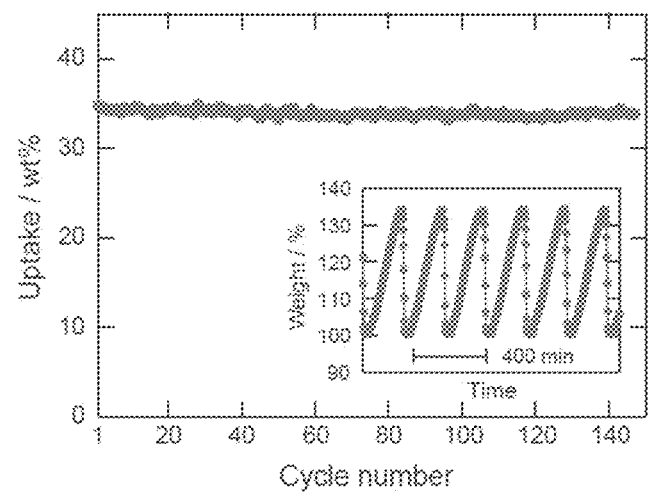
FIG. 24 depicts a graph showing 150 cycles of relative humidity swing cycling of scaled-up activated MOF-303 at 25° C. in a TGA. The sample was purged a $N_2$ flow with 40% RH and then regenerated after saturation by purging with a dry $N_2$ flow at 85° C. for 30 minutes before commencing the next cycle. Weight percentage was estimated as (mass of activated material+mass of adsorbed water)/(mass of activated material).
Figure 25:
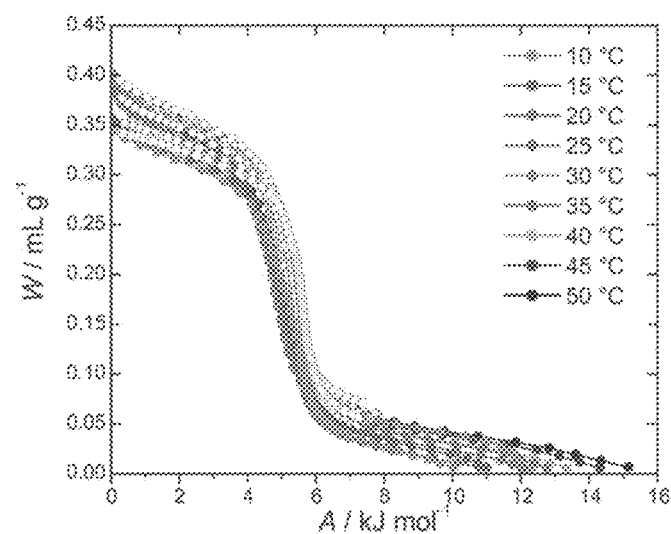
FIG. 25 depicts characteristic curves determined using Eqns. S2,3 based on sorption isotherms for MOF-303 measured at different temperatures.
Figure 26:
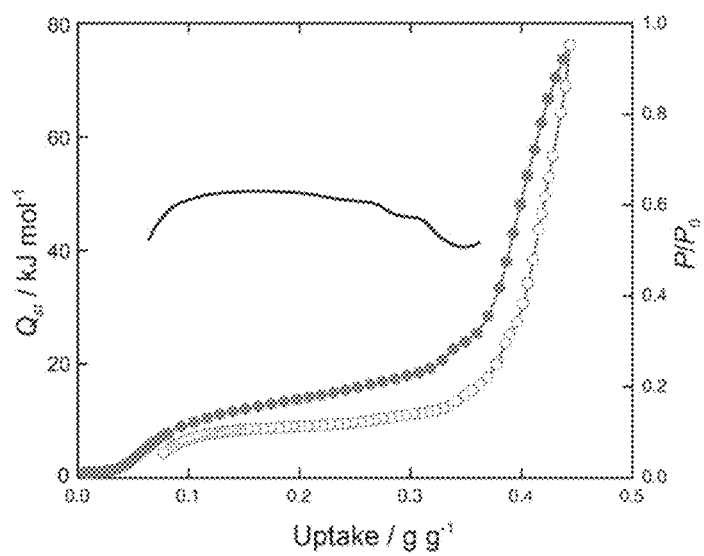
FIG. 26 depicts isosteric heat of adsorption vs. water sorption isotherm at 25° C. for activated MOF-303.
Figure 27:
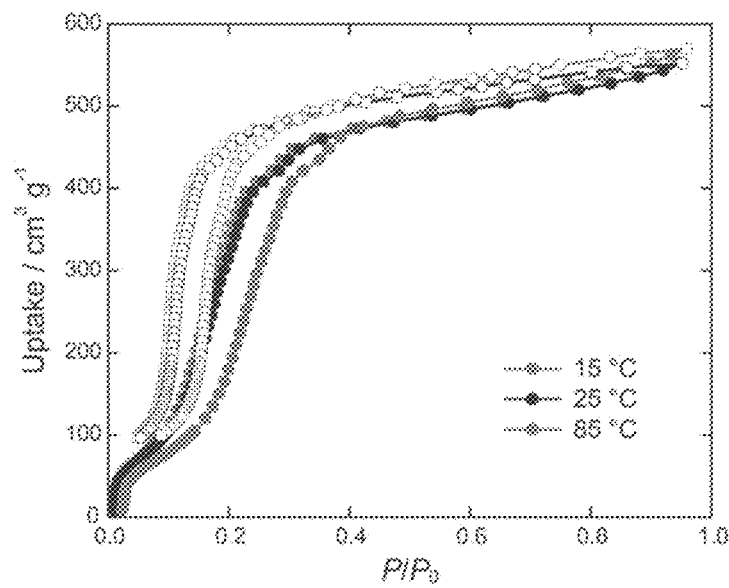
FIG. 27 depicts experimental water sorption isotherm for activated scaled-up MOF-303 at 25° C. and calculated water isotherms at 15 and 85° C. A 45 mg sample was taken from 450 g of activated scaled-up microcrystalline powder MOF-303, transferred to a 9 mm bulb gas cell, and charged with $N_2$ to avoid air contamination. Then the cell was mounted on the instrument.
Figure 28:
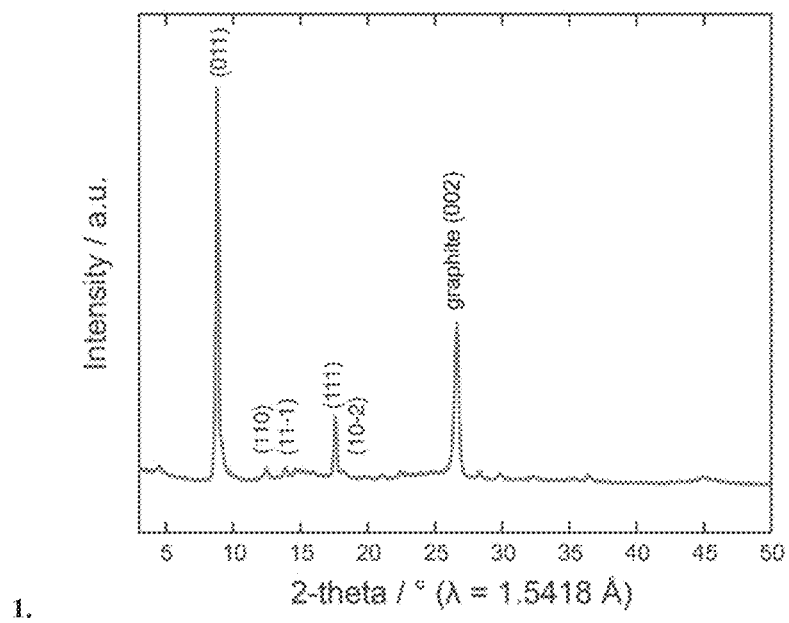
FIG. 28 depicts a PXRD pattern of activated sample of MOF-303/G. The peak at 26.5° corresponds to the (002) reflection of graphite.
Figure 30:
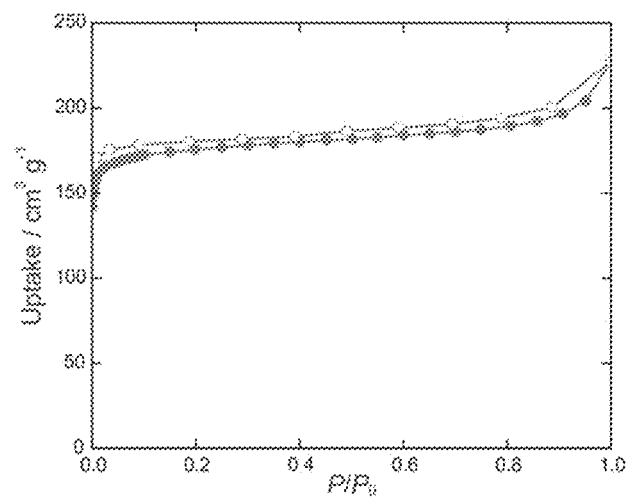
FIG. 30 depicts a $N_2$ isotherm of activated MOF-303/G at 77 K. The BET surface area is 701 $m^2 g^{-1}$.
Figure 31:
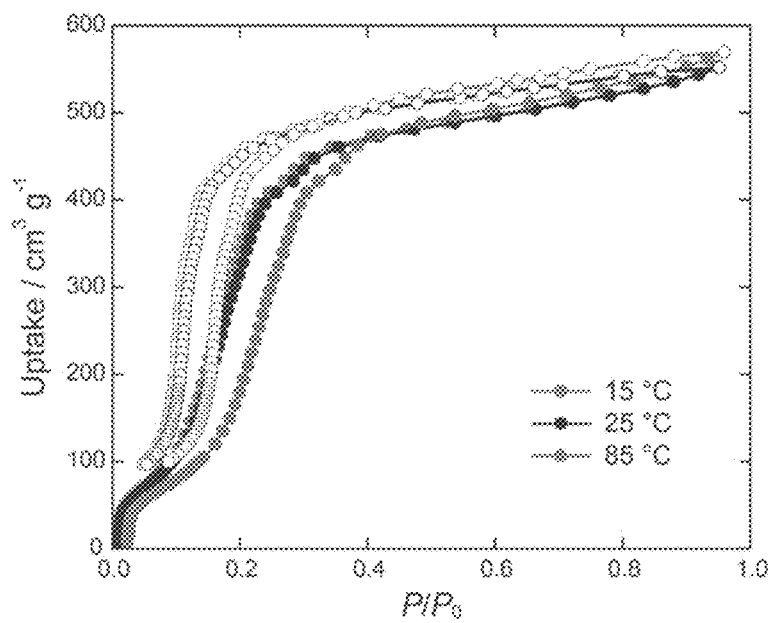
FIG. 31 depicts experimental water sorption isotherm for MOF-303/G at 25° C. and calculated water isotherms at 15 and 85° C.
Figure 32:
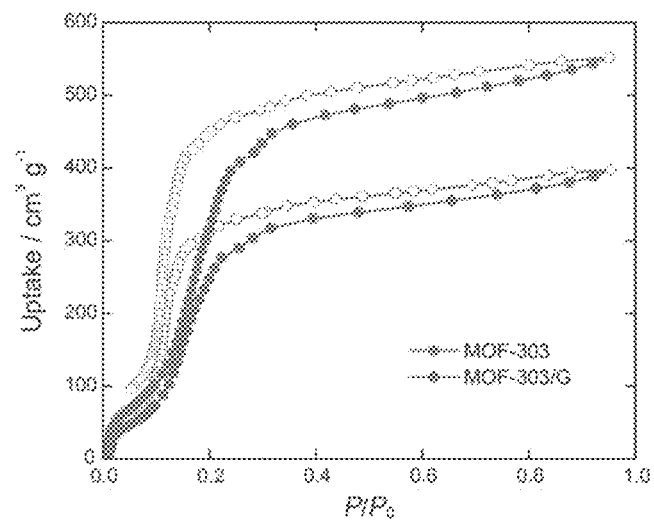
FIG. 32 depicts a comparison of water sorption isotherms of scaled-up MOF-303 and MOF-303/G at 25° C. As expected, the water uptake drops by ~33 wt % after mixing MOF-303 with 33 wt % of non-porous graphite sample, however, the general shape of the isotherm remains the same.
Figure 33:
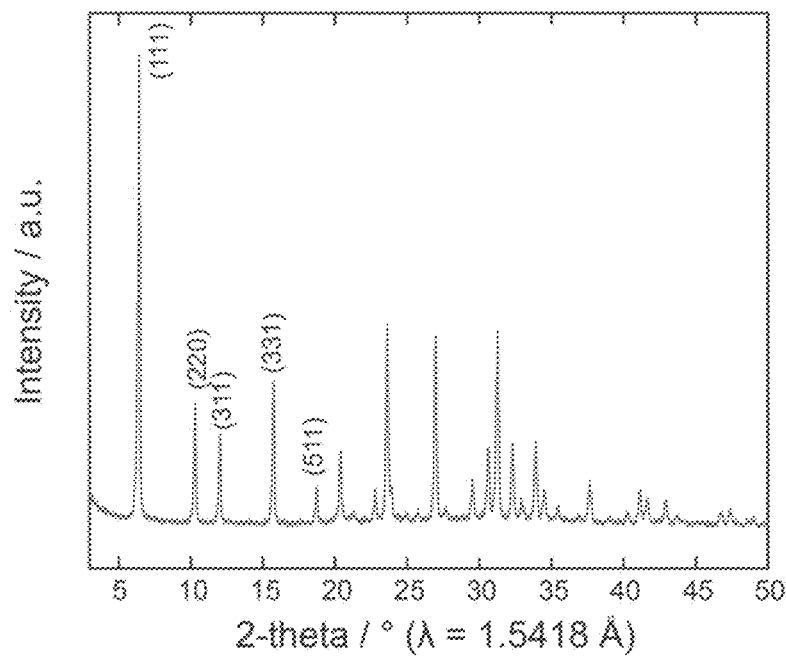
FIG. 33 depicts a PXRD pattern of Zeolite 13X.
Figure 34:
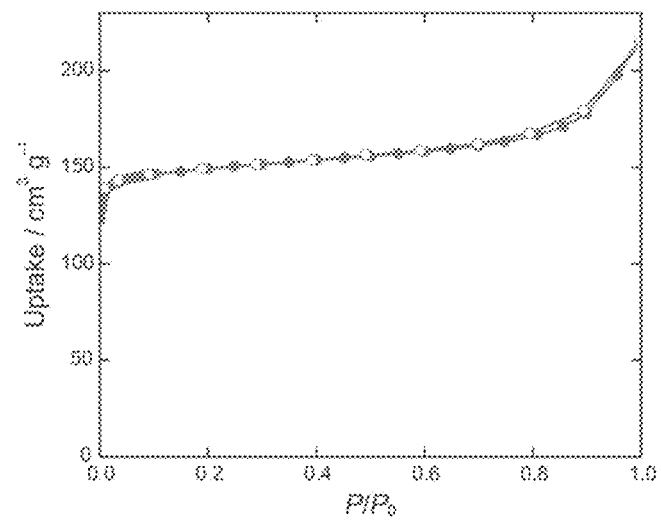
FIG. 34 depicts a $N_2$ isotherm of Zeolite 13X recorded at 77 K. The BET surface area is 602 $m^2 g^{-1}$. 53 mg of activated Zeolite 13X were transferred to a 9 mm bulb gas cell and charged with $N_2$ to avoid air contamination. Then the cell was mounted on the instrument. 26 adsorption and 11 desorption points were collected.
Figure 35:
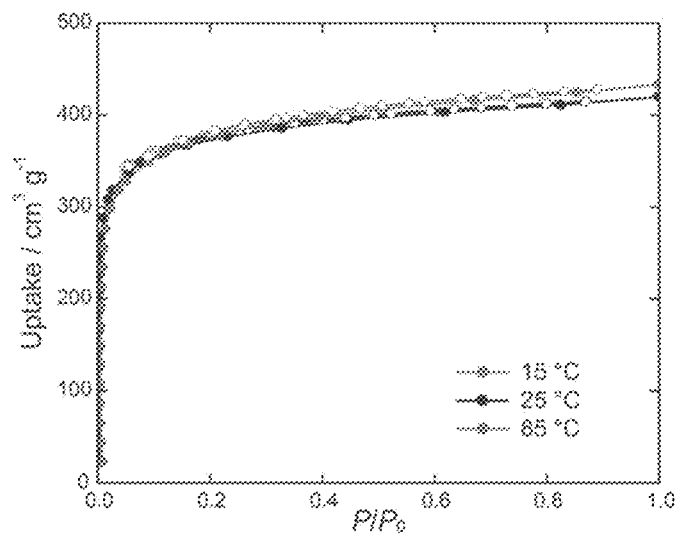
FIG. 35 depicts an experimental water sorption isotherm for Zeolite 13X at 25° C. and calculated water isotherms at 15 and 85° C. 53 mg of activated Zeolite 13X were transferred to a 9 mm bulb gas cell and charged with $N_2$ to avoid air contamination. Then, the cell was mounted on the instrument to measure the water uptake capacity at 25° C.
Figure 36:
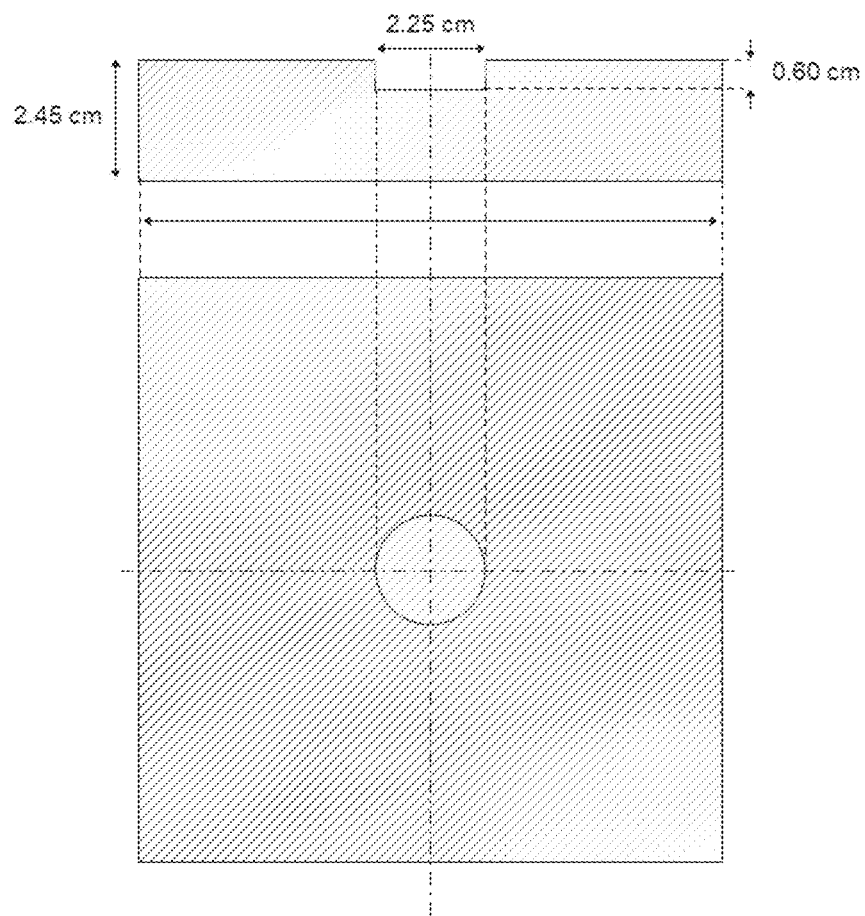
FIG. 36 depicts a schematic of insulation cell used for solar flux-temperature response measurements.
Figure 37:
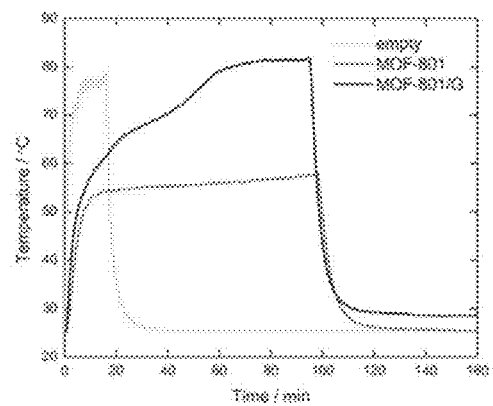
FIG. 37 depicts a graph showing the increase of the sample temperature with time under a flux of 1000 W m$^{-2}$ for MOF-801 and MOF-801/G. The measurement of an empty cell is shown for comparison. The sudden change in temperature increase for MOF-801/G at 70° C. is due to desorption of water.
Figure 38:
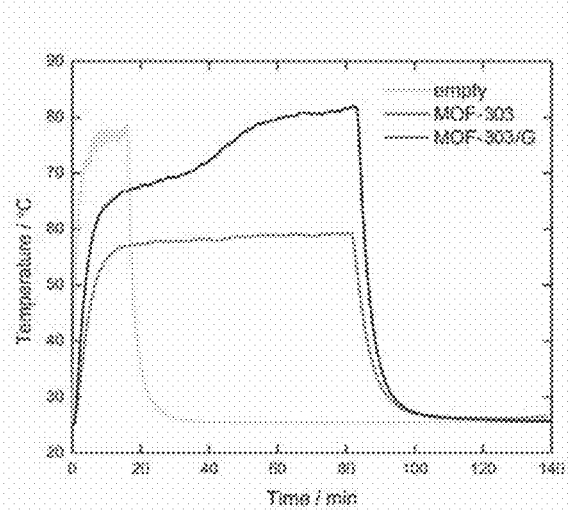
FIG. 38 depicts a graph showing the increase of the sample temperature with time under a flux of 1000 W m$^{-2}$ for MOF-303 and MOF-303/G. The measurement of empty cell is shown for comparison. The sudden change in temperature increase for MOF-303/G at 70° C. is due to desorption of water.
Figure 39:
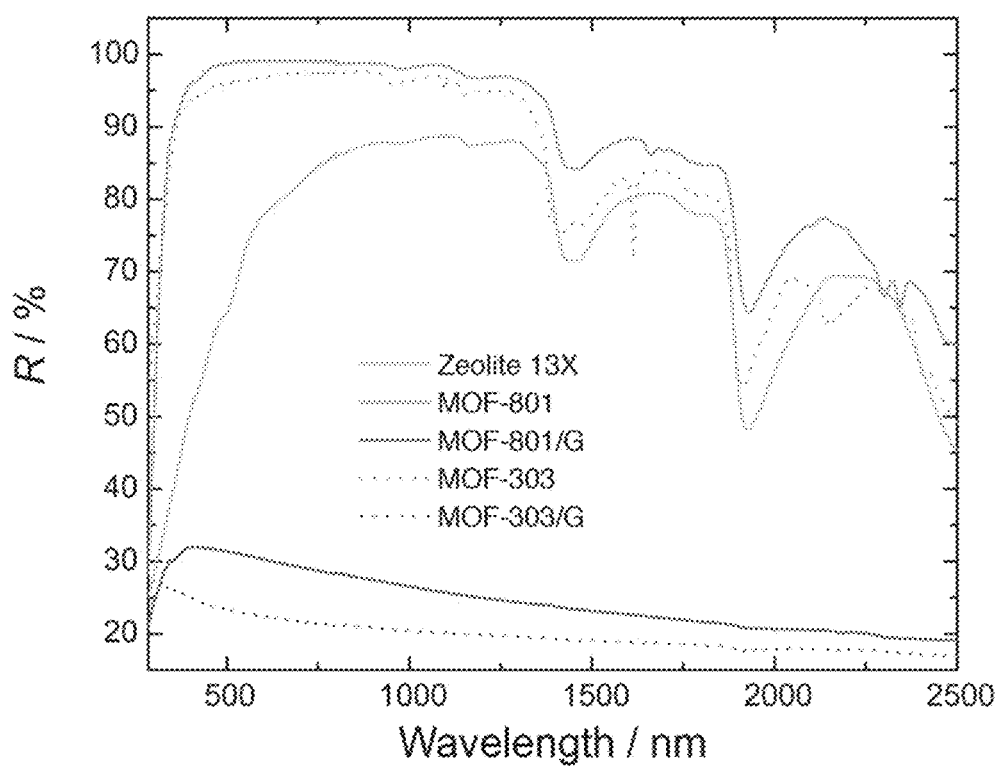
FIG. 39 depicts diffuse reflectance spectra of Zeolite 13X, MOF-801, MOF-801/G, MOF-303, and MOF-303/G recorded between 285 and 2500 nm.
Figure 40:
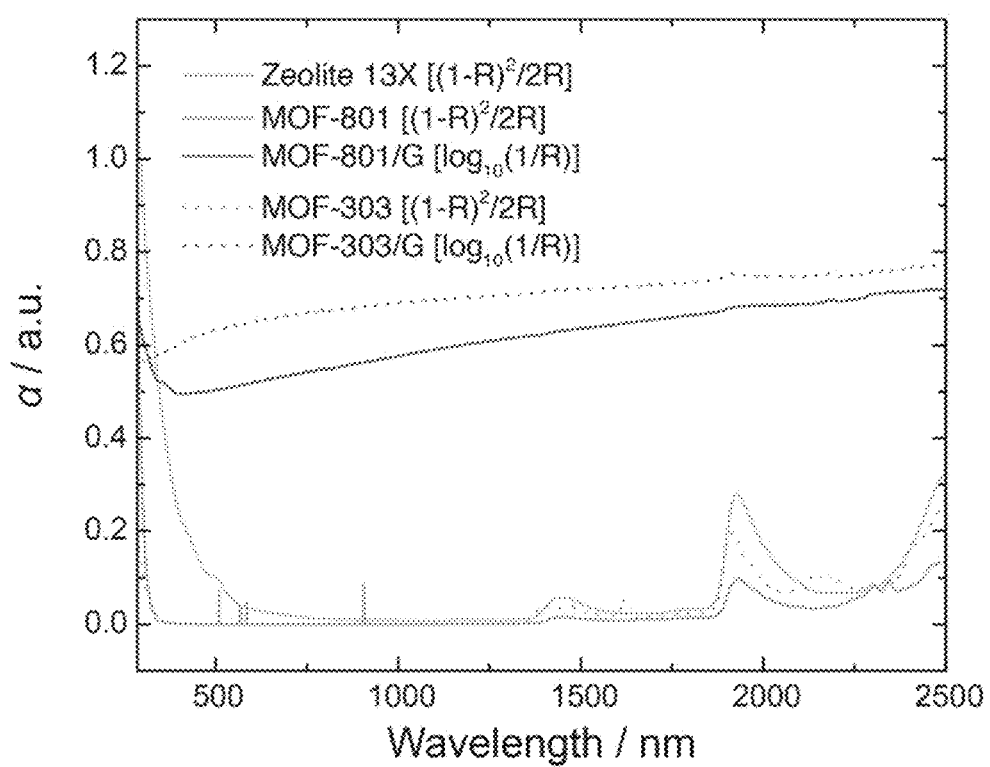
FIG. 40 depicts absorption spectra of Zeolite 13X, MOF-801, MOF-801/G, MOF-303, and MOF-303/G between 285 and 2500 nm. The spectra are calculated from the diffuse reflectance data presented in FIG. 39 using Eqns. S4 or S5.
Figure 41:
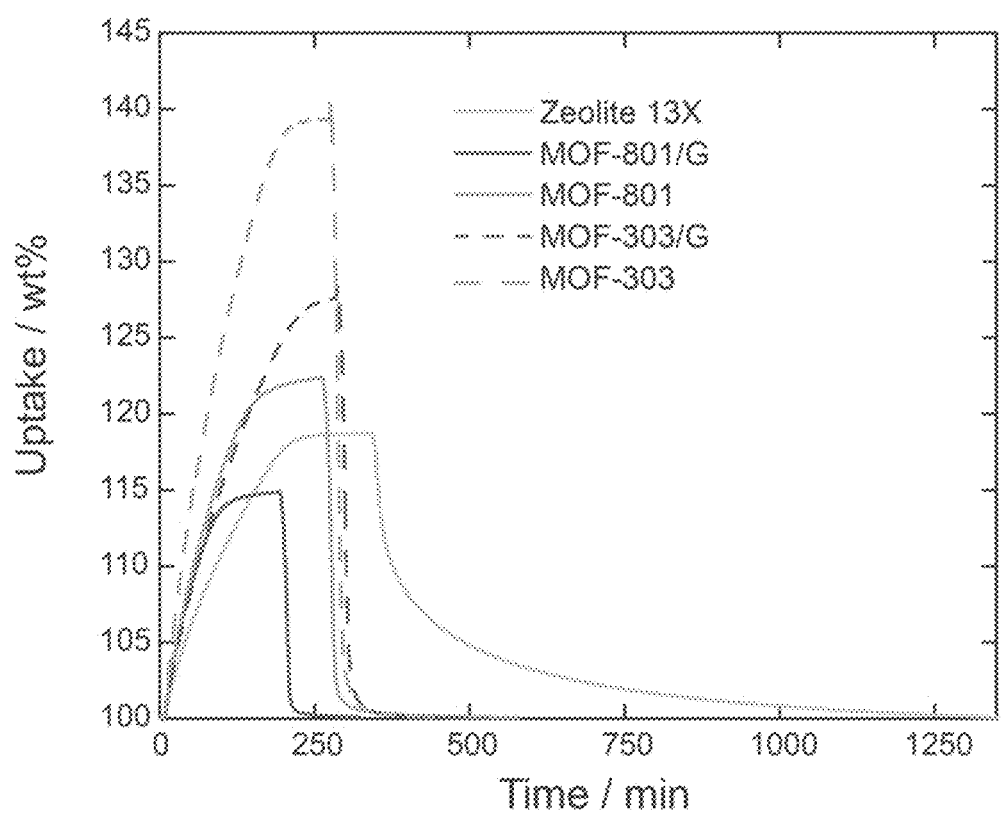
FIG. 41 depicts a comparison of water sorption kinetics for Zeolite 13X, MOF-801, MOF-303, MOF-801/G and MOF-303/G.
Figure 42:
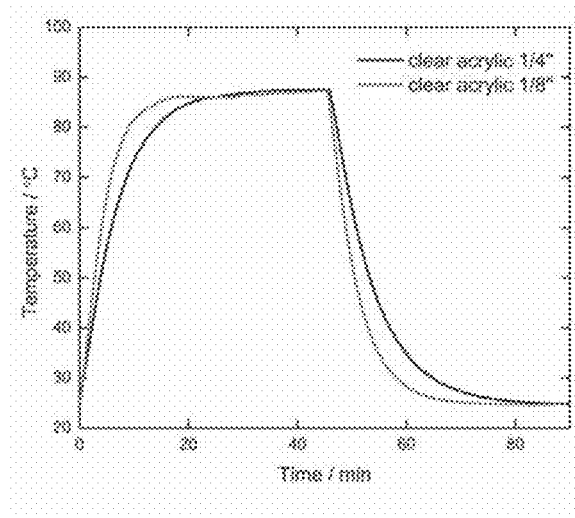
FIG. 42 depicts a graph showing the temperature response with time under a flux of 1000 W m$^{-2}$ measured for circular pieces of PMMA (diameter 20 mm) with a thickness of ¼" and ⅛".
Figure 43:
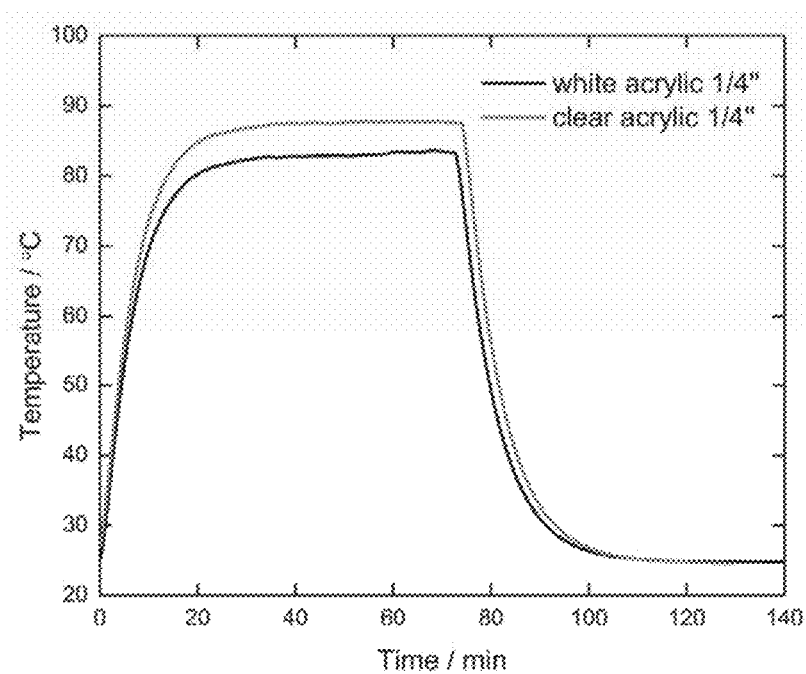
FIG. 43 depicts a graph showing the temperature response with time under a flux of 1000 W m$^{-2}$ measured for circular pieces of PMMA (diameter 20 mm) of the same thickness (¼") coated with a white and clear coating. A 7° C. lower temperature was observed in case of the PMMA sample with white coating.
Figure 44:
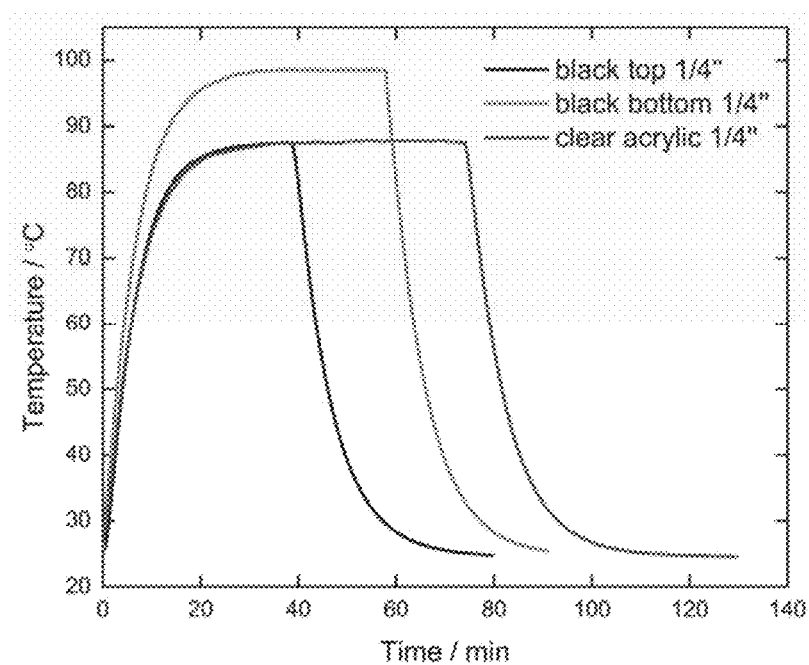
FIG. 44 depicts a graph showing the temperature response with time under a flux of 1000 W m$^{-2}$ measured for circular pieces of PMMA (diameter 20 mm) of the same thickness (¼") coated with solar absorber coating (Pyromark paint). A comparison of a clear disc of PMMA, and a coated disk in two different orientations, to coated and bottom coated is shown. A 13° C. higher temperature was observed for the PMMA disc with pyromark coating on the bottom. The identical profile of temperature variation in the case of the transparent disc of PMMA and that coated on the top implies the preferable direction for heat transfer.
Figure 45:
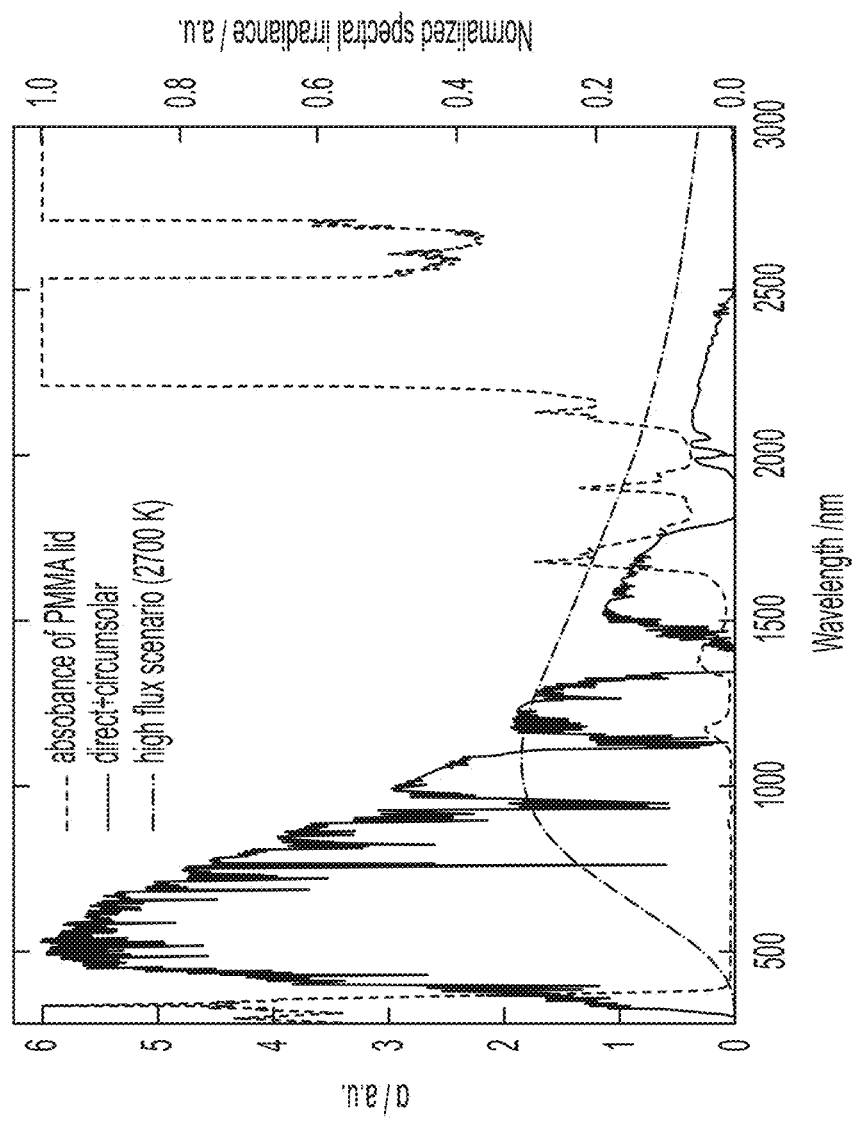
FIG. 45 depicts absorption of PMMA compared to the spectral irradiance of the sun and an incandescent lamps between 285 and 3000 nm. PMMA shows strong absorption below 400 and above 2300 nm.
Figure 46:
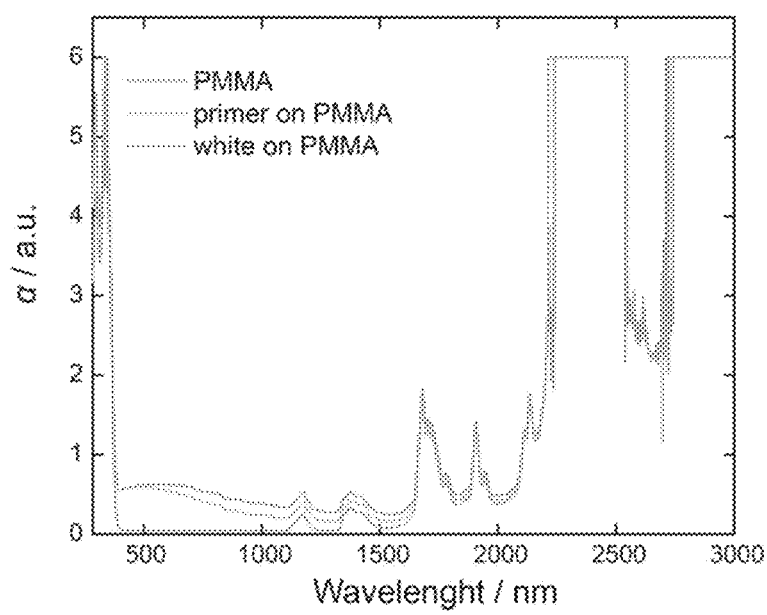
FIG. 46 depicts a comparison of absorption spectra for PMMA, PMMA coated with primer (light gray), and PMMA coated with white paint. For both coated samples, an increase of the absorption in the visible and IR region is observed, arguably due to a higher reflectivity of the surface within the particular spectral range.

The following description sets forth exemplary methods, parameters and the like. It should be recognized, however, that such description is not intended as a limitation on the scope of the present disclosure but is instead provided as a description of exemplary embodiments.

In one aspect the invention provides an atmospheric water harvester comprising: an active chemical compound or other water capture material, a moisture sorption unit (e.g. FIG. 91), a harvesting enclosure (e.g. FIG. 92), a cooling unit, a water collector, a solar collector, a portable stand frame. Other variations of water harvester systems are also described herein.

Water Capture Material

The water capture material comprises an active chemical compound. In some embodiments, such material captures moisture from air from the surroundings and then releases the captured moisture to the surroundings under external stimuli including but not limited to heating, moisture vapor pressure change or UV-radiation. The active chemical compound may be an ionic or covalent porous solid, including but not limited to metal-organic and organic porous framework materials, zeolites, organic ionic solids, inorganic ionic solids, organic molecular solids, or inorganic molecular solids. It should preferably have a low heat capacity, high thermal conductivity and hydrothermal stability. It may be used in a pure, single phase form, as a composition of different active chemical materials, and/or in combination with performance enhancing additives modulating its properties. Performance enhancing additives may include materials with a high thermal conductivity and molar absorptivity. The active chemical compound may be used in the form of a powders, extrudates, molded bodies, pressed pellets, pure or composite films, or sintered bodies.

In some embodiments, the water capture material comprises an active chemical compound, such as a metal-oxide framework (MOF). MOFs are porous materials that have repeating secondary building units (SBUs) connected to organic ligands. In some variations, the SBUs may include one or more metals or metal-containing complexes. In other variations, the organic ligands have acid and/or amine functional group(s). In certain variations, the organic ligands have carboxylic acid groups.

Any suitable MOFs capable of adsorbing and desorbing water may be employed in the systems provided herein. In one variation, MOF-303 may be used, which has a structure of Al(OH)(HPDC), where HPDC stands for 1H-pyrazole-3, 5-dicarboxylate. Other suitable MOFs may include, for example, MOF-801, MOF-841 and MIL-160. See e.g., Furukawa et al., J. Am. Chem. Soc. 2014, 136, 4369-4381. A combination of MOFs may also be used.

In some variations, the MOFs have pore sizes between about 0.5 nm about 1 nm, or between about 0.7 nm to about 0.9 nm. In certain variations, the MOFs have a hydrophilic pore structure. In certain variations, the MOFs have a hydrophilic pore structure comprising acid and/or amine functional groups. In certain variations, the MOFs have 1D channels that allow for reversible water adsorption.

In some variations, the water capture material comprises at least one MOF and graphite. Any combinations of the water capture materials described herein may also be used.

Atmospheric Moisture Harvester System

Provided herein are atmospheric moisture harvester systems that include: a moisture sorption unit that contains the water capture material; and a moisture harvesting enclosure.

Figure 47:
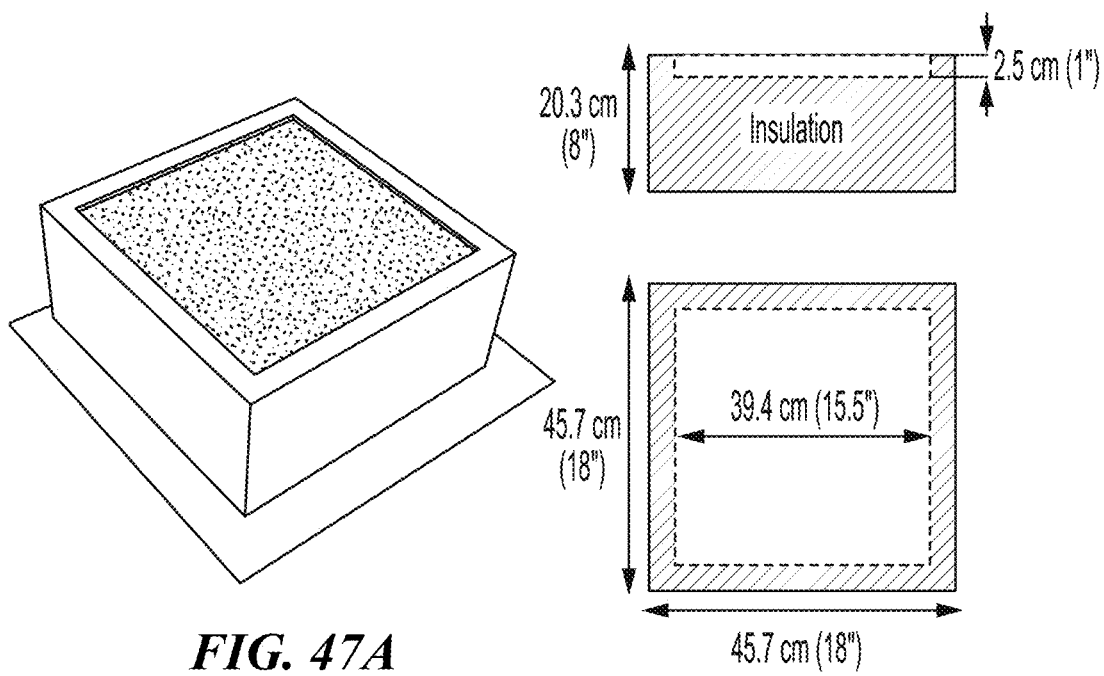
FIG. 47A depicts a water sorption unit.
FIG. 47B depicts a schematic representation of the unit with dimensions.
Figure 48:
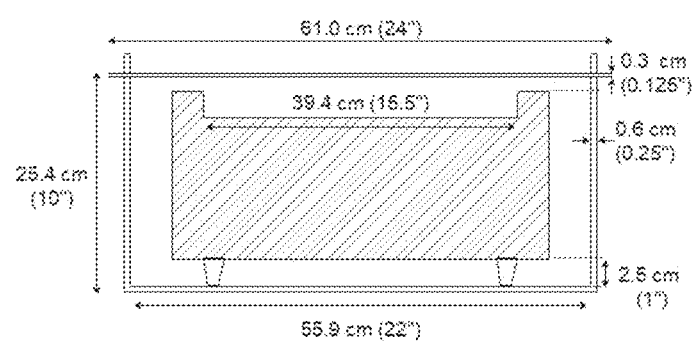
FIG. 48 depicts a schematic of the case, cover, and water sorption unit with dimensions.
Figure 49:
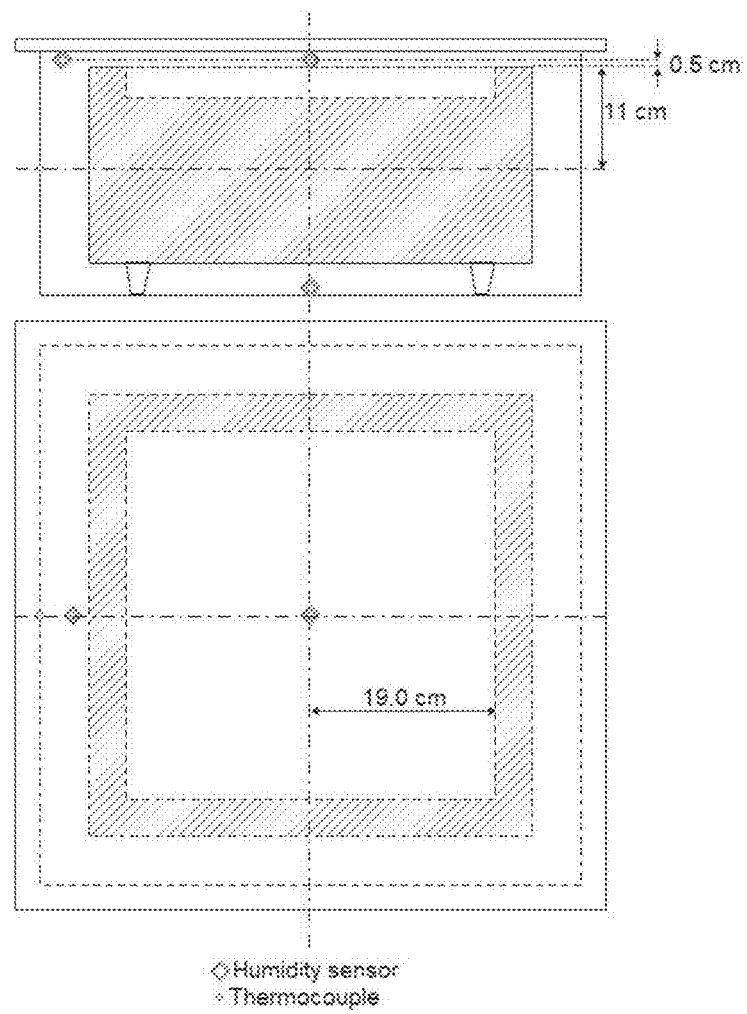
FIG. 49 depicts locations of thermocouples and humidity sensors inside the case.
Figure 91:
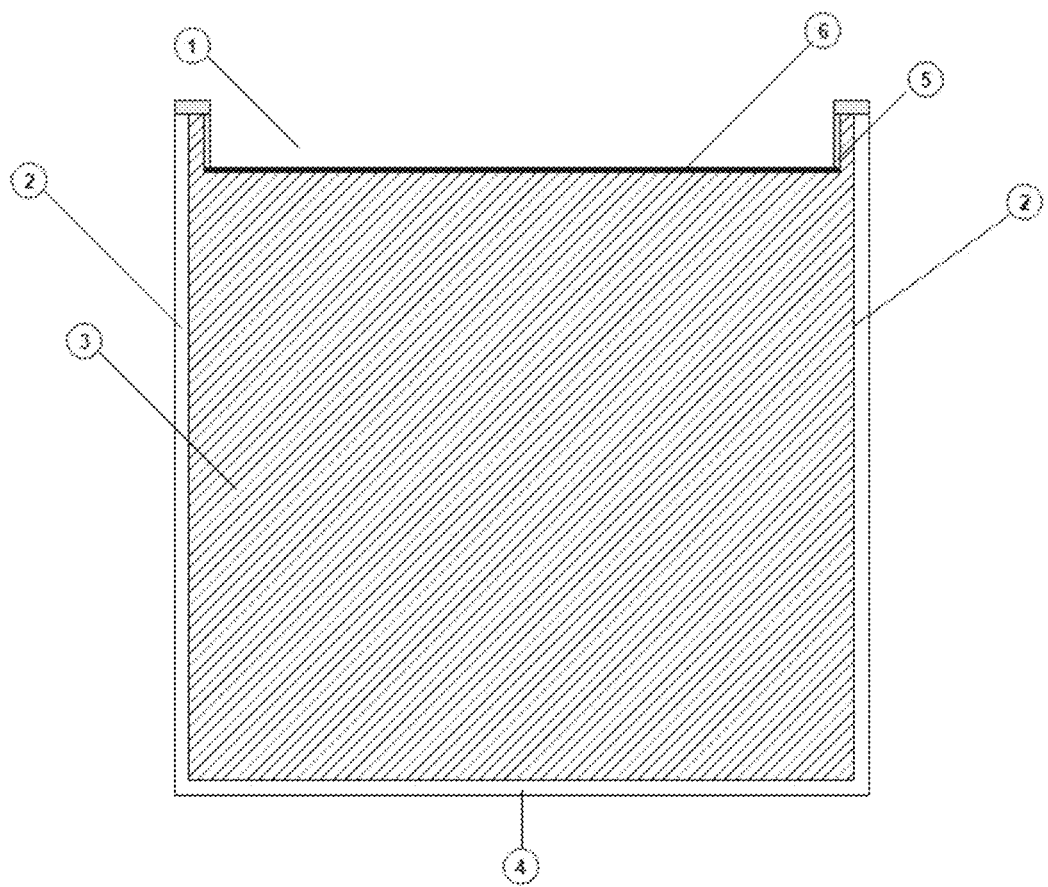
FIG. 91 is a cross-sectional view of a moisture sorption unit.

With reference to FIGS. 47 and 91, in some variations, the moisture sorption unit is a box which is filled with insulation. The moisture sorption unit holds the water capture material at the top of the unit, and provides the temperature difference between the hot part of the unit (water capture material temperature increases upon exposure to sunlight) and cold part of the unit where condensation takes place. In some variations, the moisture sorption unit may be covered with white to reflect direct sunlight except for the top which is covered with black paint to increase solar absorption.

Figure 92:
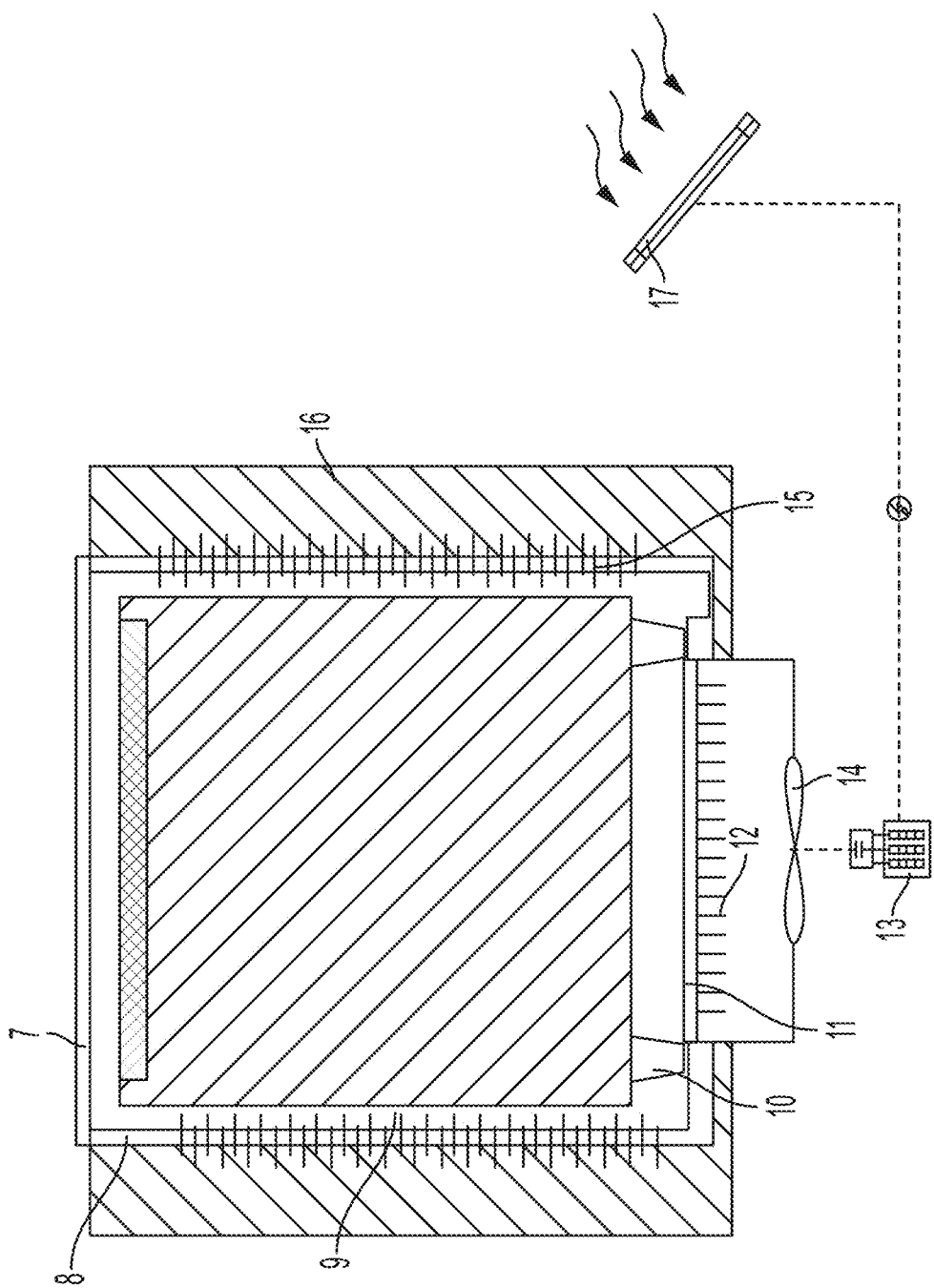
FIG. 92 is a cross-sectional view of a moisture harvesting enclosure with the moisture sorption unit, as shown in FIG. 91.

With reference to FIG. 92, the moisture sorption unit is placed into the moisture harvesting enclosure. In some variations, the moisture harvesting enclosure may be a plexiglass box that holds the released moisture upon desorption. This enclosure remains open on top during the night so the water capture material is exposed to cold humid air to adsorb water. This enclosure is closed during the day with the transparent lid to sustain released moisture upon heating of the water capture material. The released hot humid air moves down the moisture harvesting enclosure and condenses at the bottom. The aluminum cover provides shading to cover the box and leave the surface of the water capture material exposed to sunlight.

Figure 94:
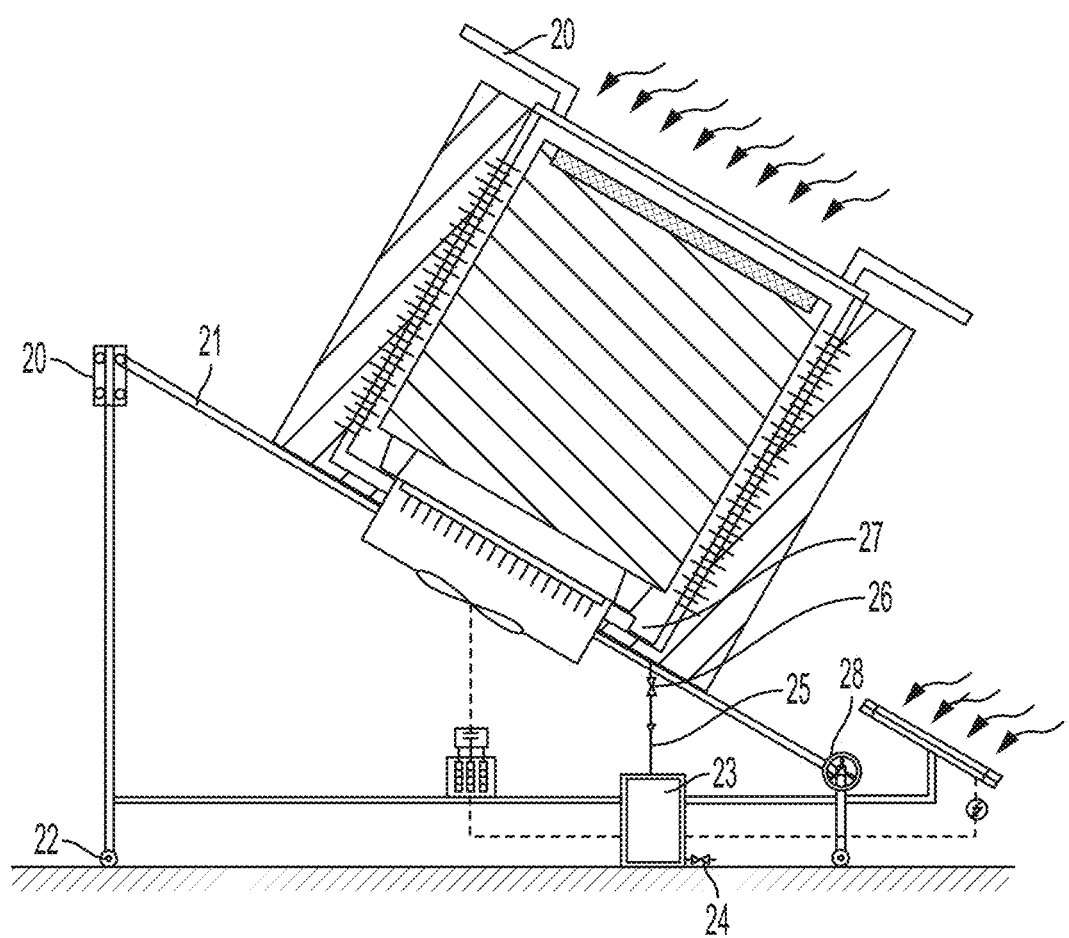
FIG. 94 is a side view of the atmospheric moisture harvester.
Figure 95A:
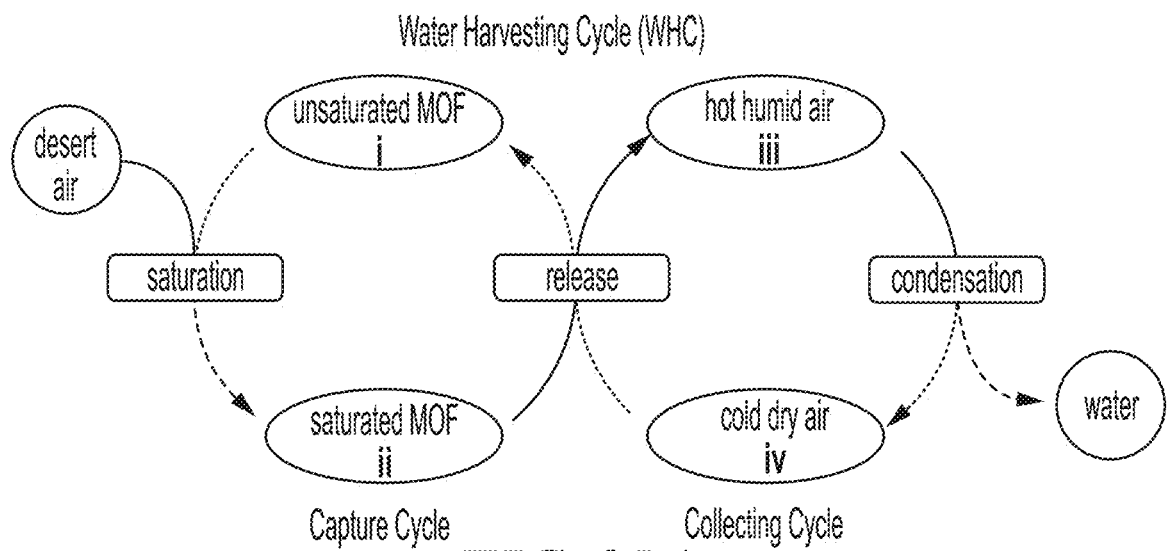
FIGS. 95A-95C generally relate to WHC for practical water production under ambient cooling and natural sunlight.
Figure 95B:
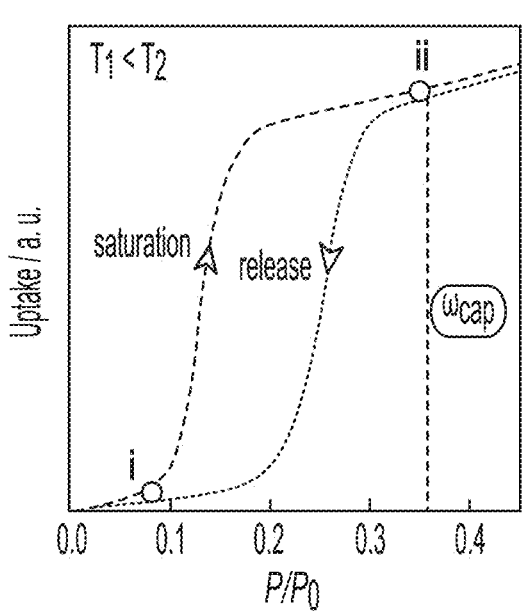
Figure 95C:
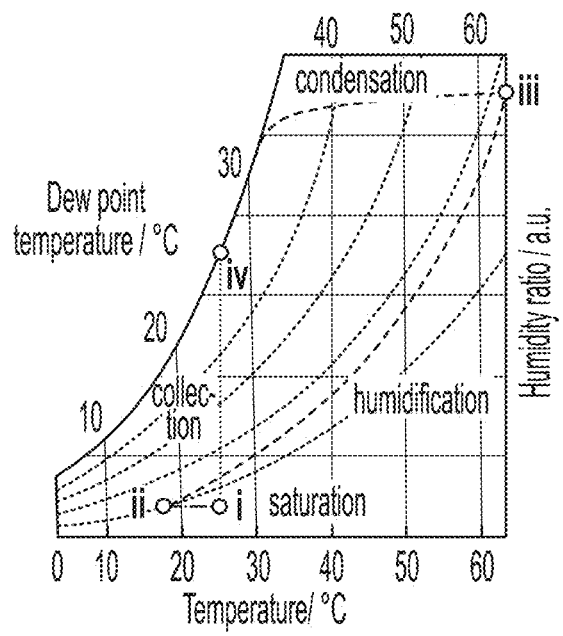

In some variations, the moisture sorption unit within the moisture harvesting enclosure may be placed into a box with soil, or any other material which has high heat capacity to keep the walls of moisture harvesting enclosure at constant temperature. This soil box also serves as a heat sink to reject all the heat released upon condensation. With reference to FIG. 94, the system may be placed at the angle to provide maximum exposure to sunlight. Additionally, in some variations, one or more solar panels can be installed to provide energy for the fan which can cool down the bottom of the moisture harvesting enclosure to speed up the condensation process. In some embodiments, the system may further include a condenser.

In some variations, the system may further include one or more solar panels. In other variations, the system is a passive system. In one variation, the system does not require any additional source of energy other than sunlight to operate. Thus, in some variations, the systems described herein can produce water off-grid and without any solar panels. In contrast to active systems, which need some source of energy for water capture, release and condensation, the passive systems described herein do not need any energy for water capture and condensation, and only relies on direct sunlight for water release.

The different units of the systems are further described herein.

Figures 96A, 96B:
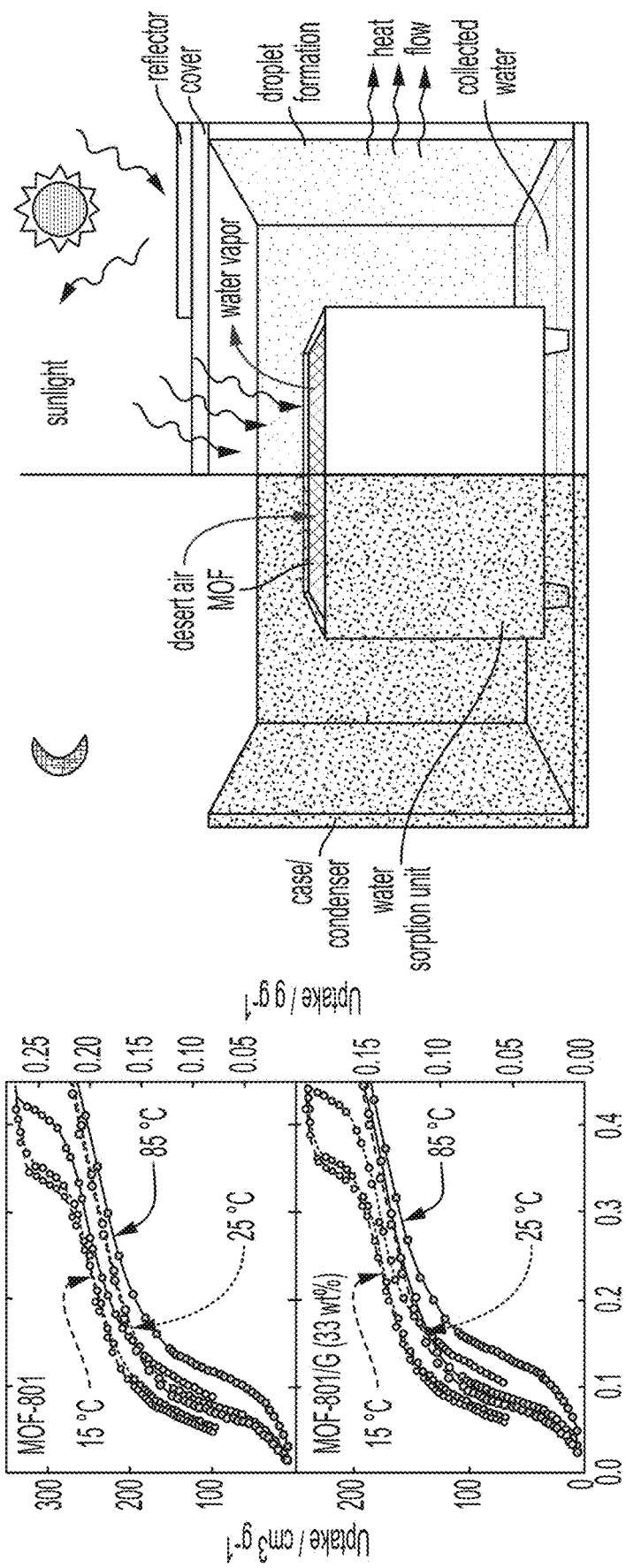
FIGS. 96A and 96B generally related to isotherms of MOF-801 and design of the MOF-based water harvester for water production from desert air.
Figure 97B:
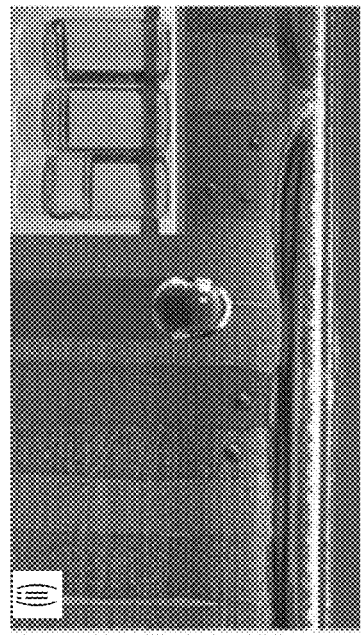
Figure 97A:
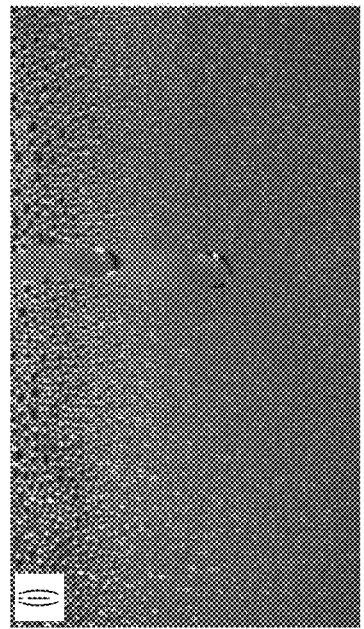
Figure 98A:
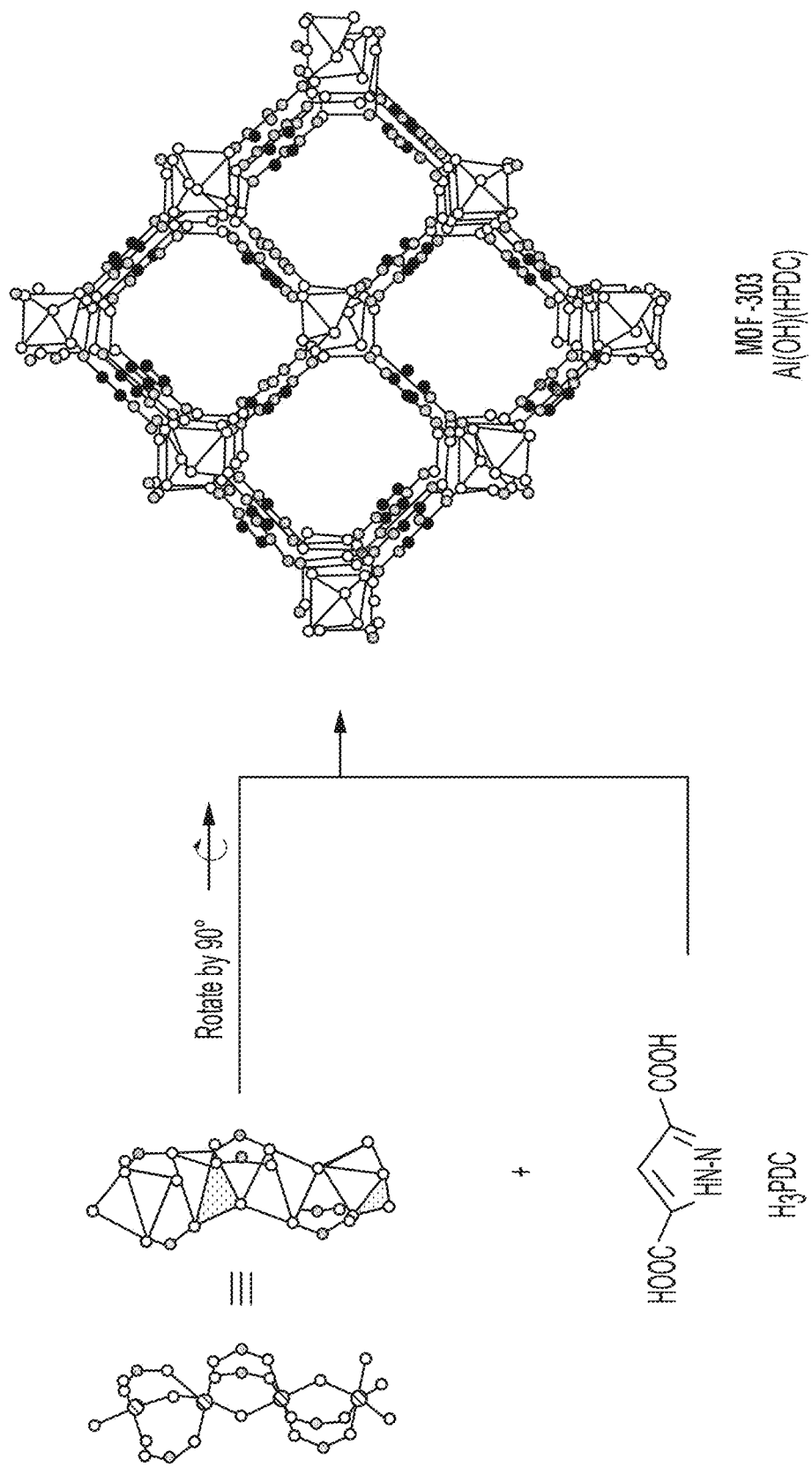
FIGS. 98A-98C generally relate to next generation MOF with increased productivity.
Figure 98B:
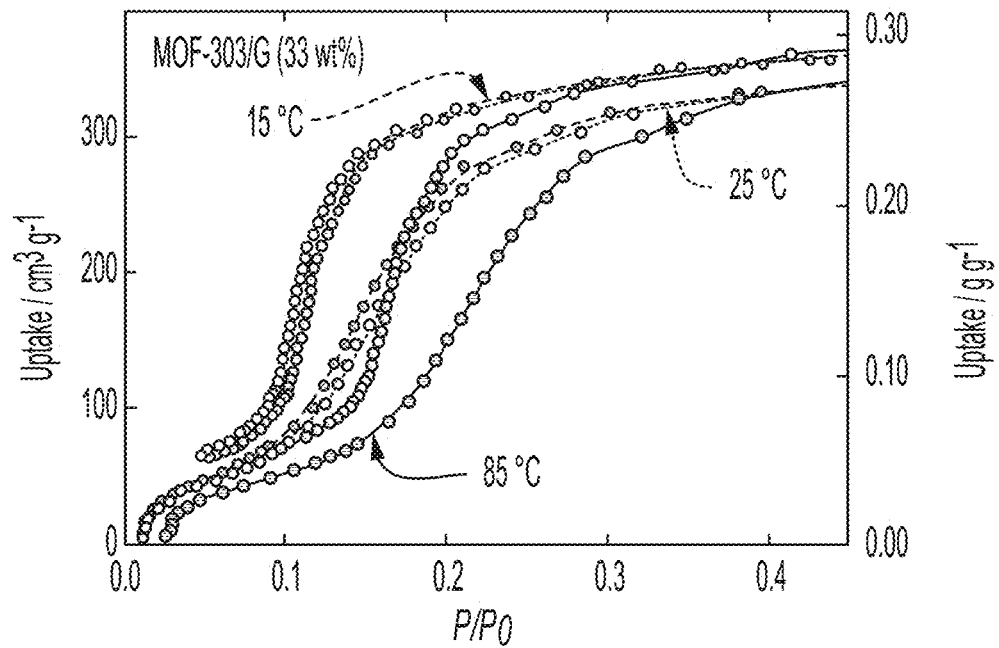
Figure 98C:
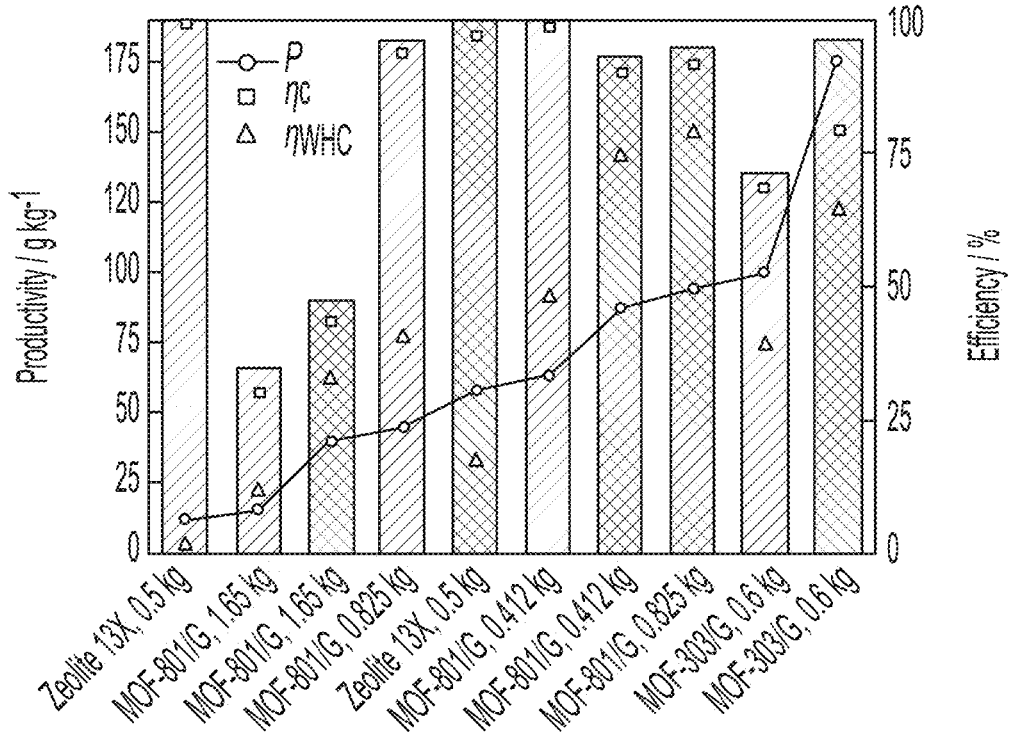

With reference to FIG. 96B, an exemplary schematic of a water harvester system is depicted. During the night, the cover of the case is opened, allowing the water capture material to be saturated with moisture from surrounding air (e.g., desert air). During the day, the moisture harvesting enclosure is sealed to create a closed system. Humid hot air flows from the water capture material to the condenser, and is cooled down by heat rejection to the surroundings. When the dew point is reached, condensation occurs, and liquid water collects at the bottom of the moisture harvesting enclosure. This temperature gradient is created by designing the moisture sorption unit to act as a thermal insulator, which can maintain a low condenser temperature while heating the water capture material. Solar thermal incalescence of the moisture sorption unit itself may be minimized by applying an IR reflective coating to all exposed surfaces. The moisture harvesting enclosure has a cover (or lid) and encloses the moisture sorption unit. As depicted in FIG. 96B, the side walls of the moisture harvesting enclosure act as the condenser and provide surfaces for heat transfer with the surroundings. In other variations of the system, the system may further include a condenser, for example, positioned at the bottom of the moisture harvesting enclosure. The moisture harvesting enclosure can be opened or closed for saturation during the night and release-condensation during the day. Finally, a reflector is attached to the cover to ensure that only the surface of the water capture material is exposed to solar radiation. In order to minimize or circumvent warming of the condenser by heat transfer from the surroundings, exterior insulation (such as soil) with a high heat capacity and low thermal conductivity can be used.

The a moisture sorption unit, the moisture harvesting enclosure, and other features of the atmospheric moisture harvester systems described herein are described in further detail below.

FIG. 91 depicts a cross-sectional view of a moisture sorption unit. In this embodiment the moisture sorption unit comprises an active chemical compound pan 1, support walls 2, and a thermal insulation compartment 3. In the particular case of cubic geometry of the moisture sorption unit, the support walls are four side walls installed on a bottom support wall 4 forming a one-sided open cubic enclosure. The support walls are to hold active chemical compound pan at the desired position during the moisture capture and release while it also creates a well-sealed enclosure to eliminate moisture transfer to the thermal insulation. The active chemical compound pan is a tray filled with the active chemical compound where the moisture capture and release take place. The active chemical compound pan is screwed on the upper side of the support walls or it can be permanently glued to the top edge depending on thickness of the support wall.

The increase in the active chemical compound temperature is a factor in the moisture release during irritation period (day time); therefore, any modification to raise the temperature of the active chemical compound enhances the moisture release, and consequently, water delivery. In this regard, the interior bottom surface of the active chemical compound pan, which is in contact with the active chemical compound material, is coated with a high solar absorptive black coating 6 to create a black body absorber, thereby increasing the temperature of the active chemical compound pan during the moisture release. To further increase the temperature of the active chemical compound, the side walls of the active chemical compound pan are covered with reflective materials 5 that reflect most of the solar irradiation to the active chemical compound.

It should be noted that heat loss from the active chemical compound pan increases the condenser temperature which in turn may render the condensation less efficient. To minimize heat loss from the bottom surface of the active chemical compound pan, the thermal insulation compartment is packed with the materials of low thermal conductivity including, but not limited to fiber glass and/or extruded polystyrene foam. Having a high resistance to heat flow, the thermal insulator efficiently minimizes the conductive heat transfer to the condenser during the heating period. The thermal insulator is preferably densely packed to avoid any buoyant air circulation within the moisture sorption unit and minimize the convective heat transfer in the thermal insulation compartment. The support walls are made of non-metallic materials with low thermal conductivity including, but not limited to acrylic, to avoid unfavorable heat conduction to the condenser. The exterior surface of the support walls is coated with a material of low molar absorptivity within the solar radiation spectrum which minimizes the absorption of infrared radiation by the side walls of the moisture sorption unit and assists to maintain the condenser temperature below the dew point.

FIG. 92 depicts a cross-sectional view of a moisture harvesting enclosure. The moisture harvesting enclosure is a compartment comprised of moisture harvesting enclosure walls 8 isolating the moisture sorption unit from the surroundings. The side walls of the moisture harvesting enclosure prevent moisture transfer to/from the surroundings, and participate in heat transfer occurring within the condenser and the pre-cooler airflow passages. The upper side of the moisture harvesting enclosure provides a rigid base for the installation of the cover lid and the solar collector 20. The bottom plate of the moisture harvesting enclosure is attached to the support frame and the tilting mechanism.

Figure 93:
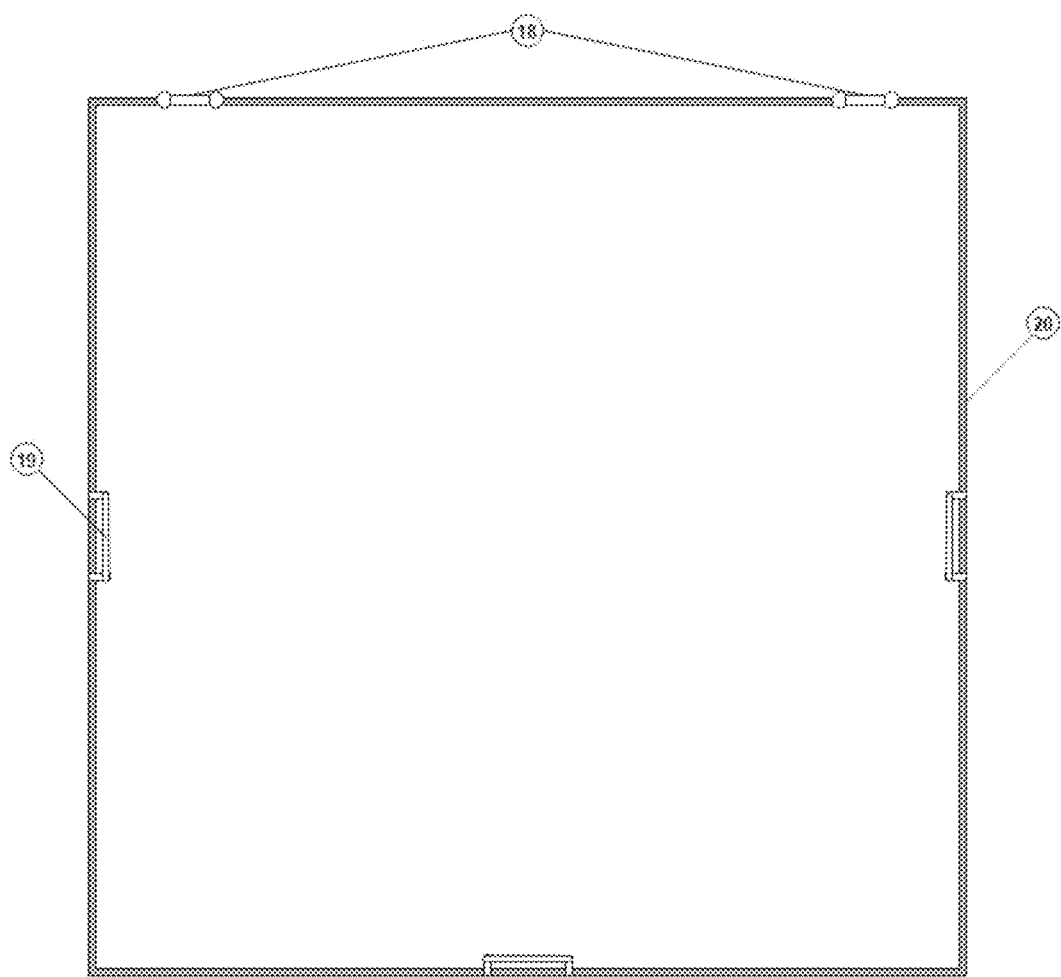
FIG. 93 is a top view of a cover lid of the atmospheric moisture harvester with the condenser and the moisture sorption unit.

In FIG. 93 a cover lid 7 is preferably attached to the top edge of the moisture harvesting enclosure by three latches 19 and two pivot hingers 18 to allow the lid to pivot around the joint. The cover lid is made of a transparent material with high transmissivity and low reflectivity to solar infrared radiation including, but not limited to glass, acrylic, and aerogels. The lower side of the cover lid is equipped with a moisture resistant and water impermeable gasket 20 to eliminate any potential gap between the cover lid and the upper side of the moisture harvesting enclosure and prevent any air leakage.

Pre-cooler airflow passages 9 are airflow channels between the moisture sorption unit and the moisture harvesting enclosure that cool down the air before entering the condenser. Heat transfer between the air and the side walls of the moisture harvesting enclosure within the pre-cooler airflow passages is mainly due to convection, while the rejected heat is conducted to the surroundings through the side walls of the moisture harvesting enclosure. The hydraulic diameter and the length of pre-cooler airflow passages are optimized, based on the size of the moisture harvesting enclosure, to enhance the convective heat transfer. Enhanced cooling can be achieved by increasing the effective surface area for heat transfer 15 employing the extended surface components including, but not limited to cooling coils or heat sinks. It should be noted that in the hot, arid regions, heat dissipation from the side walls to the surroundings is less feasible. In this case, the sidewalls of the moisture harvesting enclosure should be thermally isolated using side-insulations 16 of low thermal conductivity but high heat capacity including but not limited to fiber glass, extruded polystyrene foam, aerogels, soil, cork, rock, slags, and concrete.

In embodiments the condenser 11 is located at the bottom of the moisture harvesting enclosure which is separated from the moisture sorption unit by spacers 10. Moist air flows over the condenser through a narrow channel of adjustable height Enhanced cooling can be achieved by fabricating the condenser from material with high thermal conductivity including but not limited to copper, silver, stainless steel or aluminum which may or may not be coupled with external heat sink 12. Although inserting extended surfaces can efficiently dissipate heat and cool down the condenser below the dew point in most climate zones, a solar-powered fan 14 may be coupled with the heat sink to enhance the heat transfer to the surroundings and facilitate the condensation at arid, hot regions. A solar panel 17 supplies sufficient energy for the solar-powered fan. To reduce the energy consumption of the solar-powered fan and enhance the water delivery performance of the atmospheric moisture harvester, the solar-powered fan can be controlled by a digital feedback control unit 13. The feedback control unit reads analogue data from thermocouples and humidity sensors installed at the top of the active chemical compound pan and on the surface of the condenser. When the temperature of the active chemical compound reaches the desired temperature, the feedback control unit switches the solar-powered fan on to dissipate heat from the extended surface and cool down the condenser below the dew point. During the desorption process, the feedback control unit continuously keeps the condenser temperature below the desired set point by sending on/off output to the solar-powered fan. At arid, hot regions of the world, where the solar-powered fan and an extended cooling surface cannot facilitate sufficient heat dissipation from the condenser, at least one thermoelectric cooler can be installed between the condenser and the solar-powered fan. In this embodiment, the cooling side of the thermoelectric cooler is in direct contact with the outer surface of the condenser, whereas the heating side of the thermoelectric cooler is attached the solar-powered fan. Depending on the cooling load required for condensation, the appropriate solar panel is selected to supply enough power for the solar-powered fan, the feedback control unit, and the thermoelectric cooler. The atmospheric moisture harvester is powered by various sources of energy including but not limited to solar, electrical grid, fossil fuel, and wind The condensed water at the condenser can be collected by a water collecting system. The water collecting system is comprised of: a water trap 27, a release valve 26, a connector 25, and a water storage tank 23. The water trap is a hollow compartment embedded in the lowest part of the moisture harvesting enclosure where water droplets coalesce. The water trap has an outlet which is connected to the water storage tank preferably by a plastic tube and a plastic valve. The water storage tank is a thermally isolated tank with a tap 24 positioned close to the bottom of the water storage tank. Components 23-27 are preferably made of non-corrosive and mold-resistance materials including but limited to polytetrafluoroethylene, fiber glass or flexible foam insulations. The release valve 26 is a plastic on/off valve installed in the connector. It operates in two positions: (i) Opened during water collection, (ii) Closed at any other time. The water storage tank can be modified to prevent possible bacterial contamination by using UV-radiation coupled with solid additives including but not limited to titanium oxide, silver, or copper.

A solar collector 20 is positioned at the upper side of the cover lid which facilitates (i) collection and deflection of solar radiation onto the active chemical compound pan through a solar window during harvesting and (ii) shading of the side walls of the moisture harvesting enclosure, the pre-cooler airflow passages, and the condenser. The solar collector may have a surface of particular geometry, including but not limited to the flat or parabolic. An optical lens with constant focal length can be installed at the solar window to additionally enhance the intensity of the incident solar flux. The upper side of the solar collector exposed to sunlight has an infrared reflective coating; whereas, the backside is coated with a material of low molar absorptivity within the solar radiation spectrum.

All the components of atmospheric moisture harvester are mounted on a portable stand frame 20-21-22-28. The moisture harvesting enclosure is installed onto the frame support bars 21 with wheels 22 attached to the bottom of the frame to allow the apparatus to be transported. To compensate for the reduction in the solar flux due to the variations in the sun altitude throughout a year, a tilting mechanism 20 with an angle indicator 28. This enables tilting of the moisture harvesting enclosure to the desired angle, thus maximizing the incident solar flux. The tilting mechanism can be operated manually or by means of a solar-tracking system that monitors the position of the sun in the sky and repositions the apparatus to maximize the incident solar flux. The solar-tracking system is preferably powered by a photovoltaic solar panel and back-up batteries charged by the same photovoltaic solar panel It should be noted that all or a fraction of the components of atmospheric moisture harvester which are in direct contact with moisture and liquid water may or may not be treated with a hydrophobic coating.

In embodiments operating principles of the atmospheric moisture harvester may include:

Moisture capture (adsorption): moisture capture is a process through which an active chemical compound captures moisture from the surroundings. In embodiments, the moisture capture occurs during the night time, when the ambient temperature is relatively low and the humidity level is relatively high. In embodiments, the moisture capture takes place by opening the cover lid during the night time and allowing moist air from surroundings to naturally circulate within the moisture harvesting enclosure and over the active chemical compound pan. The moisture capture process continues until the morning of the next day when the humidity level of surroundings decreases and the ambient temperature increases. In embodiments, the geometry of the active chemical compound pan is optimized to maximize the exposure surface of the active chemical compound and to ensure that the active chemical compound becomes saturated during a night time (i.e. 10-12 hours). Depending on the target climate zone the atmospheric moisture harvester employs a different active chemical compound (or a mixture of them) with best sorption parameters, including but not limited to the uptake capacity, moisture capture and release kinetics, hydrothermal stability.

Moisture release (desorption): moisture release is a process through which the captured moisture in the active chemical compound is desorbed back to the surroundings by heating the active chemical compound (temperature swing) or by reducing the moisture partial pressure at the vicinity of the active chemical compound (pressure swing). In embodiments, the moisture release takes place by closing the cover lid during the daytime and exposing the active chemical compound pan to the direct solar flux radiation. The solar radiation heats up the active chemical compound and results in the moisture release (temperature swing). In embodiments, enhanced moisture release is achieved by having a small gap between the active chemical compound pan and the cover lid. During the daytime, the air temperature within the small gap increases, and consequently, the moisture partial pressure above the active chemical compound decrease which assists the moisture release (pressure swing). Thus, particular embodiments can implement both pressure and temperature swings simultaneously during the moisture release.

Condensation: condensation is to a process through which the moisture released from the active chemical compound changes its phase from vapor to liquid via heat rejection to the surroundings at constant pressure. In embodiments, the released moisture flows towards the pre-cooler airflow passages due to the buoyant-assisted airflow circulation inside the moisture harvester enclosure. The moist air is cooled down at pre-cooler airflow passages via rejecting heat to the side walls of the moisture harvesting enclosure. The pre-cooled moist air is further cooled down to or below dew point and liquefies at the condenser. Particular embodiments are designed to condense the moisture without using any external source of energy. The enhanced condensation is feasible using additional cooling which can be powered by various sources of energy including but not limited to solar, electrical grid, fossil fuel, and wind.

Water collection: water collection is the process during which the condensed water is collected during the condensation and stored for later consumptions. In embodiments, the collected water flows towards the water storage tank due to gravity-assisted collecting system. The water is further collected for any kind of use by opening the tap attached to the water storage tank.

ENUMERATED EMBODIMENTS

The following enumerated embodiments are representative of some aspects of the invention.

1. An atmospheric moisture harvester system which captures, releases, and condenses moisture from air, and collects liquid water, the system comprising:
    a moisture sorption unit with an active chemical compound operative to capture and release atmospheric moisture using solar energy;
    a moisture harvesting enclosure with airflow passages configured to direct the airflow circulation between the moisture sorption unit and the condenser;
    a condenser operative to generate liquid water from moisture with or without any energy input; and
    a water collecting system operative to collect liquid water from the condenser.

2. A moisture sorption unit comprising an active chemical compound pan configured to perform 1, 2, 3, 4 or 5 functions:
    hold the active chemical compound;
    enhance the heat transfer from solar flux exposure to the active chemical compound;
    increase the contact surface of the active chemical compound for the moisture capture and release;
    provide a space for mass and heat transfer for the active chemical compound; and
    provide confinement for variety of different active chemical compound packings.

3. A moisture sorption unit comprising one or more support walls configured to:
    provide structural support for the active chemical compound pan; and/or
    prevent solar infra-red exposure of a thermal insulation compartment.

4. A moisture sorption unit comprising a thermal insulation compartment configured to perform 1, 2, 3 or 4 functions:
    enhance the structural stability for the active chemical compound pan and the support walls;
    insulate the active chemical compound pan from the support walls;
    prevent the natural convection air circulation within the moisture sorption unit and eliminates the convective heat transfer; and
    prevent the conductive heat transfer from the active chemical compound pan to the support walls, bottom wall, and the condenser.

5. A moisture sorption unit comprising a bottom support plate configured to provide a rigid base for the thermal insulation compartment and the support walls; and/or in combination with the support walls and the active chemical compound pan eliminate the moisture transfer to the thermal insulator.

6. An atmospheric moisture harvester system comprising spacers configured to perform 1, 2, 3 or 4 functions:
    spatially separate the moisture sorption unit from the condenser;
    thermally insulate the moisture sorption unit from the condenser;
    align and secure the position of the moisture sorption unit within the moisture harvesting enclosure; and
    adjust the spacing between the moisture sorption unit and the condenser.

7. A moisture harvesting enclosure comprising one or more side walls configured to perform 1, 2, 3 or 4 functions:
    provides the structural support for the moisture harvesting enclosure;
    prevent solar infra-red exposure the moisture sorption unit and the condenser;
    in combination with the moisture sorption unit create airflow passages for pre-cooling and air circulation; and
    support for the installation of side-insulations.

8. A moisture harvesting enclosure comprising one or more pre-cooler airflow passages configured to perform 1, 2 or 3 functions:

cool the moist air flowing from the active chemical compound pan to the condenser by rejecting heat to the surrounding;

facilitate the buoyant flow between the active chemical compound pan and the condenser; and modulate the temperature gradient between the active chemical compound pan and the condenser.

9. A moisture harvesting enclosure comprising bottom plate configured to perform 1, 2, 3, 4 or 5 functions:

provide a rigid base for the side walls' provide mass transfer from and to the surrounding;

provide a support base for the installation of a condenser;

provide a base for mounting the moisture sorption unit through the spacers; and provide a support base to mount the moisture sorption unit onto a portable stand frame.

10. A moisture harvesting enclosure comprising a condenser configured to perform 1, 2, 3 or 4 functions:

condense moisture released by the active chemical compound;

spatially separated from all components of the moisture sorption unit;

assist the moisture release from the active chemical compound by dehumidification of the moisture harvesting enclosure; and maintain the mass transfer by diffusion within the moisture harvesting enclosure.

11. A subject system or unit or enclosure wherein the active chemical compound comprises a metal-oxide framework (MOF), wherein the MOF metal is selected from zirconium, nickel, iron, copper, manganese and aluminum, and particularly an aluminum-based metal-organic framework, such as MOF-303.

12. An atmospheric moisture harvester system for capturing water from surrounding air, comprising:

a moisture sorption unit comprising:

an insulation compartment containing insulation material, and a tray positioned at the top of the moisture sorption unit, above the insulation compartment, wherein the tray contains water capture material, wherein the water capture material adsorbs moisture from surrounding air during an adsorption phase, and desorbs water vapor during a desorption phase, and wherein the bottom surface of the tray in contact with the water capture material is covered with or made from solar absorptive material, and wherein the side surfaces of the moisture sorption unit are covered with or made from solar reflective material; and a moisture harvesting enclosure with a lid, wherein the moisture sorption unit is positioned inside the moisture harvesting enclosure, and wherein space exists between the moisture sorption unit and the moisture harvesting enclosure, wherein the moisture harvesting enclosure is transparent, wherein the lid, when opened, exposes the water capture material to cold humid surrounding air to adsorb moisture during the adsorption phase, and when closed, heats the water capture material using solar radiation to release water vapor during the desorption phase, and wherein the moisture harvesting enclosure has one or more side walls configured to condense at least a portion of the released water vapor into liquid water during a condensation phase.

13. The system of embodiment 12, wherein the system is buried in the ground, and wherein one or more side walls of the moisture harvesting enclosure are in contact with soil in the ground, and provide surfaces for heat transfer with the soil.

14. An atmospheric moisture harvester system for capturing water from surrounding air, comprising:

a moisture sorption unit comprising:

an insulation compartment containing insulation material, and a tray positioned at the top of the moisture sorption unit, above the insulation compartment, wherein the tray contains water capture material, wherein the water capture material adsorbs moisture from surrounding air during an adsorption phase, and desorbs water vapor during a desorption phase, wherein the bottom surface of the tray in contact with the water capture material is covered with or made from solar absorptive material, and wherein the side surfaces of the moisture sorption unit are covered with or made from solar reflective material;

a moisture harvesting enclosure with a lid, wherein the moisture sorption unit is positioned inside the moisture harvesting enclosure, and wherein space exists between the moisture sorption unit and the moisture harvesting enclosure, wherein the moisture harvesting enclosure is transparent, wherein the lid, when opened, exposes the water capture material to cold humid surrounding air to adsorb moisture during the adsorption phase, and when closed, heats the water capture material using solar radiation to release water vapor during the desorption phase, and wherein the moisture harvesting enclosure is configured to hold the released water vapor upon desorption; and a condenser positioned at the bottom of the moisture harvesting enclosure, separated from the moisture sorption unit, wherein the condenser is configured to condense at least a portion of the released water vapor into liquid water during a condensation phase.

15. The system of embodiment 14, wherein the system is positioned on an incline to maximize exposure to direct sunlight.

16. The system of any one of embodiments 12 to 15, further comprising a water collecting unit configured to collect the liquid water.

17. The system of any one of embodiments 12 to 16, further comprising a reflector attached to the lid of the moisture harvesting enclosure, configured to expose only water capture material in the tray of the moisture sorption unit to solar radiation.

18. The system of any one of embodiments 12 to 17, wherein the insulation compartment is densely packed with the insulation material.

19. The system of any one of embodiments 12 to 18, wherein the insulation material has low thermal conductivity.

20. The system of any one of embodiments 12 to 18, wherein the insulation material comprises fiber glass or polystyrene foam, or a combination thereof.

21. The system of any one of embodiments 12 to 20, wherein the solar absorptive material is a black coating, and the solar reflective material is a white coating.

22. The system of any one of embodiments 12 to 21, wherein the moisture harvesting enclosure has one or more side walls having high thermal capacity.

23. The system of any one of embodiments 12 to 21, wherein the moisture harvesting enclosure has one or more side walls having low thermal conductivity.

24. The system of any one of embodiments 12 to 21, wherein the moisture harvesting enclosure has one or more side walls made from fiber glass, polystyrene foam, aerogel, soil, cork, rock, slag, or concrete, or any combination thereof.

25. The system of any one of embodiments 12 to 24, wherein the water capture material comprises at least one metal-organic framework.

26. The system of any one of embodiments 12 to 25, wherein the water capture material comprises at least one metal-organic framework, wherein each metal-organic framework independently is a porous material comprising secondary building units connected to organic ligands, wherein the secondary building units comprise one or more metals or metal-containing complexes, and the organic ligands comprise acid functional groups, amine functional group, or any combination thereof.

27. The system of embodiment 26, wherein the organic ligands comprise carboxylic acid groups.

28. The system of any one of embodiments 12 to 27, wherein each metal-organic framework independently has a pore sizes between about 0.5 nm about 1 nm.

29. The system of any one of embodiments 12 to 28, wherein each metal-organic framework independently has a hydrophilic pore structure.

30. The system of any one of embodiments 12 to 20, wherein each metal-organic framework independently has a hydrophilic pore structure comprising acid functional groups, amine functional group, or any combination thereof.

31. The system of any one of embodiments 12 to 30, wherein each metal-organic framework independently has 1D channels that allow for reversible water adsorption.

32. The system of any one of embodiments 12 to 31, further comprising at least one solar panel configured to provide energy to the system.

33. The system of any one of embodiments 12 to 32, further comprising at least one fan configured to cool down the bottom of the moisture harvesting enclosure and speed up condensation.

34. The system of any one of embodiments 12 to 31, wherein the atmospheric moisture harvester system is a completely passive system.

35. A method of harvesting water from surrounding air using an atmospheric moisture harvester system of any one of embodiments 12 to 34, the method comprising:
opening the lid of the moisture harvesting enclosure during night time, thereby allowing the water capture material to adsorb moisture from surrounding air; and
closing the lid of the moisture harvesting enclosure during the following day time, thereby heating the water capture material using solar radiation, releasing water vapor from the heated water capture material, and condensing the released water vapor on one or more side walls of the moisture harvesting enclosure, or using a condenser, to produce liquid water.

36. A method of harvesting water from surrounding air using an atmospheric moisture harvester system, the method comprising:
saturating water capture material with moisture from cold humid surrounding air during night time by adsorption,
wherein the water capture material is contained in a tray positioned at the top of a moisture sorption unit, above an insulation compartment in the moisture sorption unit, and
wherein the moisture sorption unit is positioned inside a moisture harvesting enclosure with a lid, wherein the lid is opened during the night time;
heating the water capture material using solar radiation during the following day time and releasing water vapor from the water capture material, wherein the lid of the moisture harvesting enclosure is closed during the day time; and
condensing the released water vapor on one or more side walls of the moisture harvesting enclosure, or using a condenser, to produce liquid water.

37. The method of embodiment 35 or 36, further comprising collecting the liquid water.

38. The method of any one of embodiments 35 to 37, wherein the water capture material comprises at least one metal-organic framework.

39. The method of any one of embodiments 35 to 38, wherein the atmospheric moisture harvester system is positioned in the ground, and wherein the condensing of the released water vapor on one or more side walls of the moisture harvesting enclosure to produce liquid water releases heat to the ground.

40. The method of any one of embodiments 35 to 39, wherein the released water vapor is condensed using a condenser.

41. The method of embodiment 40, further comprising cooling the released water vapor using at least one fan to speed up condensation.

42. The method of any one of embodiments 35 to 39, wherein the atmospheric moisture harvester system is a completely passive system.

EXAMPLES

The following Examples are merely illustrative and are not meant to limit any aspects of the present disclosure in any way.

Example 1

Practical Water Production from Desert Air

Energy-efficient production of water from desert air has not been developed. A proof-of-concept device for harvesting water at low relative humidity was reported; however, it used external cooling and was not desert-tested. Here, we report a laboratory-to-desert experiment where a prototype employing up to 1.2 kg of metal-organic framework-801 was tested in the laboratory and later in the desert of Arizona, United States. It produced 100 grams of water per kilogram of MOF-801 per day-and-night cycle, using only ambient cooling and natural sunlight as a source of energy. We also report an aluminum-based MOF-303, which delivers more than twice the amount of water. The desert experiment uncovered key parameters pertaining to the energy, material, and air requirements for efficient production of water from desert air.

About thirteen sextillion ($10^{21}$) liters of water exist in the atmosphere at any given time (1). This is a recyclable natural resource with potential to water the arid regions of the world. Methods to harvest water from humid air are known (2-6), but doing so at low humidity in desert climates is as yet undeveloped (7). The difficulty in establishing a practical water harvesting cycle (WHC, FIG. 91) for low humidity climates is two-fold: finding a material capable of facile water capture and release (capture cycle), and providing sufficient cooling energy such that the temperature of the condenser is lower than that of the released water vapor to allow for liquid water formation (collecting cycle). Although the two cycles have been shown to work with intensive energy input (8), it remains unknown whether they can produce water under ambient cooling with energy only from natural sunlight.

Water uptake in metal-organic frameworks (MOFs) has been reported (7, 9-14), and a recent proof-of-concept device based on these materials showed encouraging results (15). However, this device (1) employed an additional source of cooling, (2) yielded water droplets but not of sufficient quantity to be collected, (3) required a copper mesh to provide structural rigidity and heat transfer, and (4) was not tested in the desert. In order to bring this advance into practice, here we address all these issues in a new design tested in the laboratory and the desert of Arizona, United States. This laboratory-to-desert study uncovered critical parameters concerning the interplay between water release, condensation, and material properties, and consequently led to water production under ambient cooling and natural sunlight, with no additional energy input. We show that 0.550 kg of MOF-801 can be implemented into a device to produce up to 78 g of water per day-and-night cycle in laboratory conditions and 55 g in Arizona under ambient cooling and natural sunlight at 5 to 40% of relative humidity (RH). In addition, 0.450 kg of our newly designed MOF-303 produced up to 105 g of water, thus bringing water production at low humidity a step closer to practical use.

Our considerations in the design of the water production system took into account the energy, materials, and air requirements for the WHC. FIG. 91A shows that the capture cycle starts with saturation of unsaturated MOF upon exposure to desert air at night time. This is followed by the release of captured water from the saturated MOF upon exposure to sunlight during day time. The collecting cycle takes place during day time when the released water vapor humidifies the air in the vicinity of the MOF. The hot humid air is subsequently cooled down, in our case by ambient cooling, to its dew point resulting in liquefied water at the condenser. The collecting cycle (release-condensation) continues until the end of the day time when the liquid water is collected and the next WHC starts.

The saturation of the MOF is determined by the extent to which water fills the pores. This quantity is the water capture capacity ($\omega_{cap}$: captured water per mass of MOF) at a given RH and it can be estimated from the water adsorption isotherm. Large values of $\omega_{cap}$ at low RH can be achieved in hydrolytically stable MOFs with large pore volumes and hydrophilic pore environments. In addition to the MOF's sorption properties, a design optimizing the packing porosity is needed to enhance the intercrystalline diffusion, and reach $\omega_{cap}$ within the 14-16 hours of night time (16).

The energy absorbed by the MOF is spent on three different processes: overcoming the MOF-water interactions ($q_{H,latent}=\omega_{cap}q_{st}$), increasing the temperature of the MOF ($q_{H,sensible}$), and dissipating due to heat loss ($q_{H,loss}$). Considering $q_{H,sensible} \ll q_{H,latent}$ for MOFs and $q_{H,loss} \ll q_{H,sensible}$ for a thermally insulated adsorbent container, the majority of the absorbed energy is spent on breaking the MOF-water interactions to release water, and therefore, a MOF with low isosteric heat of adsorption ($q_{st}$) is desirable. A practical capture cycle with maximized water release should follow inequality 1, where we consider the minimum solar energy ($q_{H,min}$) that allows the release of the entire amount of captured water (section S9) (16).

The performance of the capture cycle can be evaluated by the release efficiency ($\eta_R$), eq. 2, where $m_{released}$ and $m_{captured}$ are the absolute mass of released and captured water, respectively, and $\omega_{rel}$ is the mass of released water per unit mass of MOF ($\omega_{rel} \leq \omega_{cap}$). For a specific $\omega_{cap}$, a maximum release efficiency can be achieved by using a MOF with high solar absorptivity, high thermal conductivity, small heat capacity, and sorbent containment with maximized surface to volume ratio. The release of water from the MOF at elevated temperatures should be significantly faster than the capture from desert air due to the limited timeframe of the sunlight exposure.

$$q_{H,min} > \omega_{cap} q_{st} \tag{1}$$

$$\eta_R = \frac{m_{released}}{m_{captured}} = \frac{\omega_{rel}}{\omega_{cap}} \tag{2}$$

The cooling energy required to condense the water vapor released from the MOF is spent on three processes: decreasing the temperature of the air and released water vapor ($q_{C,sensible}$) dewing ($q_{C,latent}=\omega_{cap}h_{fg}$), and dissipating due to heat loss ($q_{C,loss}$). Taking into account the large value of the specific heat of phase change ($h_{fg}$) (i.e. enthalpy of condensation) for water, the majority of cooling energy is spent on condensation rather than sensible cooling ($q_{C,sensible} \ll q_{C,latent}$). A practical collecting cycle with adequate cooling capacity should satisfy the following criterion:

$$q_{C,min} > \omega_{cap} h_{fg} \tag{3}$$

Inequality 3 states that any design for atmospheric water production should consider a minimum $q_{C,min}$ that theoretically allows for the condensation of the entire amount of released water. The performance of the collecting cycle is evaluated by the collecting efficiency ($\eta_C$), $$\eta_C = \frac{m_{collected}}{\omega_{rel} m_{MOF}} \tag{4}$$

where $m_{collected}$ and $m_{MOF}$ are the mass of collected water and MOF, respectively.

The main challenge for water production in a desert climate is to maintain the condenser temperature below the dew point using only ambient cooling. This is possible by using an efficient condenser with a large cooling surface and enhanced convective heat and mass transfer. There is a theoretical maximum volume for the condenser beyond which the air saturation is not possible (section S9) (16).

The overall efficiency of the WHC is given by the harvesting efficiency ($\eta_{WHC}$) defined as:

$$\eta_{WHC} = \frac{m_{collected}}{\omega_{cap} m_{MOF}} - \eta_a \eta_c \tag{5}$$

According to eq. 5, highly-efficient water production is only possible if the amount of water released from the MOF equals the captured amount ($\eta_R \to 1$) and if all the released water is condensed ($\eta_C \to 1$).

Based on this WHC and the considerations discussed above, a water harvesting system was designed using initially MOF-801 as the sorbent. MOF-801 was chosen for several reasons: (a) high hydrolytic stability, (b) well studied water sorption behavior, (c) good cycling stability, (d) low energy requirements for regeneration, and (e) a sorption isotherm that satisfies all mentioned prerequisites for practical water production (7) (FIG. 92A). Like most MOFs, MOF-801 shows low absorptivity in the infra-red (IR) and near-IR region, low thermal conductivity (17), and high heat capacity (18) reducing direct heating using solar thermal energy. Hence, MOF-801 was blended with 33 wt % of non-porous graphite (termed MOF-801/G), to enhance its thermophysical and absorptive properties. The water harvester includes two main components, a water sorption unit which holds the MOF, and the case which encloses it (FIG. 92B). The water sorption unit is designed to retain up to 2945 cm$^3$ of sorbent, equaling 1.2 kg of MOF-801 (1.65 kg of MOF-801/G) assuming a packing porosity of 0.7—the ideal value for moisture transfer (15). The geometry of the sorbent containment was chosen to facilitate a large surface to volume ratio (>0.5) of the MOF. In our original proof-of-concept design (15), we demonstrated that heating MOF-801 to 65° C. at 10% RH is sufficient for water release, however, under these conditions the condenser temperature should be below 20° C. to achieve condensation. This significant temperature gradient is created by designing the water sorption unit to act as a thermal insulator, capable of maintaining a low condenser temperature while heating the MOF. Solar thermal incalescence of the water sorption unit itself was minimized by applying an IR reflective coating to all exposed surfaces. The cubic case has a cover and encloses the water sorption unit (FIG. 92B). The side walls of the case act as the condenser and provide surfaces for heat transfer with the surroundings. The case can be opened or closed for saturation during the night and release-condensation during the day. Finally, a reflector is attached to the cover to ensure that only the surface of the MOF is exposed to solar radiation. Temperature and humidity sensors were placed at the surface of and in the MOF powder, bottom of the case, and condenser. The data recorded with these sensors and discussed below enable the calculations of the release, collecting, and WHC efficiencies.

In a typical laboratory experiment, the sorbent was saturated overnight (RH=30-50%, 18-25° C., 16.5 h). After saturation, the case was sealed and exposed to artificial light (2700 K). Data were collected under low (558 W m$^{-2}$) and high radiant fluxes (792 W m$^{-2}$), representing the average solar irradiance over the course of one day and the peak solar irradiance in desert regions such as Arizona (33° N, 111° W), respectively. After 7.5 hours, the experiment was terminated, and liquid water was collected.

Initial experiments were performed using 1.65 kg of MOF-801/G under low and high radiant fluxes. While maintaining the condenser temperature at 20° C., the formation of fog on the condenser was observed after approximately 30 minutes (FIG. 93A). Formation of water droplets that subsequently coalesced into larger puddles occurred 2-3 hours into the experiment (see supplementary movies S1-S4) (16). Water production with low and high radiant fluxes yielded 25 and 56 g of water, respectively. Using the humidity and temperature measurements, the efficiencies were found to be $\eta_R$=39% and 76%, $\eta_C$=30% and 43%, and $\eta_{WHC}$=12% and 33%, for low and high fluxes, respectively. The low collecting efficiency suggests a mismatch between the amount of released water and the cooling capacity of the condenser (i.e. mismatch between the capture and collecting cycles). This issue was addressed by performing identical experiments using a half loading of MOF-801/G (0.825 kg). Remarkably, even though a smaller amount of sorbent was used, larger quantities of water were collected (37 and 78 g of water for low and high fluxes, respectively), leading to increased efficiencies of $\eta_R$=44% and 86%, $\eta_C$=93% and 92%, $\eta_{WHC}$=41% and 79%, respectively. These major enhancements are attributed to improved water release ($\omega_{rel} \rightarrow \omega_{cap}$) due to a larger surface to volume ratio (~1), and faster energy transfer within the MOF resulting in a longer effective condensation time (section S9) (16). While using even smaller amounts of MOF-801/G resulted in further improvement of $\eta_C$ and $\eta_{WHC}$, the absolute yield of water decreased. Therefore, employing 0.825 kg of MOF-801/G provided us with a well-balanced water harvester with high values for $\eta_R$ and $\eta_C$ as well as a high nominal water yield that should be capable of operating under ambient cooling and on solar thermal energy solely (as in the desert). The chemical analysis of the produced water indicated the absence of contaminations originating from dissolution of the MOF for all experiments (section S11) (16).

We then transferred this device to Scottsdale, Ariz. in late October 2017 to study its performance in desert conditions: as low as 5% RH at 35-40° C. during the day and up to 40% RH at 10-15° C. during the night and to validate the water harvesting principles discussed above (FIG. 93B). Initial experiments using the water harvester under desert conditions, however, were unsuccessful and did not yield liquid water. The high ambient temperatures during the day resulted in dramatically increased condenser temperatures (42° C.) lowering the temperature difference between the MOF and the condenser to approximately 30° C., hampering condensation (RH<88% at the condenser). In order to circumvent warming of the condenser by heat transfer from the surroundings, exterior insulation (soil) with a high heat capacity and low thermal conductivity was used (20). This modification facilitated a significant reduction of the condenser temperature by 10° C. and resulted in 94% RH at the condenser. Consequently, the formation of fog was observed, but the temperature difference between the MOF and the condenser (40° C.) still was not sufficient to reach the higher humidity ratio required to condense larger quantities of water. More solar energy was needed to further increase the temperature difference between the MOF and the condenser. During October, the altitude of the sun at Scottsdale (DMS Lat: 33° 30' 4.7664" N, DMS Long: 111° 55' 31.0008" W) varies between 20° in the morning and late afternoon (9 am and 4 pm), and 45° at midday (21). Thus, the water harvester was mounted on a stand and tilted by 37° to maximize the solar energy absorbed by the MOF. With this modification, MOF temperatures similar to those recorded under laboratory conditions could be reproduced and indeed, after 7 hours, liquid water was collected. More absorbed solar energy allowed for faster water release, as indicated by an instantaneous rise of RH at the condenser, which in combination with the delayed heating of the condenser itself, facilitated condensation (FIG. 93B). Using 0.825 kg of MOF-801/G, 55 g of water were collected, a value between those obtained under laboratory conditions for low flux (37 g) and high flux (78 g). This is in good agreement with the corresponding temperature and RH profiles as shown in FIG. 93C.

To bring this development closer to practical use, we sought to make MOFs with enhanced water sorption properties potentially meeting the specification of industrial large-scale production. We developed the synthesis of next generation material MOF-303 [Al(OH)(HPDC): where HPDC=1H-pyrazole-3,5-dicarboxylate], employing aluminum instead of zirconium as the metal and using water instead of organic solvents. It has a new structure based on the xhh topology and is built from infinite Al(OH)(—COO)$_2$ SBUs linked through HPDC linkers (FIG. 94A) (22). The structure of MOF-303 features hydrophilic 1D pores with 6 Å diameter and a free pore volume of 0.54 cm$^3$ g$^{-1}$ facilitating a large maximum water capture capacity of 0.48 g g$^{-1}$. The water sorption isotherm satisfies all prerequisites for a high-performance water harvesting material outlined earlier: The Type IV isotherm has an inflection point at P/P$_0$=0.15, a plateau is reached at P/P$_0$=0.3, and good temperature response and minimal hysteresis are observed (FIG. 94B). Despite the larger $\omega_{cap}$ for MOF-303, both criteria are satisfied for $q_{H,min}$ and $q_{C,min}$ for operating conditions found in Arizona (RH at night, ambient temperature, and solar flux), thus making the present water harvester suitable for MOF-303. Similar to MOF-801, the thermophysical and absorptive properties of MOF-303 were enhanced by blending it with 33 wt % of non-porous graphite (termed MOF-303/G). MOF-303/G was tested under the same laboratory conditions described above and found to give a dramatic increase of 114% in water production (section S9) (16).

Ultimately, the performance of a sorbent according to the WHC is defined by the productivity P (in g kg$^{-1}$):

$$P = \frac{m_{collected}}{m_{sorbent}} \quad (6)$$

where $m_{sorbent}$ is the amount of sorbent used (in kg). This parameter is useful in comparing the performance of various materials under identical conditions within the same water harvester. Zeolite 13X was chosen as a reference since it is a common microporous desiccant with a pore size and pore volume similar to those of MOF-801 and MOF-303. FIG. 94C shows the comparison of productivities calculated for zeolite 13X, MOF-801/G, and MOF-303/G. This comparison is striking evidence, that the unique water sorption behavior of MOFs is key to water production from desert air under ambient cooling and solely driven by solar thermal energy. The ultra-high productivity of MOF-303/G of up to 175 g$_{water}$ kg$^{-1}$ $_{MOF}$ is encouraging in achieving practical water production from desert air.

The disclosed criteria governing energy, materials, and air requirements for practical production of water from desert air as outlined in this report should be applicable to various regions of the world.

Section S1. Materials and Analytical Techniques for MOF Synthesis and Analysis

Section S1.1. Materials

Zirconium oxychloride octahydrate (ZrOCl$_2$.8H$_2$O, purity≥99.8%), aluminum chloride hexahydrate (AlCl$_3$.6H$_2$O, purity≥99.8%), N,N-dimethylformamide (DMF) (HPLC grade), fumaric acid (purity≥99%), 3,5-pyrazoledicarboxylic acid monohydrate (H$_3$PDC) (purity≥97%), Zeolite 13X, sodium hydroxide were purchased form Sigma-Aldrich Co. Anhydrous DMF and formic acid (purity≥99.8%) were obtained from EMD Millipore Chemicals. Extra-fine graphite powder was obtained from AGS Company. Methanol (HPLC grade) was purchased from Fisher Scientific. Deuterated solvents were obtained from Cambridge Isotope Laboratories. All chemicals obtained were used without further purification. Pyrex screw-capped media storage jars were used for synthesis, solvent exchange and storage.

Section S1.2. Analytical Techniques

Powder X-ray diffraction (PXRD) patterns were acquired with a Bruker D8 Advance diffractometer (Göbel-mirror monochromated Cu Kα1 radiation, λ=1.54056 Å). Single crystal X-ray diffraction (SXRD) data of MOF-303 was collected using as-synthesized crystals at beamline 11.3.1 of the Advanced Light Source at Lawrence Berkeley National Lab. N$_2$ adsorption isotherms were recorded on a Quantachrome Quadrasorb-SI volumetric gas adsorption analyzer. A liquid nitrogen bath was used for the measurements at 77 K. The framework density of all MOF and MOF/G samples was measured using a pycnometer (Ultrapyc 1200e, Quantachrome). Attenuated-total-reflectance Fourier-transform infrared (ATR-FTIR) spectra were recorded on a Bruker ALPHA Platinum ATR-FTIR Spectrometer. Thermogravimetric analysis (TGA) traces was measured on a TA Instruments SDT Q600 series thermal gravimetric analyze. Gases were humidified by bubbling dry air through a 2 L bubbler humidifier before advection into the TGA chamber. The humidity and temperature were monitored using high-accuracy thermocouples and humidity sensors upstream the TGA chamber. Water isotherms and cyclic stability test were measured on a BEL Japan BELSORP-aqua3, and the water uptake estimated in cubic centimeters per gram. Prior to the water adsorption measurements, water (analyte) was flash frozen under liquid nitrogen and then evacuated under dynamic vacuum for at least three times to remove any gases in the water reservoir. The measurement temperature was controlled using a water circulator. Helium was used to estimate the dead space for both, gas and water adsorption measurements. Ultrahigh purity N$_2$, and He (Praxair, 99.999% purity) were used throughout all experiments. Scanning electron microscope (SEM) and energy-dispersive X-ray spectroscopy (EDS) images were recorded on a FEI Quanta 3D scanning electron microscope with 10 kV accelerating voltage. $^1$H-NMR spectra were recorded with a Bruker DRX-500 spectrometer operating at 500 MHz. The aluminum and zirconium content in samples of harvested water were analyzed using an ICP-AES spectroscope (Optima 7000 DV, Perkin Elmer). Diffuse reflectance spectra between 285 and 2500 nm were recorded on a Varian Cary 5000 spectrometer and absorption spectra between 285 and 3000 nm were recorded using a Shimadzu UV3600.

Section S2. MOF-801 Synthesis and Characterization

Section S2.1. Synthesis of MOF-801 Microcrystalline Powder

Pre-scaled-up synthesis of MOF-801, Zr$_6$O$_4$(OH)$_4$(fumarate)$_6$: In a 100 mL screw-capped jar, 1.16 g (50 mmol) of fumaric acid and 3.2 g (50 mmol) of ZrOCl$_2$.8H$_2$O were dissolved in a mixed solvent of DMF and formic acid (40 mL and 14 mL, respectively). The mixture was then heated in an isothermal oven at 130° C. for 10 hours to give as-prepared MOF-801 as a white precipitate. The precipitate was collected by filtration using a membrane filter (45 μm pore size), washed three times daily with 100 mL DMF for three days, then three times daily with 100 mL methanol for three days, and subsequently dried in air. The air-dried MOF sample was transferred to a vacuum chamber. The chamber was first evacuated at room temperature for 5 hours until the pressure dropped below 1 kPa. After that, the sample was heated in vacuum at 70° C. for 12 hours, and then at 150° C. for another 48 hours yielding activated MOF-801 as a white powder (yield: 2 g). This batch was further used to determine the water sorption characteristic curves and TGA kinetics for adsorption and desorption.

Scaled-Up Synthesis:

In a typical procedure in a 500 mL screw-capped jar, 5.8 g (50 mmol) of fumaric acid and 16 g (50 mmol) of ZrOCl$_2$.8H$_2$O were dissolved in a mixed solvent of DMF and formic acid (200 mL and 70 mL, respectively). The mixture was then heated in an isothermal oven at 130° C. overnight to give as-prepared MOF-801 as a white precipitate. Yield: ~10 g. The combined precipitate from five reaction jars was collected, washed three times daily with 500 mL DMF for three days, then three times daily with 500 mL methanol for three days, and subsequently dried in air.

Section S2.2. MOF-801 Scaled-Up Activation

Air-dried MOF sample was transferred into a vacuum chamber. The chamber was first evacuated at room temperature for 5 hours until the pressure dropped below 1 kPa. After that, the sample was heated in vacuum at 70° C. for 12 hours, and then at 150° C. for another 48 hours. The combined product from 140 jars was then placed in the drying oven on an aluminum pan at 160° C. for 10 days prior to the water production experiment. Overall, the yield of activated microcrystalline MOF-801 powder was 1100 g.

Section S2.3. Characterization of Activated MOF-801

PXRD, EDS analysis, and SEM images: Activated microcrystalline MOF-801 was examined by PXRD. A ground sample was placed on a zero-background sample holder and mounted on the diffractometer. The data was collected from 3 to 50 degrees with a step width of 0.01 and total data collection time of 30 minutes. SEM and EDS measurements were performed to study the morphology and elemental composition of bulk MOF powder.

Porosity and packing density analysis: A 35 mg sample was taken from 1100 g of well-mixed activated microcrystalline powder MOF-801 and transferred into a 9 mm bulb gas cell and charged with $N_2$ to avoid air contamination, then the cell was mounted on the instrument. 26 adsorption and 11 desorption points were collected.

The powder particle density ($\rho_p$) of activated MOF-801 was estimated to be 1.401 g cm$^{-3}$ from the pycnometer measurement (the framework density $\rho_s$=2.3116±0.0075 g cm$^{-3}$) and BET pore volume measurements ($V_p$=0.2810 cm$^3$ g$^{-1}$) (Eqn. S1).

$$\rho_p = \frac{1}{\left(V_p + \frac{1}{\rho_s}\right)} \quad (S1)$$

Section S2.4. Evaluation of Water Capacity Properties

A 34 mg sample was taken from an activated pre-scaled-up batch of MOF-801 and transferred to a 9 mm bulb gas cell and charged with $N_2$ to avoid air contamination, then the cell was mounted on the instrument. The temperature of the adsorbent was controlled using a water bath.

Characteristic Curves and Isosteric Heat of Adsorption of Activated MOF-801:

The characteristic A-W water sorption curves were estimated using the Polanyi adsorption potential theory (Eqns. S2,3), $$A = RT \ln \frac{p_0(T)}{p} \quad (S2)$$

$$W = \frac{q(p, T)}{\rho_{liq}^{wf}(T)} \quad (S3)$$

where A is the molar Gibbs free energy of adsorption, $p_0$ is the temperature-dependent vapor pressure of water, W is the volume liquid adsorbed, q is the mass adsorbed, and $\rho_{liq}^{wf}$ is the liquid density of water.

The isosteric heat of adsorption was estimated using the Clausius-Clapeyron relation.

Section S3. MOF-801/G Preparation and Characterization

Section S3.1. Preparation of the Mixture 1100 g of activated scaled-up microcrystalline MOF-801 powder was mixed with 550 g of graphite powder in the 2 L jar to produce 1650 g of 67:33 wt % MOF-801-graphite mixture, termed MOF-801/G. The resulting mixture was thoroughly mixed by shaking the jar until the MOF/G powder had a homogenous gray color. Aggregation of MOF-801 powder into large particles was observed, these aggregates were crushed using a spatula and remixed. The resulting mixture was further characterized in terms of crystallinity, powder density, porosity and water uptake properties without any additional activation.

Section S3.2. Characterization of MOF-801/G

PXRD of Graphite, and PXRD, EDS Analysis, and SEM Images of Activated MOF-801/G:

Commercially available graphite powder was used for PXRD experiment without any modifications. A powder sample was placed on a zero-background sample holder and mounted on the diffractometer. The data was collected from 3 to 50 degrees with a step width of 0.01 and a total data collection time of 30 minutes. SEM and EDS images were taken to study the morphology and elemental composition of bulk MOF-801/G powder.

Porosity and Packing Density Analysis:

Due to the extremely low porosity of the graphite used in this work, the measurement of its $N_2$ isotherm at 77 K was complicated by large instrumental errors. Therefore, $N_2$ isotherms of pure graphite are not shown.

78 mg of well-mixed activated MOF-801/G were transferred to a 9 mm bulb gas cell and charged with $N_2$ to avoid air contamination, then the cell was mounted on the instrument. 26 adsorption and 11 desorption points were collected.

The expected BET surface area for the MOF-801/G was determined by multiplying the surface area of pure MOF-801 with the ratio of MOF within the mixture: 582 mg$^{-1}$×67 wt %=389 m$^2$ g$^{-1}$ The powder particle density ($\rho_p$) of activated MOF-801/G was estimated to be 1.552 g cm$^{-3}$ from the pycnometer measurement (framework density $\rho_s$=2.2822±0.0105 g cm$^{-3}$) and BET pore volume measurements ($V_p$=0.2060 cm$^3$ g$^{-1}$) (Eqn. S1). The expected powder particle density was calculated as follows:

$$\rho_{MOF-801/G} = \frac{m_{MOF-801/G}}{\frac{m_{MOF-801}}{\rho_{MOF-801}} + \frac{m_{graphite}}{\rho_{graphite}}} = \frac{1650 \text{ g}}{\frac{1100 \text{ g}}{1.401 \text{ g cm}^{-3}} + \frac{550 \text{ g}}{2.16 \text{ g cm}^{-3}}} = 1.587 \text{ g cm}^{-3}$$

Section S3.3 Evaluation of Water Sorption Properties

A 78 mg sample of activated MOF-801/G was transferred to a 9 mm bulb gas cell and charged with $N_2$ to avoid air contamination. Subsequently the cell was mounted on the instrument.

Section S4. MOF-303 Synthesis and Characterization

Section S4.1. Synthesis of Microcrystalline MOF-303 Powder

MOF-303, AhOH)(HPDC)($H_2O$):

10.4 g Aluminum chloride hexahydrate (AlCl$_3$. 6H$_2$O, 43.08 mmol) and 7.5 g 3,5-pyrazoledicarboxylic acid monohydrate (H$_3$PDC, 43.08 mmol) were dissolved in 720 mL water in a 1 L glass jar, 30 mL aqueous NaOH (2.6 g, 65 mmol) were added dropwise to the above mixture under stifling. The jar was then sealed and heated in a 100° C.

isothermal oven for 24 h. (Yield: 3.0 g, 35% based on the linker). Single crystals suitable for X-ray diffraction study were prepared by combining 0.6 mmol $AlCl_3 \cdot 6H_2O$, 0.6 mmol $H_3PDC$, and 0.7 mmol NaOH in 4 mL $H_2O$. The resulting mixture was sealed in a 23 mL autoclave and placed in a 100° C. isothermal oven for 7 days, EA: Calcd. for $Al(OH)(C_5H_2O_4N_2)(H_2O)$: C, 27.79; H, 2.33; N, 12.96%. Found: C, 27.62; H, 2.26; N, 12.74%. ATR-FTIR (4000-400 $cm^{-1}$): 1667 (w), 1601 (s), 1525 (m), 1482 (w), 1440 (m), 1386 (s), 1193 (m), 1106 (m), 998 (s), 848 (w), 791 (s), 588 (br), 456 (s), 422 (w).

Section S4.2. MOF-303 Activation

The white crystalline as-synthesized MOF-303 powder was collected by filtration and washed three times daily with water for three days, then with methanol three times daily for three days, and was then filtered and dried in air. The air-dried MOF sample was evacuated at room temperature until the pressure dropped below 1 kPa. After that, the sample was heated in vacuum at 100° C. for 24 hours, and then at 150° C. for another 48 hours. The combined MOF powder from 150 jars was then placed on an aluminum pan and transferred into a drying oven and heated at 160° C. for 10 days prior to the characterization. Overall, 450 g of activated microcrystalline MOF-303 powder were prepared.

Section S4.3. Characterization of Single Crystal and Microcrystalline Powder MOF-303

Single Crystal X-Ray Diffraction Analysis:

Single crystal X-ray diffraction data were collected for a colorless plate-shaped (20 μm×20 μm×10 μm) crystal of as-synthesized MOF at beamline 11.3.1 of the ALS at LBNL, equipped with a Bruker Photon 100 CMOS area detector using synchrotron radiation (10-17 KeV), at 0.7749 Å. The crystal was mounted on a MiTeGen® kapton loop and placed under a 100 (2) K nitrogen cold stream. Data were processed using the Bruker APEX2 software package (23), integrated using SAINT v8.34A and corrected for the absorption by SADABS routines (no correction was made for extinction or decay). The structures were solved by intrinsic phasing (SHELXT) and refined by full-matrix least squares on $F^2$ (SHELXL-2014) (24). Atomic positions of MOF-303 were obtained from the single crystal data, but the anisotropic refinement remains unstable due to the poor diffraction of the crystals. Based on the structural model obtained from single-crystal data, the structure was refined using Materials Studio (25). Selected crystal data and atomic position are given in Tables 1,2.

TABLE 1

Crystal data and structure determination for MOF-303 with single crystal data set.

| Compound | MOF-303 |
|---|---|
| Chemical formula | $C_{20}H_{12}O_{20}N_8Al_4$ |
| Formula mass | 792.30 |
| Crystal system | monoclinic |
| Space group | $P2_1$ |
| λ (Å) | 0.7749(1) |
| a (Å) | 12.2714(16) |
| b (Å) | 14.572(2) |
| c (Å) | 14.253(2) |
| β (°) | 101.787(10) |
| Z | 4 |
| V (Å$^3$) | 2495.0(6) |
| Temperature (K) | 100(2) |
| Size (mm$^3$) | 0.01 × 0.02 × 0.02 |
| Density (g cm$^{-3}$) | 1.159 |
| Measured reflections | 16277 |
| Unique reflections | 3425 |

TABLE 1-continued

Crystal data and structure determination for MOF-303 with single crystal data set.

| Compound | MOF-303 |
|---|---|
| Parameters | 209 |
| Restraints | 1 |
| $R_{int}$ | 0.172 |
| θrange (°) | 2.2-19.7 |
| $R_1$, $wR_2$ | 0.2948 0.6525 |
| S (GOF) | 2.86 |
| Max/min res. dens. (e Å$^{-3}$) | 2.32/−1.38 |

TABLE 2

Atomic position for MOF-303.

| Atom name | Atom | x (Å) | y (Å) | z (Å) |
|---|---|---|---|---|
| Al1 | Al | −0.00243 | 0.41469 | 0.74813 |
| Al2 | Al | 0.49625 | 0.41439 | 0.74514 |
| Al3 | Al | 0.26243 | 0.46067 | 0.79831 |
| O4 | O | 0.14242 | 0.39130 | 0.77253 |
| Al5 | Al | 0.73363 | 0.36826 | 0.69695 |
| O6 | O | 0.64280 | 0.39304 | 0.77108 |
| N7 | N | 0.63103 | 0.57786 | 0.46522 |
| C8 | C | 0.08029 | 0.71742 | 0.45927 |
| O9 | O | 0.02015 | 0.49609 | 0.84146 |
| O10 | O | 0.36228 | 0.53847 | 0.86748 |
| O11 | O | 0.50537 | 0.49519 | 0.65257 |
| O12 | O | 0.63221 | 0.30151 | 0.61047 |
| O13 | O | 0.20775 | 0.79466 | 0.37909 |
| O14 | O | 0.98027 | 0.32794 | 0.83132 |
| O15 | O | 0.52346 | 0.51000 | 0.82601 |
| O16 | O | 0.67389 | 0.87044 | 1.12374 |
| O17 | O | 0.79448 | 0.29297 | 0.79429 |
| O18 | O | 0.20004 | 0.53322 | 0.69906 |
| O19 | O | 0.20512 | 0.52925 | 0.87933 |
| O20 | O | 0.67157 | 0.46025 | 0.62059 |
| C21 | C | 0.57351 | 0.74623 | 1.03939 |
| O22 | O | 0.51176 | 0.83355 | 1.16120 |
| O23 | O | 0.34926 | 0.42985 | 0.72418 |
| C24 | C | 0.48458 | 0.64488 | 0.49708 |
| C25 | C | 0.10788 | 0.78590 | 0.39151 |
| O26 | O | 0.01423 | 0.50044 | 0.66415 |
| C27 | C | 0.14957 | 0.66404 | 0.53071 |
| C28 | C | 0.52416 | 0.63125 | 0.93719 |
| C29 | C | 0.07492 | 0.61338 | 0.56931 |
| C30 | C | 0.58500 | 0.82125 | 1.11209 |
| N31 | N | 0.59964 | 0.64186 | 0.40110 |
| N32 | N | 0.62947 | 0.65850 | 0.94041 |
| N33 | N | −0.02766 | 0.69845 | 0.45751 |
| O34 | O | 0.02497 | 0.83341 | 0.34512 |
| C35 | C | 0.51045 | 0.68525 | 0.41740 |
| C36 | C | 0.46634 | 0.55531 | 0.87345 |
| C37 | C | 0.09841 | 0.54489 | 0.64878 |
| C38 | C | 0.58035 | 0.50725 | 0.60512 |
| O39 | O | −0.14722 | 0.43850 | 0.72356 |
| N40 | N | −0.03021 | 0.63697 | 0.52221 |
| C41 | C | 0.10495 | 0.54023 | 0.89054 |
| C42 | C | 0.89612 | 0.28232 | 0.84549 |
| C43 | C | 0.84582 | 0.16101 | 0.96161 |
| O44 | O | 0.46450 | 0.33042 | 0.64801 |
| C45 | C | 0.91974 | 0.21420 | 0.92520 |
| N46 | N | 0.65886 | 0.72624 | 1.00017 |
| C47 | C | 0.48461 | 0.68649 | 1.00056 |
| C48 | C | 0.56413 | 0.57595 | 0.52559 |
| C49 | C | 0.54618 | 1.26428 | 0.64571 |
| H50 | H | 0.67652 | 0.39900 | 0.83030 |
| H51 | H | 0.31249 | 0.41849 | 0.66669 |
| H52 | H | 0.15715 | 0.33527 | 0.76922 |
| H53 | H | 0.69827 | 0.53481 | 0.46671 |
| H54 | H | 0.41844 | 0.66344 | 0.52970 |
| H55 | H | 0.24028 | 0.66270 | 0.55220 |
| H56 | H | 0.68200 | 0.63146 | 0.90155 |
| H57 | H | −0.10457 | 0.61185 | 0.53424 |
| H58 | H | 0.40326 | 0.68406 | 1.01553 |

TABLE 2-continued

Atomic position for MOF-303.

| Atom name | Atom | x (Å) | y (Å) | z (Å) |
|---|---|---|---|---|
| C59 | C | 0.07972 | 0.60808 | 0.95992 |
| N60 | N | −0.02752 | 0.63187 | 0.95587 |
| N61 | N | −0.03041 | 0.69309 | 1.02085 |
| H62 | H | 0.83805 | 0.49442 | 0.72783 |
| H63 | H | 0.75548 | 0.15782 | 0.93592 |
| H64 | H | −0.10482 | 0.72077 | 1.02998 |

PXRD, EDS analysis, and SEM images:

Activated microcrystalline MOF-303 was used for PXRD experiments. A ground sample was placed on a zero-background sample holder and mounted on the diffractometer. The data was collected from 3 to 50 degrees with a step width of 0.01 and a total data collection time of 30 minutes. SEM and EDS images were taken to study the morphology and elemental composition of bulk MOF-303 powder.

Porosity and Packing Density Analysis:

A 45 mg sample was taken from 450 g of well-mixed activated MOF-303, transferred to a 9 mm bulb gas cell and charged with $N_2$ to avoid air contamination. Then, the cell was mounted on the instrument. 26 adsorption and 11 desorption points were collected.

The powder particle density ($\rho_p$) of activated scaled-up MOF-303 was estimated to be 1.293 g cm$^{-3}$ from the pycnometer measurement (framework density $\rho_s$=2.4591±0.0037 g cm$^{-3}$) and BET pore volume measurements ($V_p$=0.3670 cm$^3$ g$^{-1}$) (Eqn. S1).

Section S4.4. Evaluation of Water Capacity Properties

A 38 mg sample was taken from the activated scaled-up MOF-303, transferred to a 9 mm bulb gas cell, and charged with $N_2$ to avoid air contamination. Then the cell was mounted on the instrument. The temperature of the adsorbent was controlled using a water bath. In case of pre-scaled-up MOF-303, 27 mg of sample was analyzed.

Section S5. MOF-303/G Preparation and Characterization

Section S5.1. Preparation of the Mixture 450 g of activated scaled-up MOF-303 was mixed with 150 g of graphite powder in the 2 L jar to produce 600 g of 67:33 wt % MOF-303/G. The resulting mixture was thoroughly mixed by shaking the jar until the MOF-303/G mixture had homogenous gray color. Aggregation of MOF-303 powder into large particles was observed. These aggregates were further crushed using a spatula and remixed. The resulting mixture was further characterized in terms of crystallinity, powder density, porosity and water uptake properties without any additional activation.

Section S5.2 Characterization of MOF-303/G

PXRD, EDS Analysis, and SEM Images of Activated MOF-303/G:

A powder sample was placed on a zero-background sample holder and was mounted on the diffractometer. The data was collected from 3 to 50 degrees with a step width of 0.01 and a total data collection time of 30 minutes. SEM and EDS images were taken to study the morphology and elemental composition of bulk MOF-303/G powder.

Porosity and Packing Density Analysis:

A 65 mg sample was taken from 600 g of well-mixed activated MOF-303/G, transferred to a 9 mm bulb gas cell and charged with $N_2$ to avoid air contamination. Then the cell was mounted on the instrument. 26 adsorption and 11 desorption points were collected.

The expected BET surface area for MOF-303/G was determined by multiplying the surface area of pure MOF-303 with the ratio of MOF within in the mixture: 989 m$^2$ g$^{-1}$×67 wt %=662 m$^2$ g$^{-1}$.

The powder particle density ($\rho_p$) of activated MOF-303/G was estimated to be 1.482 g cm$^{-3}$ from the pycnometer measurement (framework density $\rho_s$=2.5452±0.0015 g cm$^{-3}$) and BET pore volume measurements ($V_p$=0.2820 cm$^3$ g$^{-1}$) (Eqn. 51). The expected powdered particle density is calculated as follows:

$$\rho_{MOF\text{-}303/G} = \frac{m_{MOF\text{-}303/G}}{\frac{m_{MOF\text{-}303}}{\rho_{MOF\text{-}303}} + \frac{m_{graphite}}{\rho_{graphite}}} = \frac{600 \text{ g}}{\frac{450 \text{ g}}{1.293 \text{ g cm}^{-3}} + \frac{150 \text{ g}}{2.16 \text{ g cm}^{-3}}} = 1.437 \text{ g cm}^{-3}.$$

Section S5.3 Evaluation of Water Capacity Properties

A 65 mg sample was taken from the activated MOF-303/G, transferred to a 9 mm bulb gas cell and charged with $N_2$ to avoid air contamination. Then, the cell was mounted on the instrument.

Section S6. Comparison of Sorbents

Section S6.1. Characterization of Zeolite 13X

A commercially available Zeolite 13X sample was used without any modifications prior PXRD measurement. A powder sample was placed on a zero-background sample holder and was mounted on the diffractometer. The data was collected from 3 to 50 degrees with a step width of 0.01 and a total data collection time of 30 minutes.

Section S6.2. Solar Flux Response

The powder samples were packed in the insulation cell made of extruded polystyrene foam. An incandescent lamp (150 W) was placed 60 cm above the cell to ensure the flux of 1000±30 W m$^{-2}$ with ideal vertical exposure of the cell. The cell temperature was equilibrated with the surroundings prior the flux exposure. The pyranometer was used to monitor the solar flux and the temperature readings were taken at the bottom of the cell. The measurement was done at ambient temperature of 25±0.5° C. 1 g of powder sample was used in all measurements.

Section S6.3. Near-IR Properties

For the measured samples, a transmission of zero was assumed and the reflectance was transformed into absorption according to Eqns. S4 or S5 for samples of high or low absorption, respectively, $$\alpha = \log_{10}\left(\frac{1}{R}\right) \tag{S4}$$

$$\alpha = \frac{(1-R)^2}{2R} \tag{S5}$$

where $\alpha$ is the absorption, R is the reflectance. A significant increase of the absorption was observed for both MOF-801/G and MOF-303/G compared to the pure samples.

Section S6.4. Comparison of Water Kinetics

The powder samples were placed into a platinum pan and heated to 150° C. at 0% RH (dry air). Then, the temperature was allowed to equilibrate for 24 hours at 25° C. and 0% RH. The adsorption measurement was performed at 25° C. and 40% RH; the desorption measurement was performed at 85° C. and 0% RH. Weight percentage was estimated as (mass of activated material+mass of adsorbed water)/(mass of activated material).

Section S7. Water Harvester

Section S7.1. Materials

Transparent plexiglass/PMMA (0.5" and 0.25" thick) and T-slotted aluminum framing (Single Rail, Silver, 1½" high× 1½" wide) with connections joins were purchased from McMaster-Carr. The solar absorptive coating (Pyromark 1200 high-temperature paint) was purchased from LA-CO®. High lumen incandescent bulbs (150 watts, 2,710 lumens, 100 CRI) were manufactured by Bulbrite. Extruded polystyrene foams (24"×24" wide, 1" thick) was purchased from Owens Corning®. Acrylic cement was manufactured by Scigrip. Primer, white and clear gloss 2× paints were manufactured by Rust-Oleum.

Section S7.2. Solar Flux Response

Circular poly(methyl methacrylate) (PMMA) pieces were packed in the insulation cell made of extruded polystyrene foam. The lamp was placed 60 cm above the cell to ensure a flux of 1000±30 W m$^{-2}$ with ideal vertical exposure of the cell. The cell temperature was equilibrated with the surroundings prior the flux exposure. The pyranometer was used to monitor the flux and the temperature readings were taken at the bottom of the cell. All the measurements were carried out at the ambient temperature of 25±0.5° C.

Section S7.3. Near-IR Properties

Absorption spectra of PMMA were recorded on a Shimadzu UV3600 between 285 and 3000 nm. A PMT detector was used in the UV and visible region, and an InGaAs and cooled PbS detector for long-wavelength detection. The spectrophotometer is equipped with a double monochromator with a wavelength range of 185 to 3300 nm. PMMA identical to that used for the construction of the cover (⅛") was used in all experiments. PMMA was measured uncoated and with thin coats of primer and white paint. For both, primer and white paint, an increase in the absorption in the visible and IR region is observed, which is explained by a higher reflectivity.

Section S7.4. Water Sorption Unit

The water sorption unit is comprised of a sorbent container, support walls, and a thermal insulation compartment. The support walls are four rectangular transparent pieces (18.25"×8.00"×0.25") installed onto a bottom acrylic support plate (18.50"×18.50"×0.25") to hold the sorbent container at the desired position during the water capture/release. The sorbent container (16"×16"×1" deep) is subsequently glued to the upper side of the support walls to create a well-sealed enclosure eliminating water transfer to the thermal insulation.

To increase the temperature of the sorbent during the release period, the bottom surface and the side walls of the sorbent container was coated with a high solar absorptive black coating.

The thermal insulation compartment was packed with extruded polystyrene foam having of thermal conductivity and high heat capacity to minimize heat loss from the side and bottom surface of the container. Fiber glass was also placed between the side walls and the extruded polystyrene foam to avoid any buoyant air circulation within the water sorption unit and minimize the convective heat transfer in the thermal insulation compartment. The exterior surface of the support walls was coated with a white paint with high reflectivity in the infrared region of the solar spectrum to minimize irradiative heating of the water sorption unit and helped to maintain the condenser temperature below the dew point.

Section S7.5. Case

The case is comprised of acrylic walls (22"×22"×0.25"). The side walls of the case prevent water transfer to/from the surroundings, and they participate in heat transfer occurring within the condenser and the pre-cooled airflow passages. The upper side of the case provides a rigid base for the installation of the cover and the solar reflector while the bottom acrylic plate (22"×22"×0.25") of the case is attached to the support frame and the stage (for the desert experiments). The cover is made of a transparent acrylic (24"× 24"×0.125") with high transmissivity in the visible and near infrared range. The cover is screwed to the top of the case using 12 screws and sealed using a moisture resistant and water impermeable gasket to eliminate any potential gaps and thus prevent leakage.

During the release process, the vapor and heated air flow through airflow passages to the bottom of the case. Condensation is mainly observed on the side walls. The airflow passages are 45 mm wide and allow buoyant air circulation within the closed system. Heat transfer between the air and the side walls of the case is mainly due to convection, while the rejected heat is conducted to the surroundings through the side walls of the case. The droplets on the side walls gradually slide down and accumulate at the bottom of the case separated from the water sorption unit by 2.45 cm spacers.

Section S7.6. Solar Reflector

A solar reflector is positioned on top of the cover which facilitates (i) collection and deflection of solar radiation onto the sorbent and (ii) shading of the condenser, the exposed surfaces of the water sorption unit, the airflow passages, and the bottom of the case.

Section S8. Data Acquisition and Sensors

Temperature and humidity readings were recorded during the harvesting experiment at various locations insides the case. In addition, the humidity and temperature of the ambient air were measured in close proximity to the water harvester.

Section S8.1. Humidity Measurements

Figure 50:
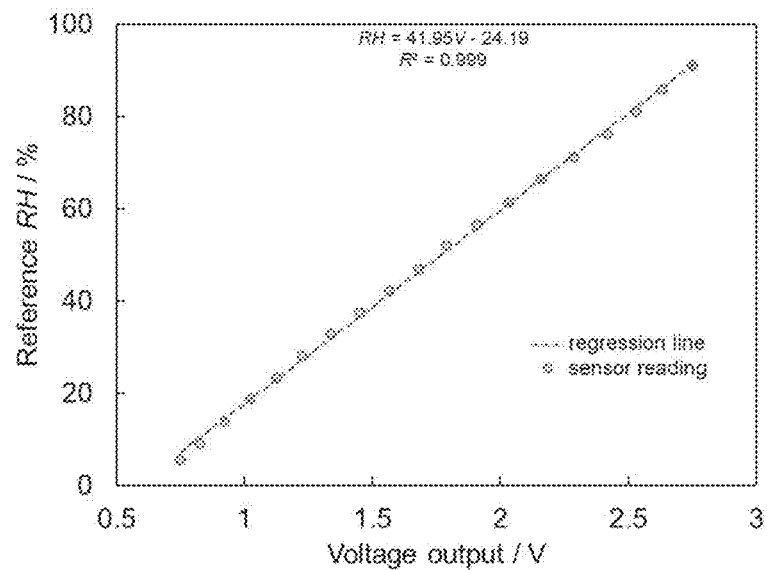
FIG. 50 depicts calibration curve for humidity sensor converting the voltage output readings into the corresponding relative humidity.
Figure 51:
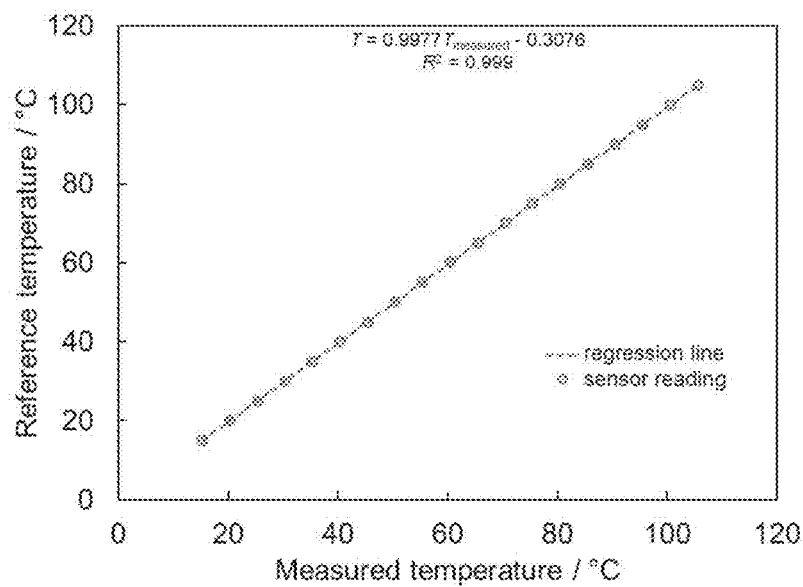
FIG. 51 depicts calibration curve for temperature sensor.

Humidity readings were recorded using integrated circuit sensors (Honeywell HIH-4021) with thermoset polymer capacitive sensing elements. The sensors were relatively small (12 mm×4 mm×2 mm) so that they did not significantly interact with the airflow inside the box. The voltage output of the humidity sensors was recorded using a National Instruments data acquisition system (cDAQ-9174 with NI 9205 32-Channel analog input module) and processed using LabView 2016 to collect and visualize the data. The humidity sensors were calibrated within a range of RH (5%<RH<90%, with 5% RH increments and at T=25° C.) by using a HygroCal100 humidity generator (Michell Inc, MA, USA). Seven HygroSmart HS3 capacitive humidity sensors (with ±0.8% accuracy) were used to ensure humidity uniformity (less than ±0.5%) across the HygroCal 100 humidity chamber. The bias error was eliminated by using an external standard reference precision dew-point meter (the Optidew Vision precision, Michell Inc, MA, USA) with ±0.2° C.$_{dew-point}$ and 0.5% RH accuracy within the relative humidity range of 0.5 to 100%. At each humidity level, the voltage output of the humidity sensors was measured 50 times with a sampling frequency of 30 seconds while the hysteresis effects were determined through a loop of increasing (5% to 90%) and decreasing (95% to 5%) humidity. The precision uncertainty ($U_p$) of the humidity sensors at each humidity level was calculated using Eqn. S6:

$$U_p = S \times t \tag{S6}$$

where S is the precision index, i.e. the square root of standard deviation of analog readings and t the two-tailed student's t-factor (2 for 50 data points). The maximum precision uncertainty for the humidity sensors was found to be ±0.01%. Linear regression was applied to convert sensor voltage output (0.5-3.0 V) to relative humidity (0-100%) (FIG. 50). The large coefficient of determination ($R^2$>0.99) confirmed the linear response of the sensor at constant temperature resulting in a bias uncertainty of the data reduction, $U_{fit}$, of less than ±0.6%. The total bias uncertainty ($U_B$) of 0.7%, coming from the bias uncertainty in the reference humidity ($U_{ref}$=0.5%) and the bias uncertainty of the data reduction ($U_{fit}$=0.6%), was calculated using Eqn. S7:

$$U_B = (U_{fit}^2 + U_{ref}^2)^{1/2} \quad (S7)$$

The total uncertainty ($U_T$) in the humidity measurements was found to be less than ±1% according to Eqn. S8.

$$U_T = (U_P^2 + U_B^2)^{1/2} \quad (S8)$$

A temperature compensation relation, Eqn. S9, provided by the manufacturer was used to adjust the relative humidity values at different temperature.

$$RH(T) = \frac{RH(25°\,C.)}{(1.0546 - 0.00216T)} \quad (S9)$$

where T is the working temperature in degrees Celsius. It should be noted that although the temperature compensation relation can be used to determine the relative humidity at elevated temperatures, the uncertainty in humidity readings may increase drastically at higher temperature and relative humidity (e.g. ±5% RH when RH=80% and T=85° C.).

Section S8.2. Temperature Measurements

T-type thermocouples (Neoflon PFA, American Wire Gauge 40, Omega Eng.) were used for temperature measurements. The output signal of the thermocouples was acquired using a National Instruments data acquisition system (cDAQ-9174 with NI 9214 16-Ch Isothermal TC module) and processed using LabView 2016 to collect and visualize the data. The thermocouples were calibrated within the range of 15-105° C. with 5° C. increments using a Hart Scientific 9103 dry-well calibrator with the accuracy of ±0.25° C. At each reference temperature, 40 readings with a sampling rate of 5 s were taken while hysteresis effects were determined through an increasing and decreasing temperature loop. Using Eqn. S6 with the student's t-factor of 2, the precision uncertainty was found to be less than ±0.01° C. A linear regression curve was used for data reduction which resulted in a bias error of ±0.04° C. Using Eqn. S8 the maximum total uncertainty in the temperature readings was found to be less than ±0.25° C.

Section S9. WHC Under Laboratory Conditions

Section S9.1. Artificial Flux Generator

Figure 53A:
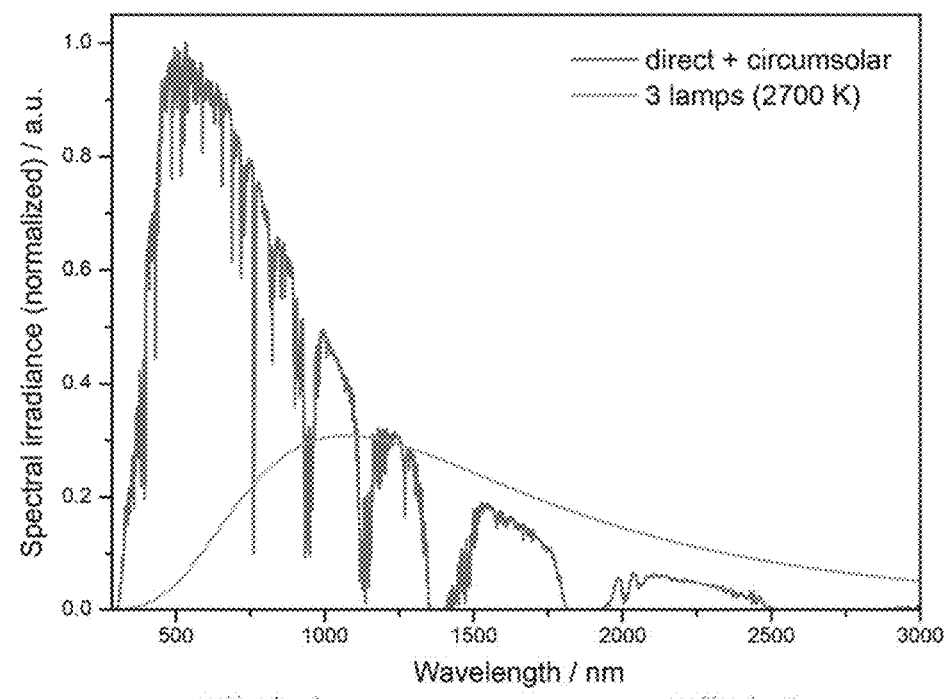
FIG. 53A depicts a comparison of the solar irradiance and the irradiance for a three-lamp configuration with a color temperature of 2700 K.
Figure 53B:
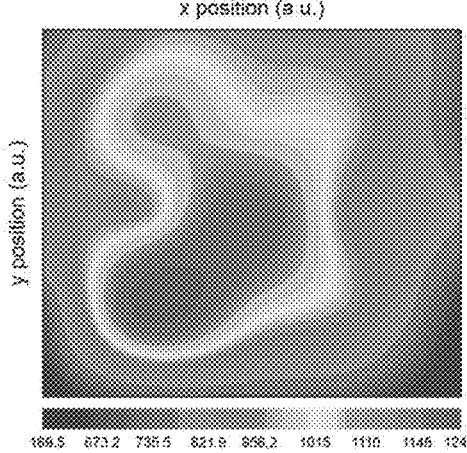
FIG. 53B depicts a contour diagram of the distribution of the irradiance measured on the cover of the case for a three-lamp configuration in one orientation using 25 data points (lamps located at the bottom left, bottom right, and top right).
Figure 53C:
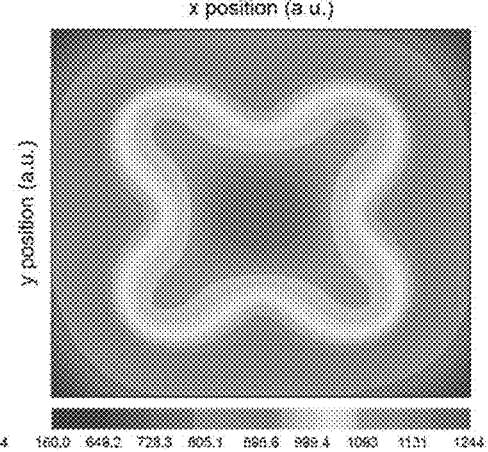
FIG. 53C depicts a contour diagram of the distribution of the irradiance on the cover of the case for a three-lamp configuration and four different constellations of lamps.
Figure 54:
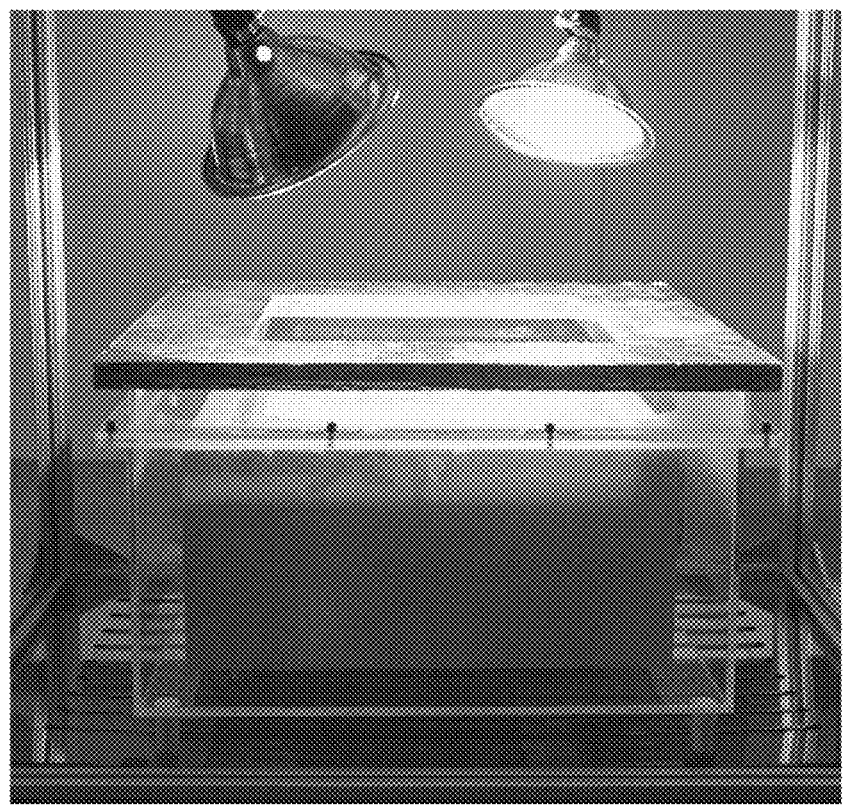
FIG. 54 provides an image of the artificial flux generator in two lamps configuration.
Figure 55A:
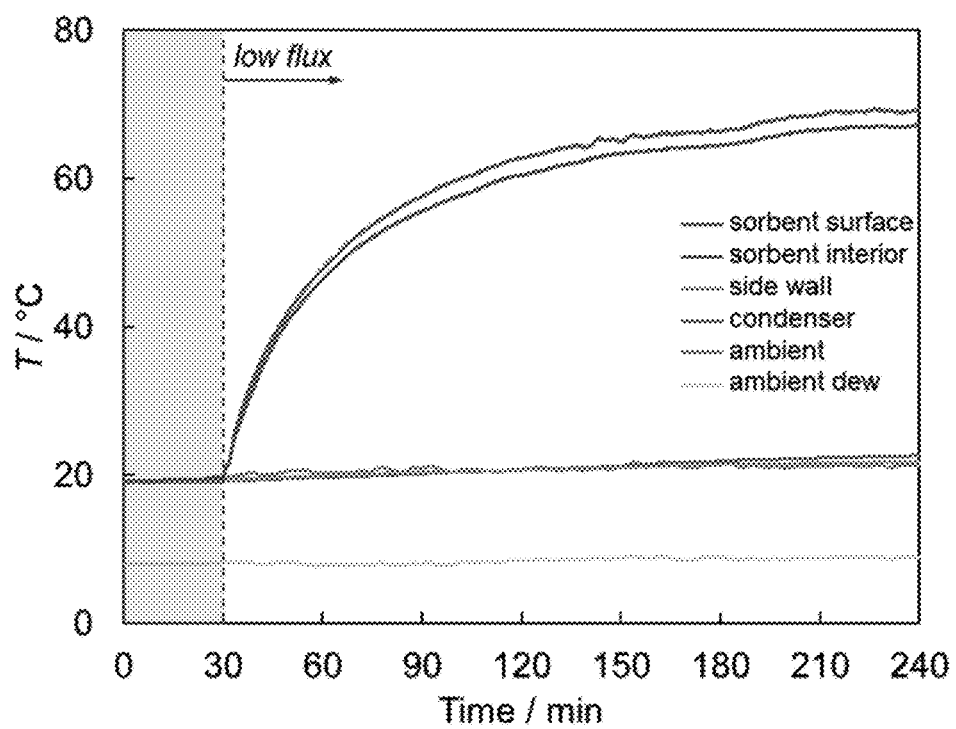
FIGS. 55A and 55B depict the temperature and relative humidity profiles during water harvesting without material (i.e. empty sorbent container). Water harvesting was performed under low flux for 7.5 h. No condensation was observed.
Figure 55B:
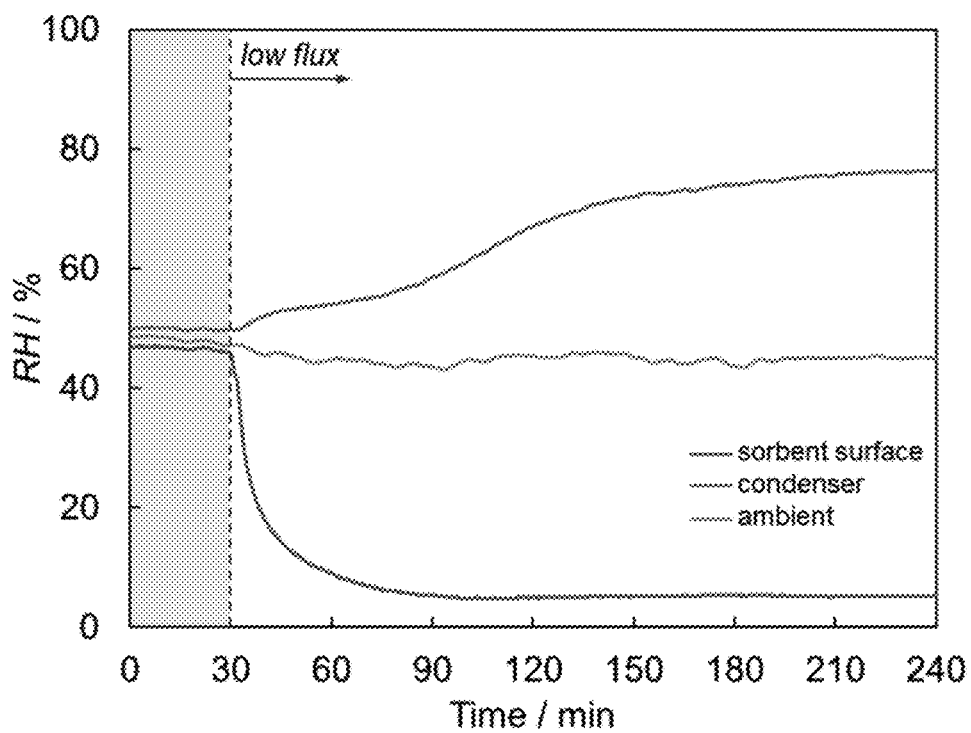
Figure 56A:
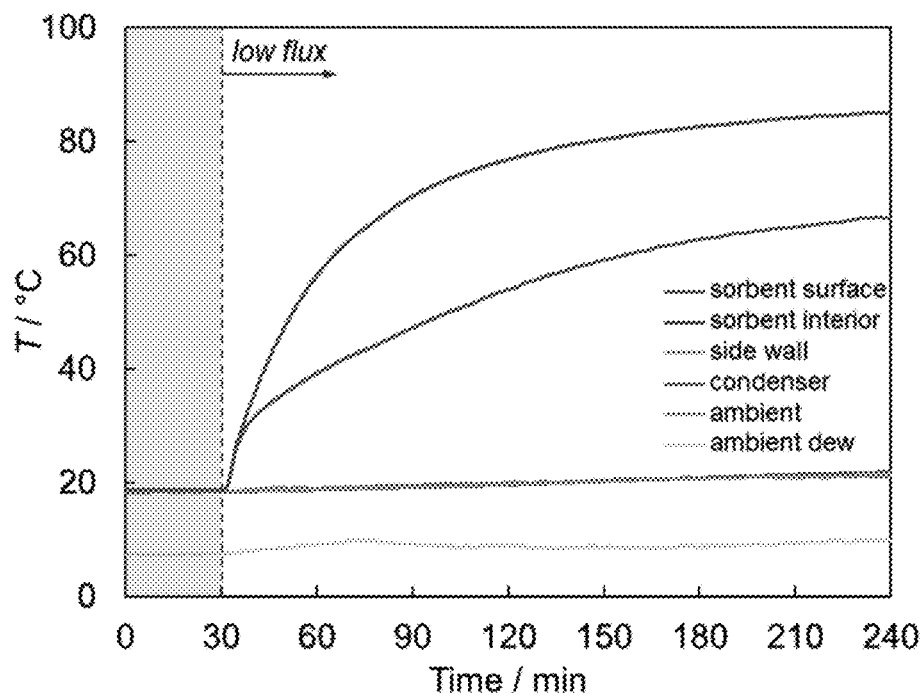
FIGS. 56A and 56B depict the temperature and relative humidity profiles during water harvesting using 0.25 kg graphite. Water harvesting was performed under low flux for 7.5 h. A small amount of fog formation was observed.
Figure 56B:
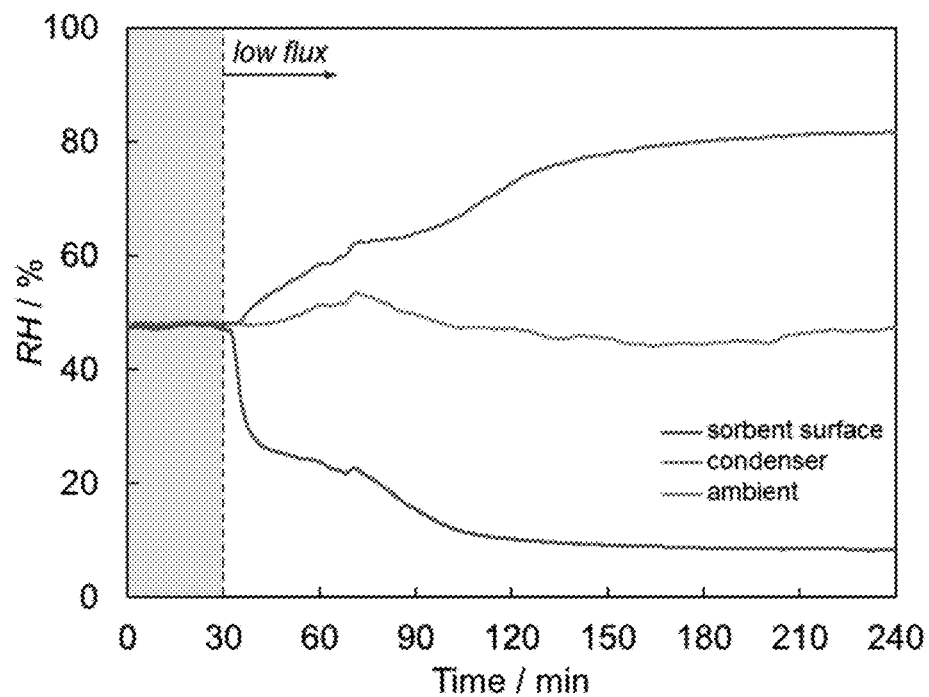
Figure 57A:
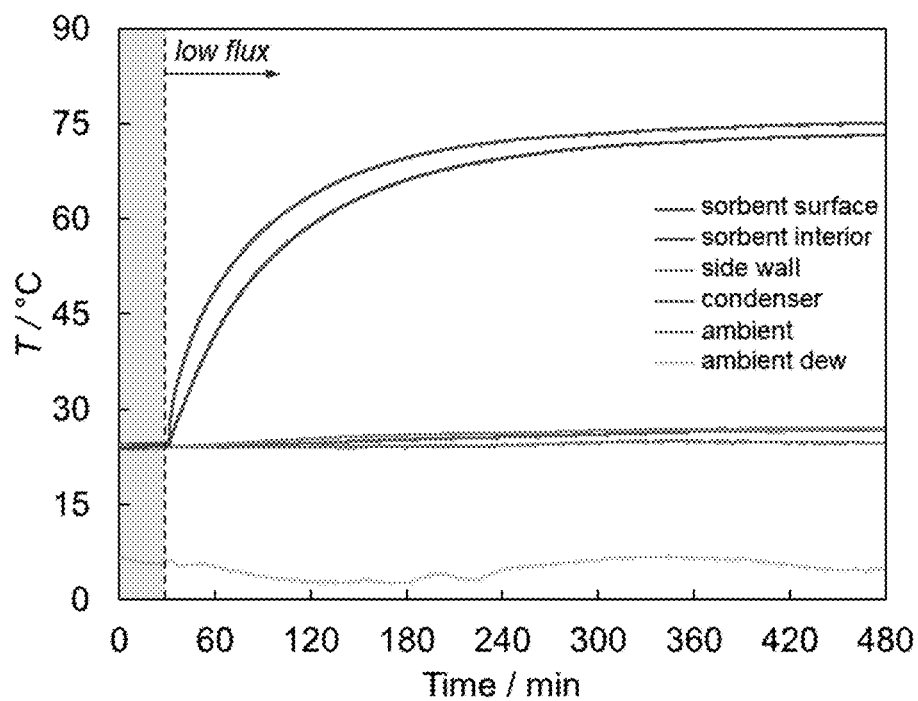
FIGS. 57A and 57B depict the temperature and relative humidity profiles during water harvesting using 0.5 kg of Zeolite 13X. Water harvesting was performed under low flux for 7.5 h. 6 g of liquid water was collected.
Figure 57B:
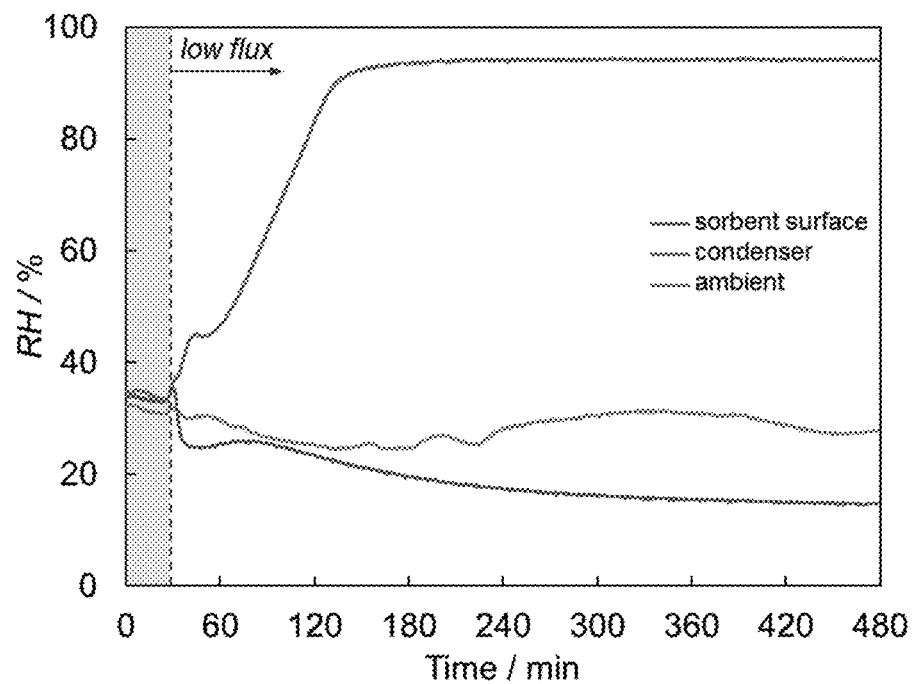
Figure 58A:
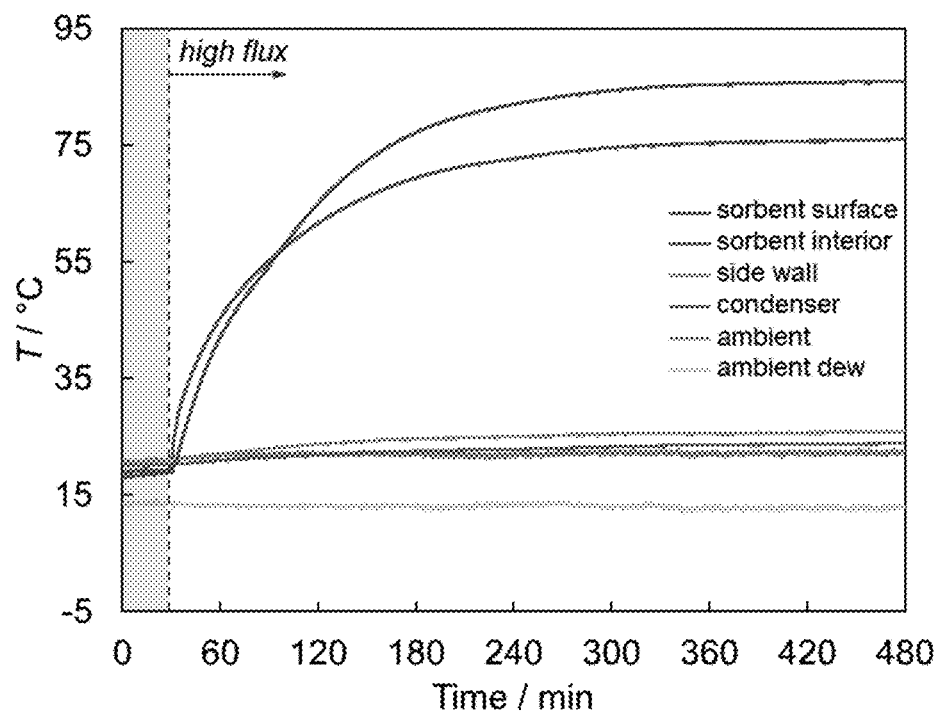
FIGS. 58A and 58B depict the temperature and relative humidity profiles during water harvesting using 0.5 kg of Zeolite 13X. Water harvesting was performed under high flux for 7.5 h. 29 g of liquid water was collected.
Figure 58B:
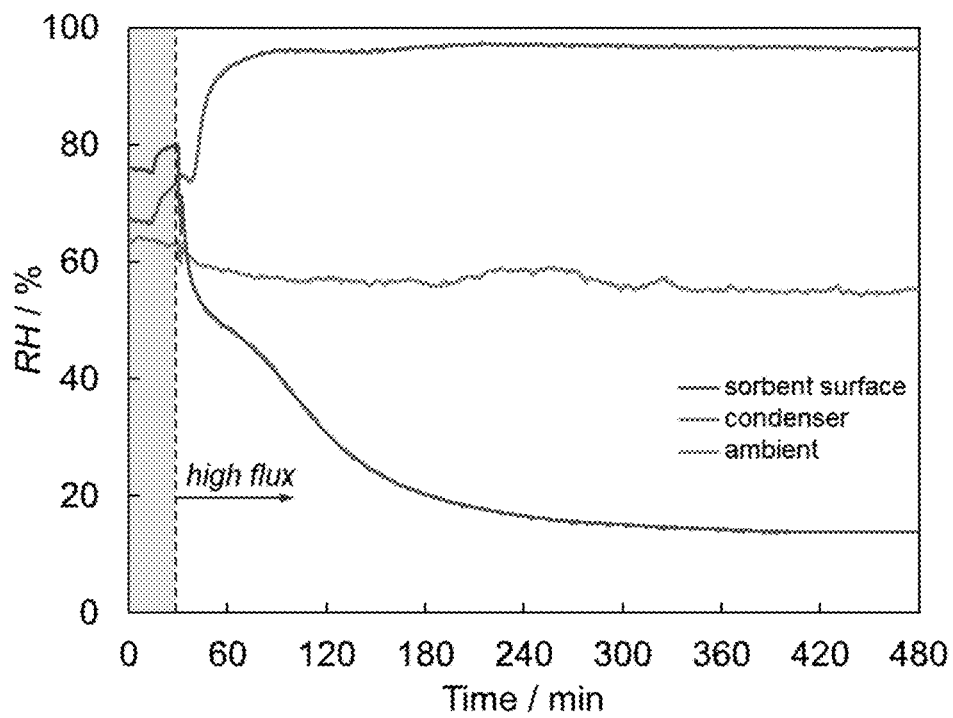
Figure 59A:
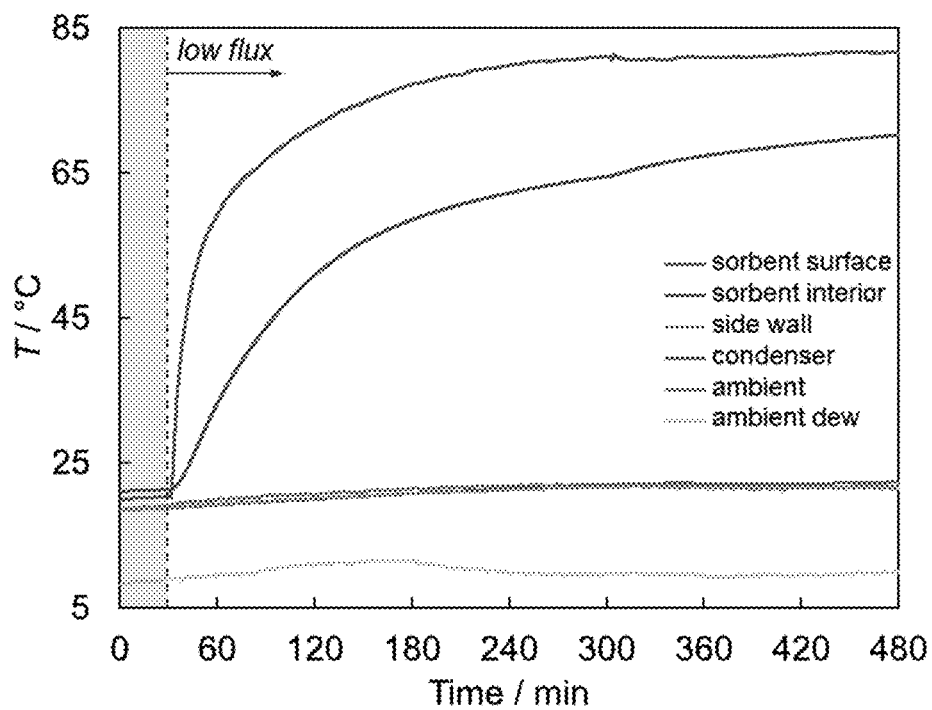
FIGS. 59A and 59B depict the temperature and relative humidity profiles during water harvesting using 1.65 kg of MOF-801/G. Water harvesting was performed under low flux for 7.5 h. 25 g of liquid water was collected.
Figure 59B:
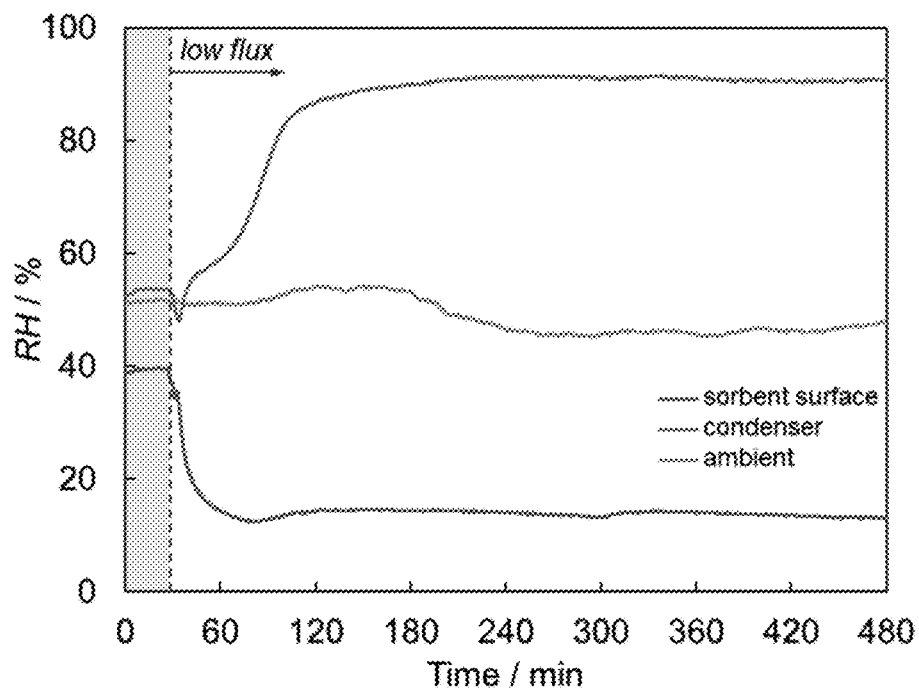
Figure 60A:
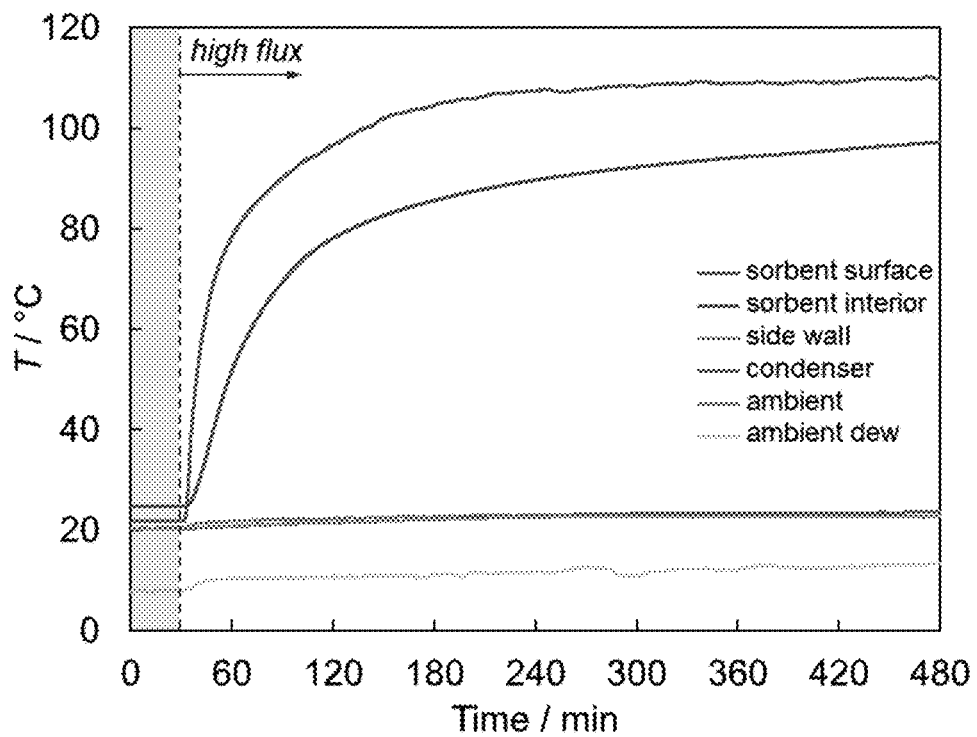
FIGS. 60A and 60B depict the temperature and relative humidity profiles during water harvesting using 1.65 kg of MOF-801/G. Water harvesting was performed under high flux for 7.5 h. 63 g of liquid water was collected.
Figure 60B:
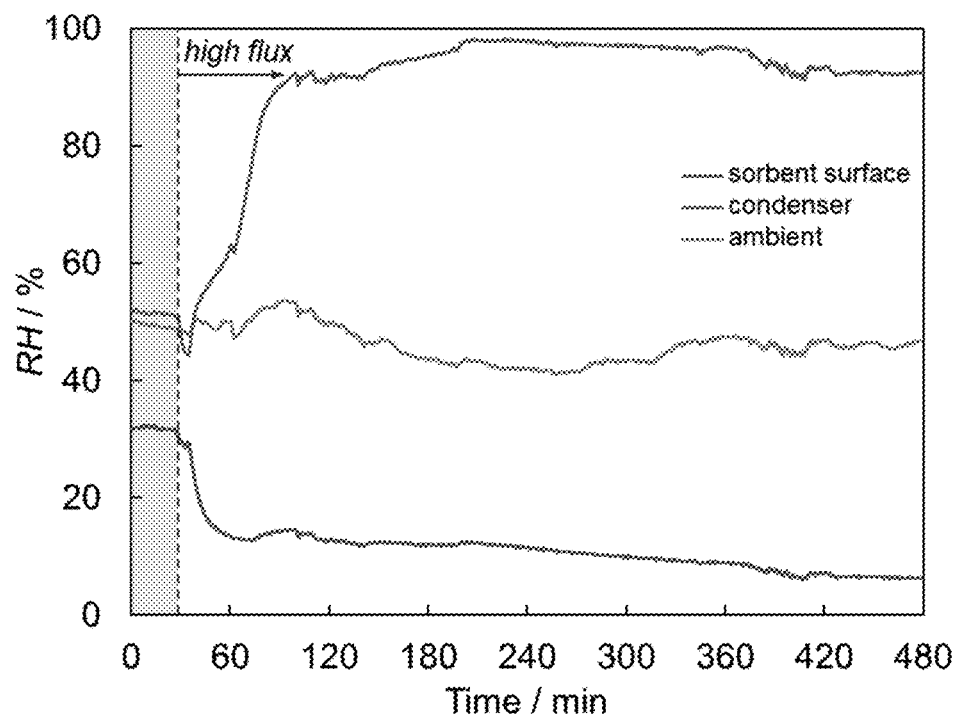
Figure 61A:
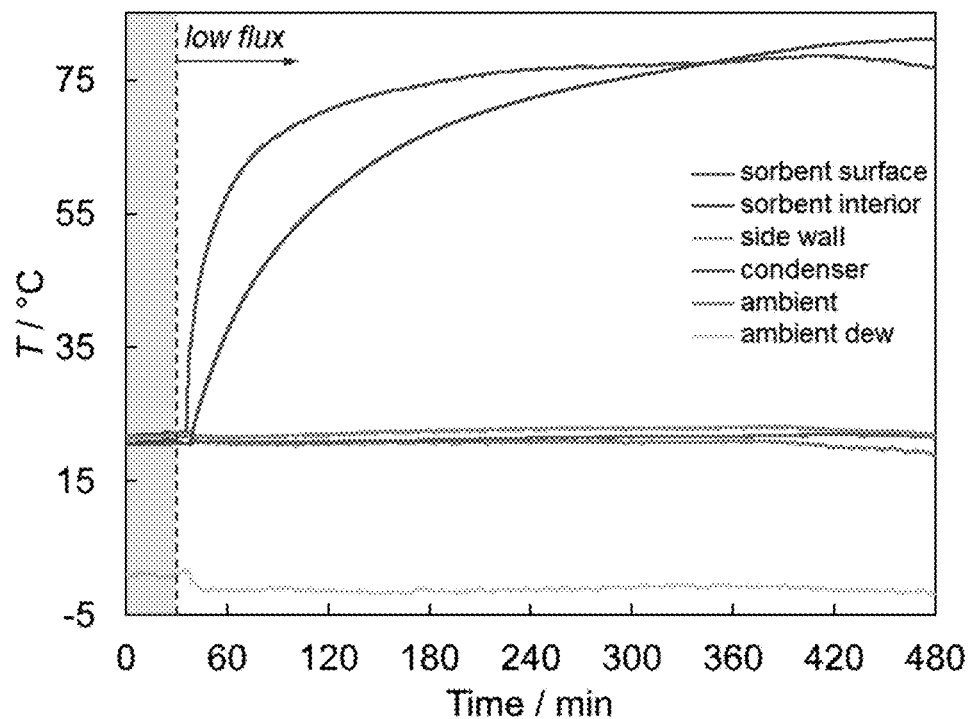
FIGS. 61A and 61B depict the temperature and relative humidity profiles during water harvesting using 0.825 kg of MOF-801/G. Water harvesting was performed under low flux for 7.5 h. 37 g of liquid water was collected.
Figure 61B:
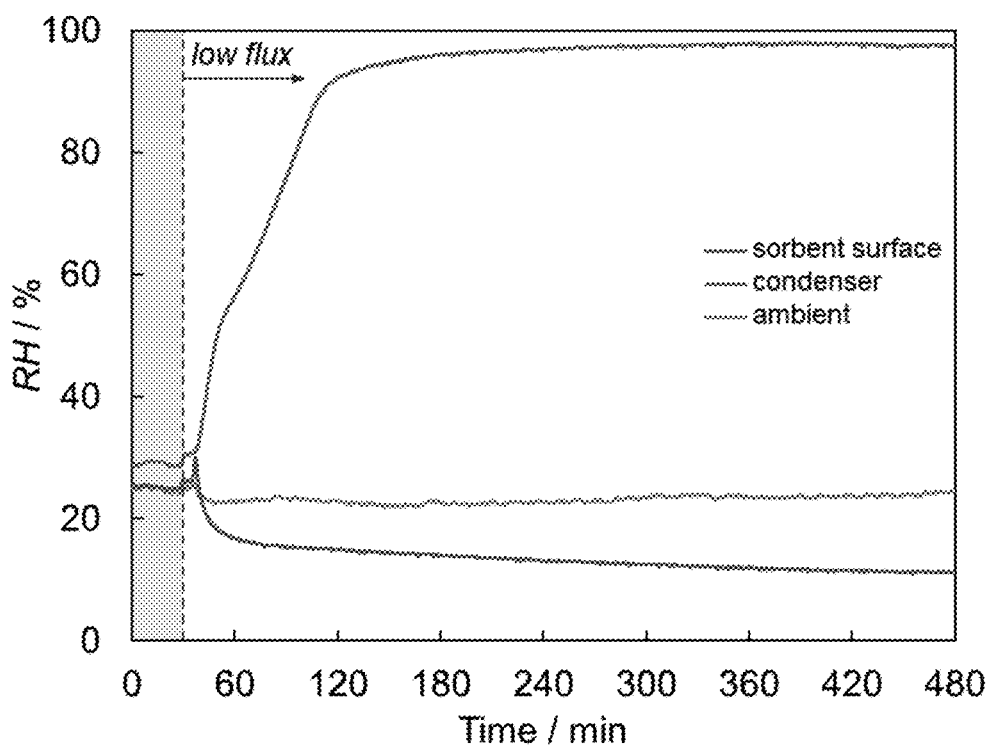
Figure 62A:
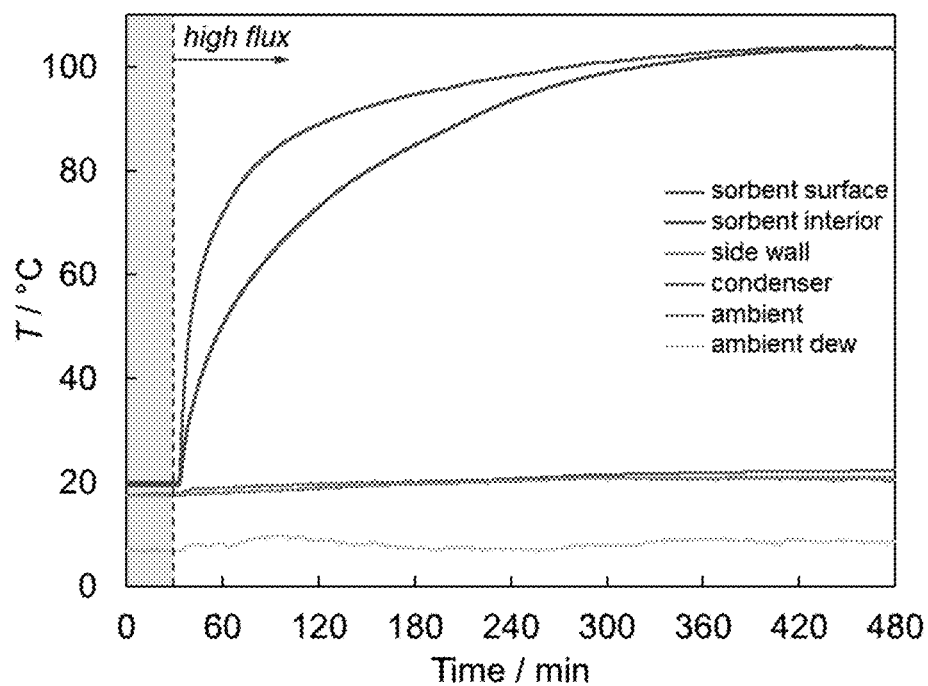
FIGS. 62A and 62B depict the temperature and relative humidity profiles during water harvesting using 0.825 kg of MOF-801/G. Water harvesting was performed under high flux for 7.5 h. 78 g of liquid water was collected.
Figure 62B:
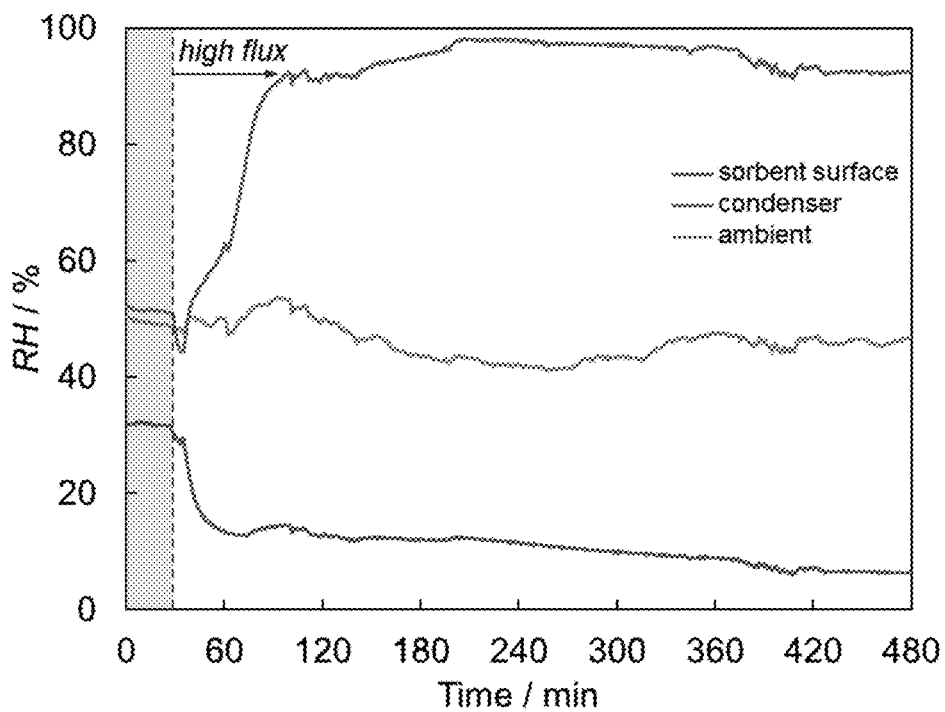
Figure 63A:
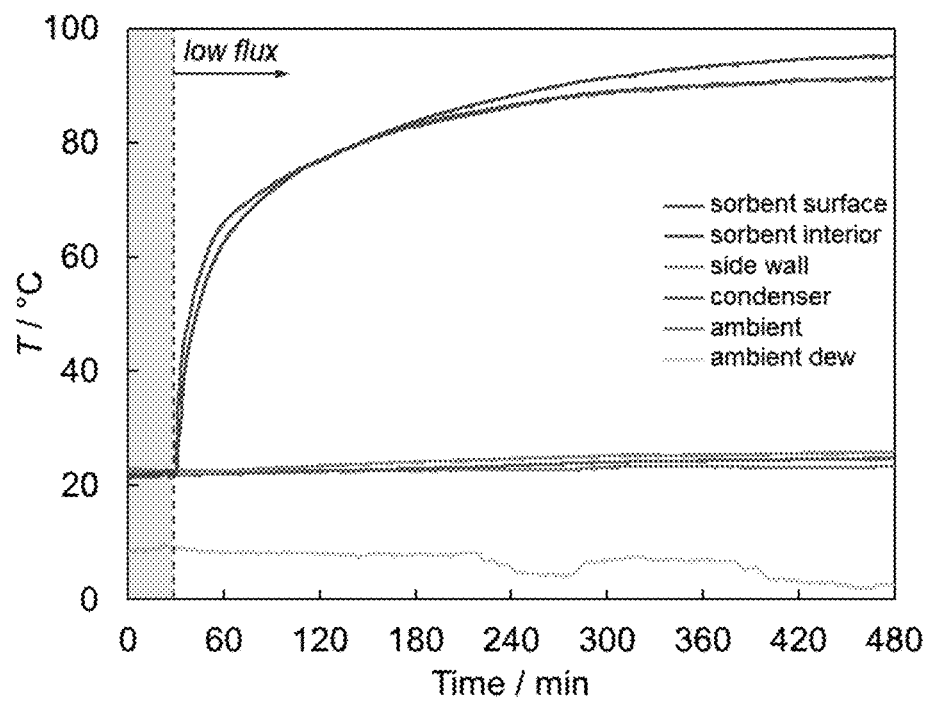
FIGS. 63A and 63B depict the temperature and relative humidity profiles during water harvesting using 0.412 kg of MOF-801/G. Water harvesting was performed under low flux for 7.5 h. 26 g of liquid water was collected.
Figure 63B:
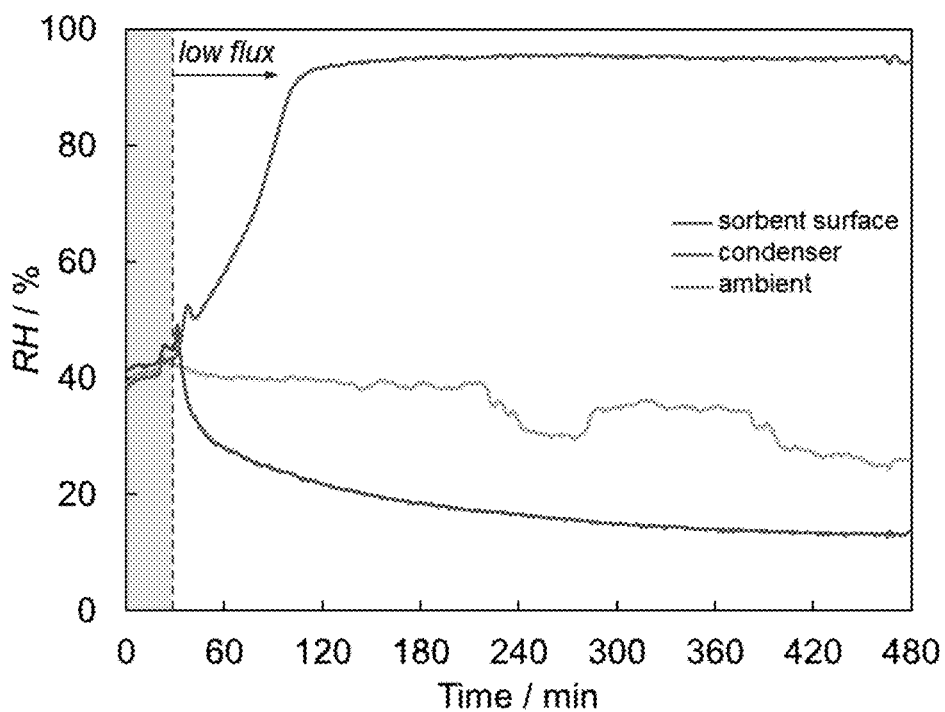
Figure 64A:
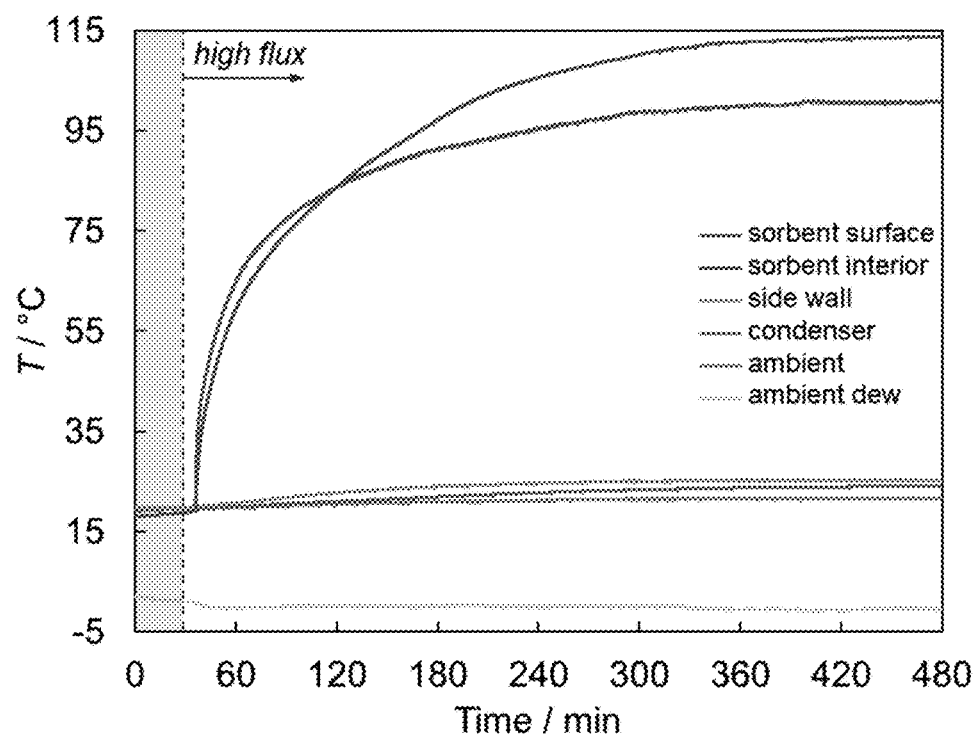
FIGS. 64A and 64B depict the temperature and relative humidity profiles during water harvesting using 0.412 kg of MOF-801/G. Water harvesting was performed under high flux for 7.5 h. 36 g of liquid water was collected.
Figure 64B:
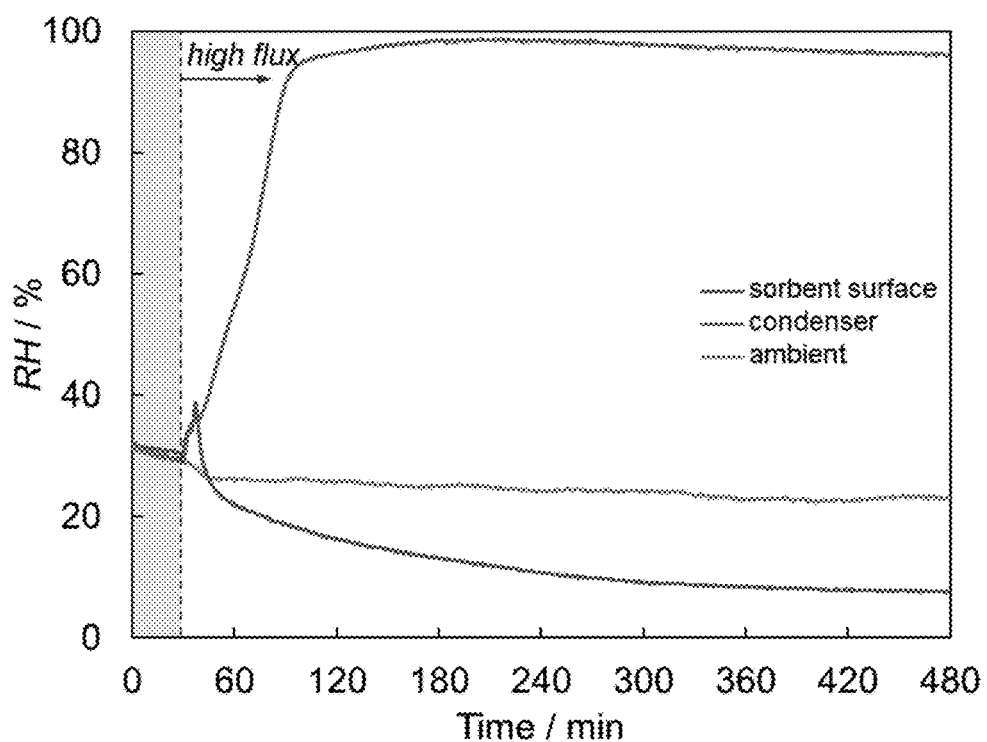
Figure 65A:
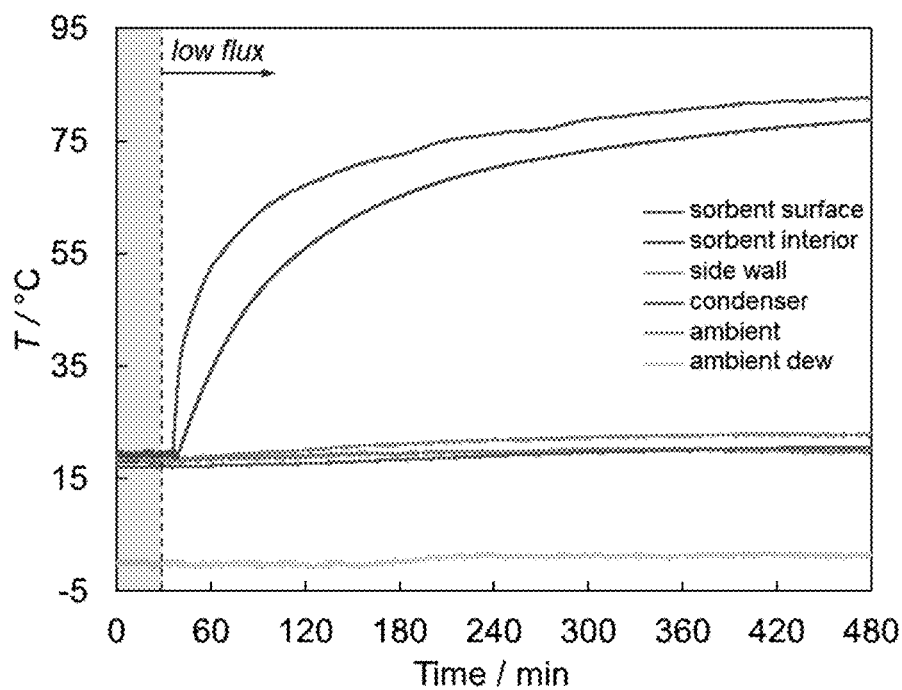
FIGS. 65A and 65B depict the temperature and relative humidity profiles during water harvesting using 0.600 kg of MOF-303/G. Water harvesting was performed under low flux for 7.5 h. 60 g of liquid water was collected.
Figure 65B:
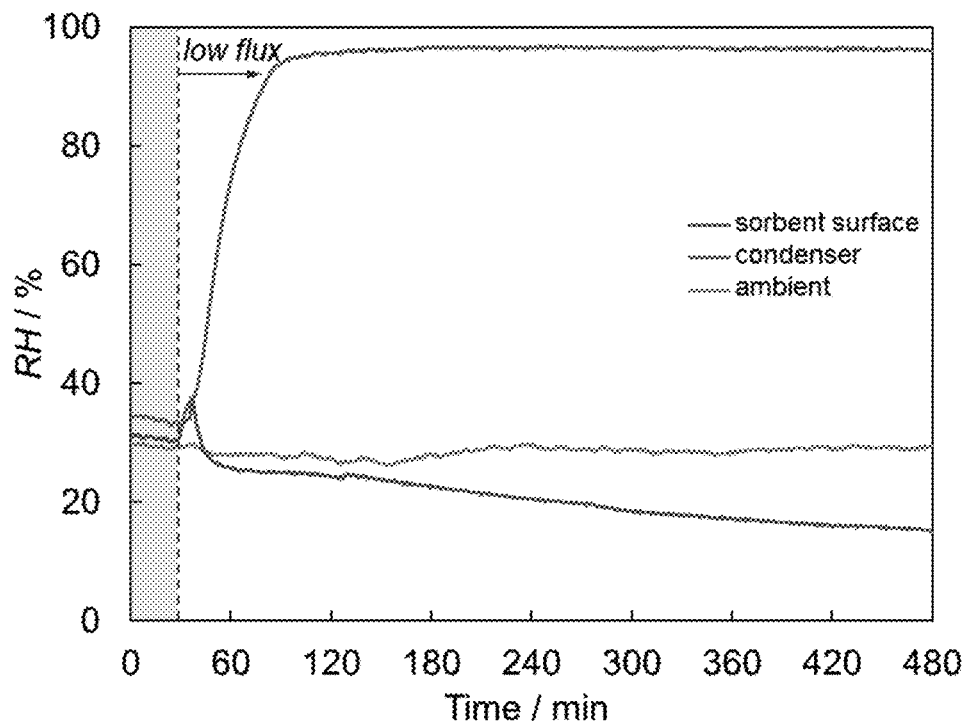
Figure 66A:
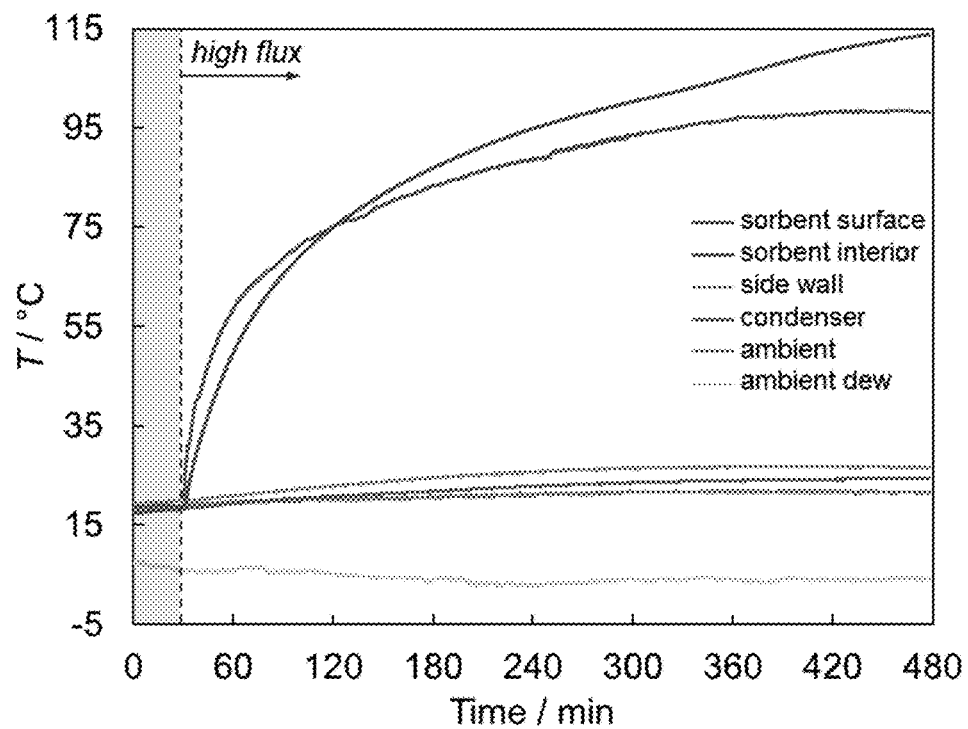
FIGS. 66A and 66B depict the temperature and relative humidity profiles during water harvesting using 0.600 kg of MOF-303/G. Water harvesting was performed under high flux for 7.5 h. 105 g of liquid water was collected.
Figure 66B:
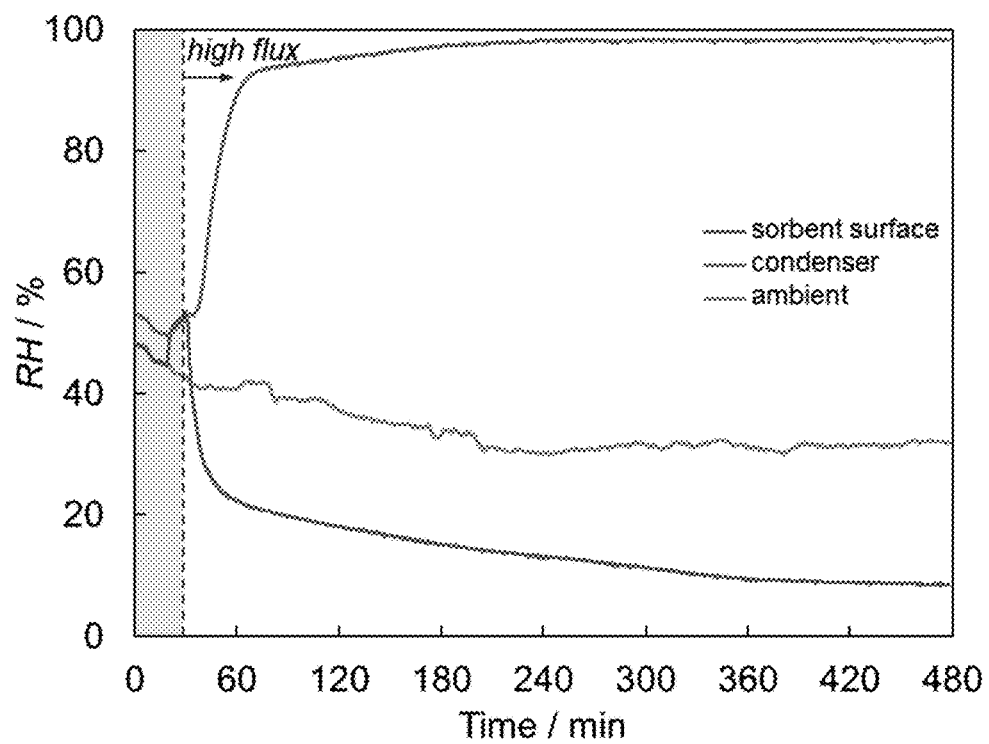
Figure 67A:
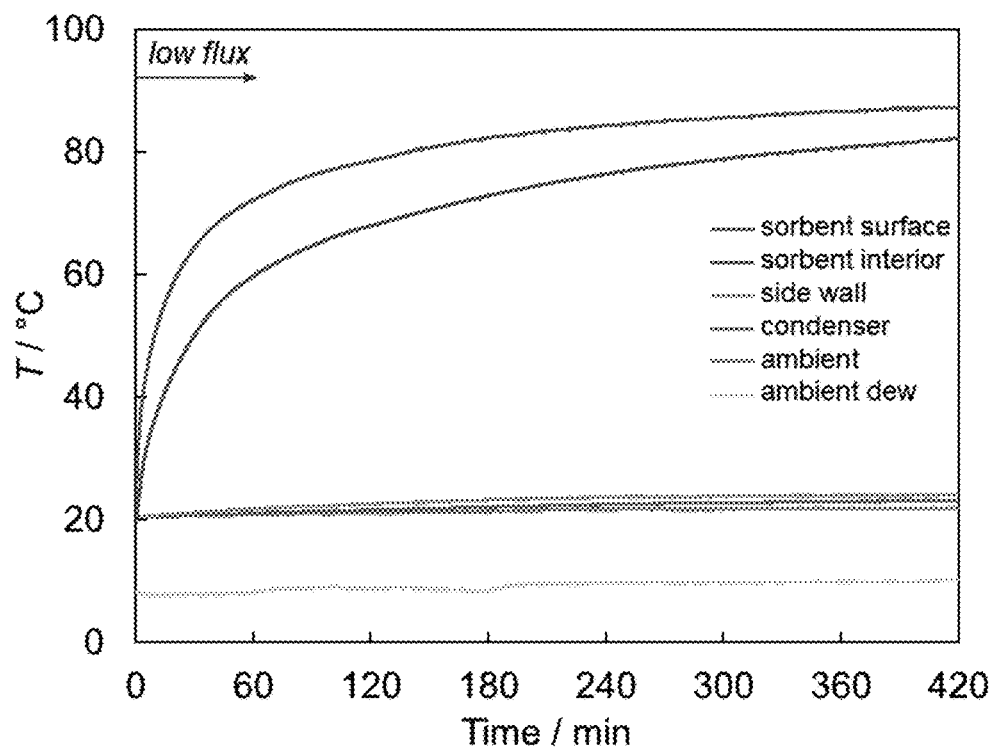
FIGS. 67A and 67B depict the temperature and relative humidity profiles during water harvesting using 0.600 kg of MOF-801/G. Saturation was performed in an environmental chamber at 35% RH and 15° C. for 5 days. Water harvesting was performed under low flux for 7.5 h. 28 g of liquid water was collected.
Figure 67B:
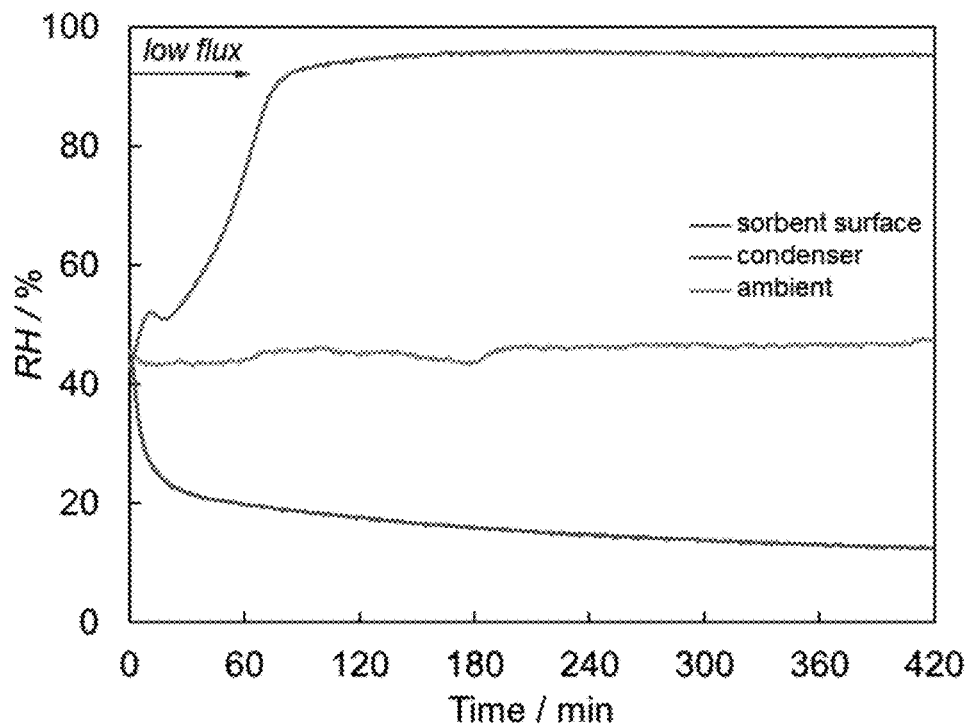
Figure 68A:
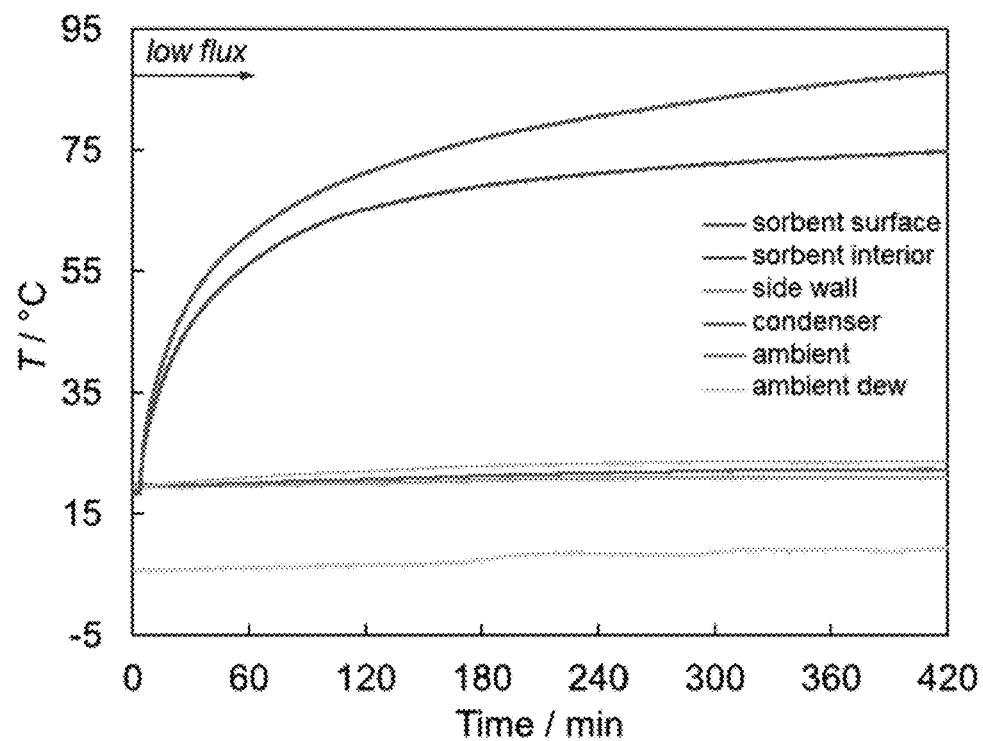
FIGS. 68A and 68B depict the temperature and relative humidity profiles during water harvesting using 0.600 kg of MOF-303/G. Saturation was performed in an environmental chamber at 35% RH and 15° C. for 5 days. Water harvesting was performed under low flux for 7.5 h. 60 g of liquid water was collected.
Figure 68B:
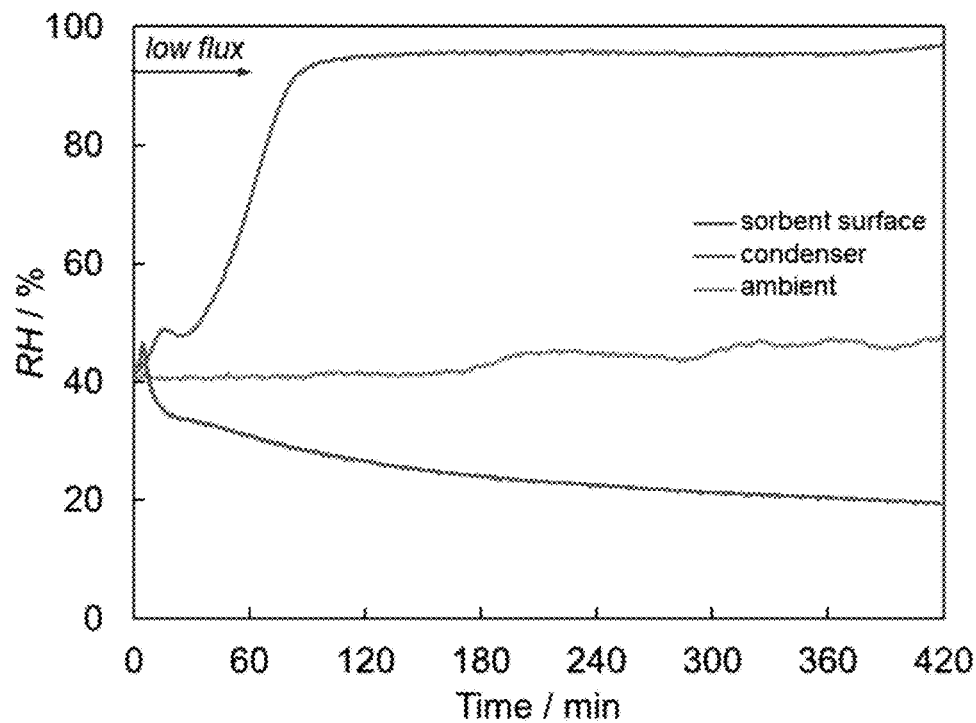
Figure 69:
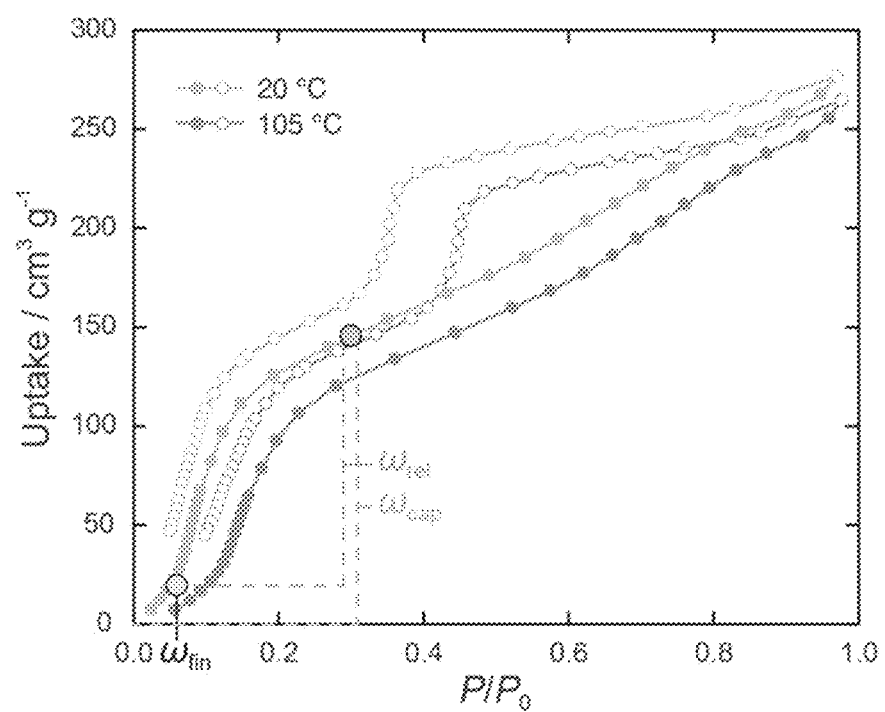
FIG. 69 depicts water sorption isotherms for MOF-801/G. Ppoints indicate the conditions for saturation and release for 1.65 kg of MOF-801/G at high flux during water harvesting experiment #6 (Table 4).

In order to compare the irradiation under natural sunlight and that recorded for the harvesting experiment at laboratory conditions, the irradiance for the exposed top surface of the water harvester was scanned. For this purpose, two lamp configurations were tested (two and three lamps) and 25 data points were collected per run. The lamps were adjusted so that the pyranometer reading in the center of the cover of the case was within the range of the readings during the lab experiments reported in this work (830 W m$^{-2}$ and 1140 W m$^{-2}$ for two and three lamps, respectively). Two runs were performed for the two lamp-, and four runs for the four-lamp configuration. Based on these measurements, a correction factor for both configurations was calculated. The average irradiance (W m$^{-2}$) calculated for two lamps equals 67.25% and that calculated for three lamps equals 69.56% of the value measured in the center of the cover. For every run, two orientations, rotated by 90° with respect to each other were used (100 data points). This correction factor allows for a qualitative comparison of the solar irradiance (based on data provided by ASTM G173-03 Reference Spectra Derived from SMARTS v. 2.9.2, direct+circumsolar) and the theoretical spectra of the lamps, calculated using Planck's radiation law (Eqn. S10) and a temperature of 2700 K, within the range of 285-3000 nm (the spectral range recorded by the pyranometer), $$\dot{E}_{lab}(\lambda) = \frac{c_1}{\lambda^5} \frac{1}{e^{c_2/\lambda T} - 1} \quad (S10)$$

where $c_1$ is 3.741832·10$^{-16}$ W m$^2$, $c_2$ is 438786·10$^{-2}$ K m, $\lambda$ is the wavelength, T the temperature of the black body, and $\dot{E}_{lab}$ is the spectral irradiance. The resulting spectra are shown in FIG. 52 (two lamps) and FIG. 53 (three lamps). The distribution of incident flux measured for one orientation and an average of all orientations are given in FIG. 52 and FIG. 53 for two and three lamps, respectively.

The average hemispherical absorptivity ($\alpha$) of the sorbents and transmissivity ($\tau$) of the cover for artificial radiation were determined using the following equations:

$$\alpha \approx \frac{\int_{285}^{2500} \alpha_\lambda(\lambda) \dot{E}_{lab}(\lambda) d\lambda}{\int_{285}^{2500} \dot{E}_{lab}(\lambda) d\lambda} \quad (S11)$$

$$\tau \approx \frac{\int_{285}^{2500} \tau_\lambda(\lambda) \dot{E}_{lab}(\lambda) d\lambda}{\int_{285}^{2500} \dot{E}_{lab}(\lambda) d\lambda} \quad (S12)$$

where $\alpha_\lambda(\lambda)$ and $\tau_\lambda(\lambda)$, are the spectral directional absorptivity and transmissivity, respectively, and $\dot{E}(\lambda)$ is spectral distribution of solar or artificial radiation (shown in FIG. 52). The numerical integration was done using MATLAB R2017a (26), and the values calculated for $\alpha$ and $\tau$ are listed in the Table 3.

TABLE 3

The average hemispherical absorptivity and transmissivity of materials for artificial and solar radiation within the range of 285-2500 nm.

| Material | Solar radiation | Artificial radiation |
|---|---|---|
| Zeolite-13X | $\alpha_{solar}$ = 0.10 | $\alpha_{lab}$ = 0.04 |
| MOF-801 | $\alpha_{solar}$ = 0.01 | $\alpha_{lab}$ = 0.02 |
| MOF-801/G (33 wt %) | $\alpha_{solar}$ = 0.56 | $\alpha_{lab}$ = 0.62 |
| MOF-303 | $\alpha_{solar}$ = 0.01 | $\alpha_{lab}$ = 0.03 |
| MOF-303/G (33 wt %) | $\alpha_{solar}$ = 0.67 | $\alpha_{lab}$ = 0.71 |
| Cover | $\tau_{solar}$ = 0.92 | $\tau_{lab}$ = 0.83 |

Section S9.2. Water Production Under Laboratory Conditions

A set of water harvesting experiments was performed on Zeolite 13X, MOF-801/G, MOF-303/G under controlled laboratory conditions. To exclude error originating from humidity remaining in the water sorption unit, the case, and in between the graphite particles, harvesting experiments were conducted with an empty sorbent container and graphite. Table 4 summarizes the amount of sorbent used in the experiment as well as the adsorption/desorption conditions.

TABLE 4

Test conditions for the water harvesting in the laboratory.

| # Test | Sorbent | Test conditions |
|---|---|---|
| 1 | no sorbent | adsorption: night conditions (30-50% RH, 18-25° C.) desorption: low flux radiation (7.5 h) |
| 2 | graphite (0.25 kg) | adsorption: night conditions (30-50% RH, 18-25° C.) desorption: low flux radiation (7.5 h) |
| 3 | Zeolite 13X (0.5 kg) | adsorption: night conditions (30-50% RH, 18-25° C.) desorption: low flux radiation (7.5 h) |
| 4 | Zeolite 13X (0.5 kg) | adsorption: night conditions (50-70% RH, 18-25° C.) desorption: high flux radiation (7.5 h) |
| 5 | MOF-801/G (1.650 kg) | adsorption: night conditions (30-50% RH, 18-25° C.) desorption: low flux radiation (7.5 h) |
| 6 | MOF-801/G (1.650 kg) | adsorption: night conditions (30-50% RH, 18-25° C.) desorption: high flux radiation (7.5 h) |
| 7 | MOF-801/G (0.825 kg) | adsorption: night conditions (30-50% RH, 18-25° C.) desorption: low flux radiation (7.5 h) |
| 8 | MOF-801/G (0.825 kg) | adsorption: night conditions (30-50% RH, 18-25° C.) desorption: high flux radiation (7.5 h) |
| 9 | MOF-801/G (0.412 kg,) | adsorption: night conditions (30-50% RH, 18-25° C.) desorption: low flux radiation (7.5 h) |
| 10 | MOF-801/G (0.412 kg) | adsorption: night conditions (30-50% RH, 18-25° C.) desorption: high flux radiation (7.5 h) |
| 11 | MOF-303/G (0.600 kg) | adsorption: night conditions (30-50% RH, 18-25° C.) desorption: low flux radiation (7.5 h) |
| 12 | MOF-303/G (0.600 kg) | adsorption: night conditions (30-50% RH, 18-25° C.) desorption: high flux radiation (7.5 h) |
| 13 | MOF-801/G (0.600 kg) | adsorption: controlled conditions (35% RH, 15° C.) desorption: low flux radiation (7.5 h) |
| 14 | MOF-303/G (0.600 kg) | adsorption: controlled conditions (35% RH, 15° C.) desorption: low flux radiation (7.5 h) |

Relative Humidity/Temperature Experimental Data for Water Harvesting Under Laboratory Conditions:

The temperature and relative humidity profiles for all laboratory water harvesting cycles are shown in FIGS. 55-68. The amount of collected liquid water is given for each experiment. The last 30 minutes of saturation are shown to evaluate the saturation conditions. Low and high fluxes are 558 and 792 W m$^{-2}$, respectively. The temperature sensors were placed at the surface of the sorbent (sorbent surface), in the sorbent (sorbent interior), at side wall of the case (exterior side wall), at the bottom of the condenser (condenser), and outside (ambient). The ambient dew temperature was estimated from the ambient RH and temperature readings. The relative humidity sensors were placed at the top of the sorbent surface (sorbent surface), at the bottom of the case in the proximity of the condenser (condenser) and outside (ambient).

For experiment 13 and 14 (Table 4), the saturation was carried out using an Espec environmental chamber. After the sorbent was taken out of the chamber and transferred to the water sorption unit, the case was sealed and the release process was started immediately.

Section S9.3. Evaluation of Water Harvesting Cycle Performance

The capture capacity $\omega_{cap}$ was estimated from the temperature and RH profiles for last 30 minutes of saturation. Final capacity $\omega_{fin}$ was estimated from the temperature and RH profiles assuming that the sorbent and air are in equilibrium with each other i.e. the change in RH and temperature values are smaller than their uncertainties for last 30 minutes of the harvesting experiment before liquid water collection. The amount of released water per mass of sorbent, $\omega_{rel}$, is the difference between $\omega_{cap}$ and $\omega_{fin}$. The capture, release, and water harvesting cycle efficiencies as well as the productivity are shown in Table 5.

TABLE 5

The performance parameters for water production under laboratory conditions.

| Sorbent | Test condition | Collected water (g) | $\omega_{cap}$ | $\omega_{rel}$ | $\eta_R$ (%) | $\eta_C$ (%) | $\eta_{WHC}$ (%) | P (g · kg$^{-1}$) |
|---|---|---|---|---|---|---|---|---|
| No sorbent (empty pan) | Low flux | 0 | — | — | — | — | — | — |
| Graphite (0.25 kg) | Low flux | 0 | — | — | — | — | — | — |
| Zeolite 13X (0.05 kg) | Low flux | 6 | 0.31 | 0.01 | 4 | 100 | 4 | 12 |
| Zeolite 13X (0.05 kg) | High flux | 29 | 0.34 | 0.06 | 18 | 97 | 17 | 58 |
| MOF801/G (1.650 kg) | Low flux | 25 | 0.13 | 0.05 | 39 | 30 | 12 | 15 |
| MOF801/G (1.650 kg) | High flux | 65 | 0.12 | 0.09 | 76 | 43 | 33 | 39 |
| MOF801/G (0.825 kg) | Low flux | 37 | 0.11 | 0.05 | 44 | 93 | 41 | 45 |
| MOF801/G (0.825 kg) | High flux | 78 | 0.12 | 0.10 | 86 | 92 | 79 | 95 |
| MOF801/G (0.412 kg) | Low flux | 26 | 0.13 | 0.64 | 49 | 99 | 48 | 63 |
| MOF801/G (0.412 kg) | High flux | 36 | 0.12 | 0.01 | 83 | 90 | 75 | 87 |
| MOF303/G (0.600 kg) | Low flux | 60 | 0.25 | 0.15 | 57 | 68 | 39 | 100 |
| MOF303/G (0.600 kg) | High flux | 105 | 0.27 | 0.22 | 81 | 79 | 65 | 175 |
| MOF801/G (0.600 kg) | Low flux controlled | 28 | 0.12 | 0.05 | 42 | 88 | 37 | 47 |
| MOF303/G (0.600 kg) | Low flux controlled | 60 | 0.27 | 0.15 | 55 | 67 | 37 | 100 |

Section S9.4. Design Considerations for Water Release

In this section, a theoretical approach to estimate the energy requirements for release of water from the MOF and subsequent condensation is discussed.

Figure 70:
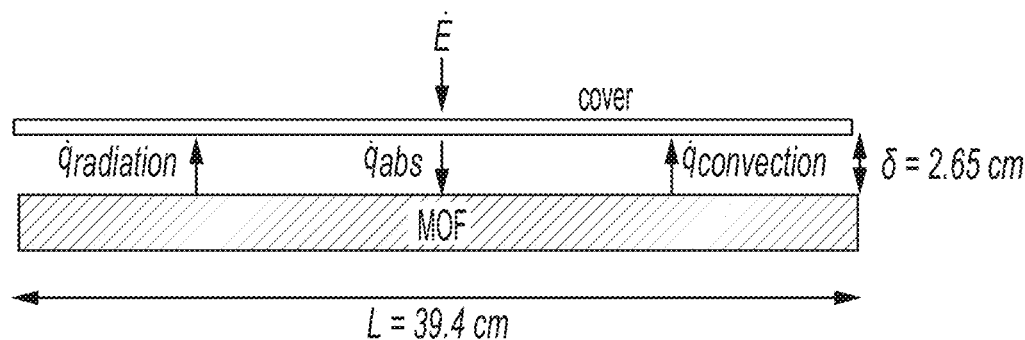
FIG. 70 depicts a schematic of energy flow on the top surface of the water sorption unit.

FIG. 70 shows the incident radiation flux ($\dot{E}$), a portion of it passing through the transparent cover, which is subsequently absorbed by a unit mass of MOF ($\dot{q}_{abs}$). A fraction of this energy is lost in the forms of the radiative heat loss ($\dot{q}_{radiation}$) and convective heat loss ($\dot{q}_{convection}$). The thermal radiation emitted by cover was neglected and it is assumed that the conducive heat loss is minimized by using extruded polystyrene foam with low thermal conductivity (0.027 W m$^{-1}$ K$^{-1}$).

Considering the uniform temperature distribution within the MOF $$\left(Bi = \frac{hL_c}{k} < 0.1\right)$$

at any given time, the energy balance for a control volume including the MOF is:

$$\rho_{eff} c_{p,eff} \frac{dT}{dt} - \rho_{MOF} q_{st} \frac{d\omega}{dt} = \left(\frac{A}{V_{bed}}\right)(\dot{q}_{abs} - \dot{q}_{radiation} - \dot{q}_{convection}) \quad (S13)$$

Time-dependent effective properties of the sorbent packing are defined by the following equations, $$\rho_{eff} = \rho_{MOF}(1-\varepsilon)(1+\omega) + \rho_{air}\varepsilon \quad (S14)$$

and $$c_{p,eff} = \frac{\rho_{MOF,dry}(1-\varepsilon)(c_{p,MOF,dry} + \omega c_{p,water}) + \rho_{air} c_{p,air} \varepsilon}{\rho_{eff}}, \quad (S15)$$

where $\varepsilon$, $c_p$, $\rho$ are the packing porosity (excluding the MOF internal pore volume), heat capacity, and density, respectively. Replacing the effective properties in Eqn. S13 with Eqns. S14 and S15 and integrating Eqn. S13 over the release period results in:

$$\int_{T_{cap}}^{T_{rel}} (\rho_{MOF,dry}(1-\varepsilon)(c_{p,MOF,dry} + \omega c_{p,water}) + \rho_{air} c_{p,air} \varepsilon) dT - \quad (S16)$$

$$\int_{\omega_{cap}}^{\omega_{rel}} \rho_{MOF} q_{st} d\omega = \left(\frac{A}{V_{bed}}\right) \int_{sunrise}^{sunset} (\dot{q}_{abs} - \dot{q}_{radiation} - \dot{q}_{convection}) dt$$

Assuming that the entire amount of captured water is desorbed during the release process at the release temperature, the released water vapor is in thermal equilibrium with the MOF, and assuming that the variations of density and heat capacity with temperature are small, Eqn. S16 becomes:

$$[(c_{p,MOF,dry} + \omega_{cap} c_{p,water})(1-\varepsilon) + (\rho_{air}/\rho_{MOF,dry})c_{p,air}\varepsilon] \quad (S17)$$

$$(T_{rel} - T_{cap}) + \omega_{cap} q_{st} =$$

$$\left(\frac{1}{\rho_{MOF,dry}}\right)\left(\frac{A}{V_{bed}}\right) \int_{sunrise}^{sunset} (\dot{q}_{abs} - \dot{q}_{radiation} - \dot{q}_{convection}) dt$$

The total received energy per mass of MOF is defined:

$$q_H = \left(\frac{1}{\rho_{MOF,dry}}\right)\left(\frac{A}{V_{bed}}\right) \int_{sunrise}^{sunset} (\dot{q}_{abs} - \dot{q}_{radiation} - \dot{q}_{convection}) dt \quad (S18)$$

The total sensible energy is defined as the amount of energy per unit mass of MOF spent to increase the temperature of MOF from the capture temperature to the release temperature as:

$$q_{sensible} = \quad (S19)$$

$$\left[(c_{p,MOF,dry} + \omega_{cap} c_{p,water})(1-\varepsilon) + \left(\frac{\rho_{air}}{\rho_{MOF,dry}}\right) c_{p,air}\varepsilon\right](T_{rel} - T_{cap})$$

The total latent energy is defined as the amount of energy per unit mass of MOF spent to desorb the entire amount of captured water from the MOF as:

$$q_{latent} = \omega_{cap} q_{st} \quad (S20)$$

Figure 71:
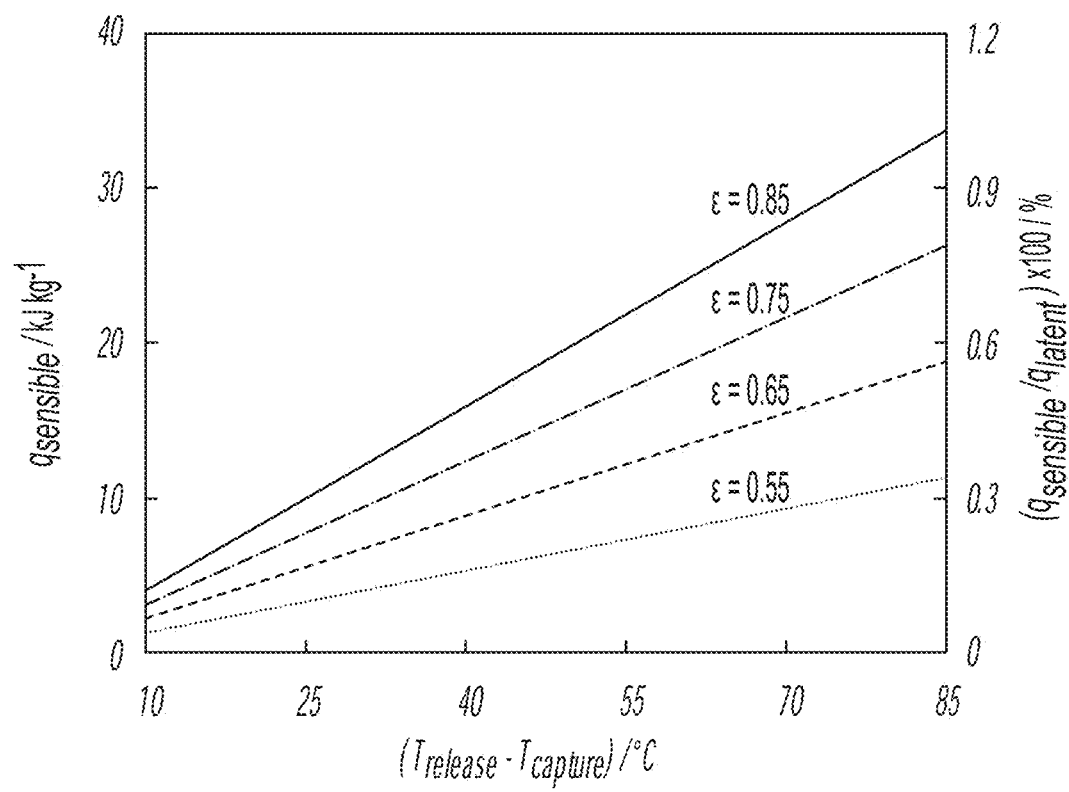
FIG. 71 depicts variations of $q_{sensible}$ with the release and capture temperature for four values of packing porosities of 0.85, 0.75, 0.65, and 0.55. $q_{sensible}$ was calculated for a capture temperature of 20° C. The ratio of sensible to latent energy reveals that the majority of the energy is spent on breaking the MOF-water interactions, rather than increasing the temperature of the MOF during the release process.

$q_{sensible}$ and $q_{latent}$ considerations:

In this section, a comparison between the $q_{sensible}$ and $q_{latent}$ for the designed water harvester is provided based on our preliminary laboratory data on MOF-801/G. The RH of 35% at 25° C. was considered for the water capture process which results in $\omega_{cap}$=0.14. The average value of $q_{st,801}$=3000 kJ kg$^{-1}$ was determined from the sorption isotherms resulting in $q_{latent}$=420 kJ kg$^{-1}$. With $c_{p,801}$=760 J kg$^{-1}$ K$^{-1}$ and $\rho_{p,801}$=1400 kg m$^{-3}$ (15), $c_{p,G}$=760 J kg$^{-1}$ K$^{-1}$ and 2150 kg m$^{-3}$ (27), then the density and heat capacity of the mixture are $\rho_{p,801/G}$=1584 kg m$^{-3}$ and $c_{p,801/G}$=743 J kg$^{-1}$ K$^{-1}$, respectively. The values of a $q_{sensible}$ and $q_{sensible}/q_{latent}$ for different $\Delta T_{WH}$=$T_{rel}$-$T_{cap}$ are shown in the FIG. 71 where the water and air properties were calculated at the mean release and capture temperatures. The results indicate that the a $q_{sensible} \ll q_{latent}$ during the release process, therefore, almost all the incident energy is spent on overcoming the MOF-water interactions.

$\dot{q}_H$ Considerations:

To determine $\dot{q}_H$, it is required to quantify $\dot{q}_{abs}$, $\dot{q}_{radiation}$, and $\dot{q}_{convection}$. For the laboratory experiment with artificial flux, $$\dot{q}_{abs} = \alpha_{MOF,lamp} \tau_{cover,lamp} \dot{E}_{lamp} \quad (S21)$$

where $\alpha_\lambda$ and $\tau_\lambda$ are absorptivity of the MOF-801/G and transmissivity of the cover, respectively, and $\dot{E}_{lamp}$ is the measured incident radiation flux on the surface of the cover. With the average constant low and high fluxes $\dot{E}_{lamp}$=558 and 792 W m$^{-2}$, and the values of $\alpha_{MOF,lamp}$ and $\tau_{cover,lamp}$ taken from Section S7.3, the total radiant flux received by a unit mass of MOF-801/G was determined and listed in Table 6.

TABLE 6

Total flux received by different sorbents for the laboratory experiment using low and high fluxes

| | ($\dot{q}_{abs}$/W m$^{-2}$) | |
|---|---|---|
| Sorbent | Low flux | High flux |
| Zeolite 13X | 18 | 28 |
| MOF-801/G | 277 | 430 |
| MOF-303/G | 317 | 492 |

Figure 72:
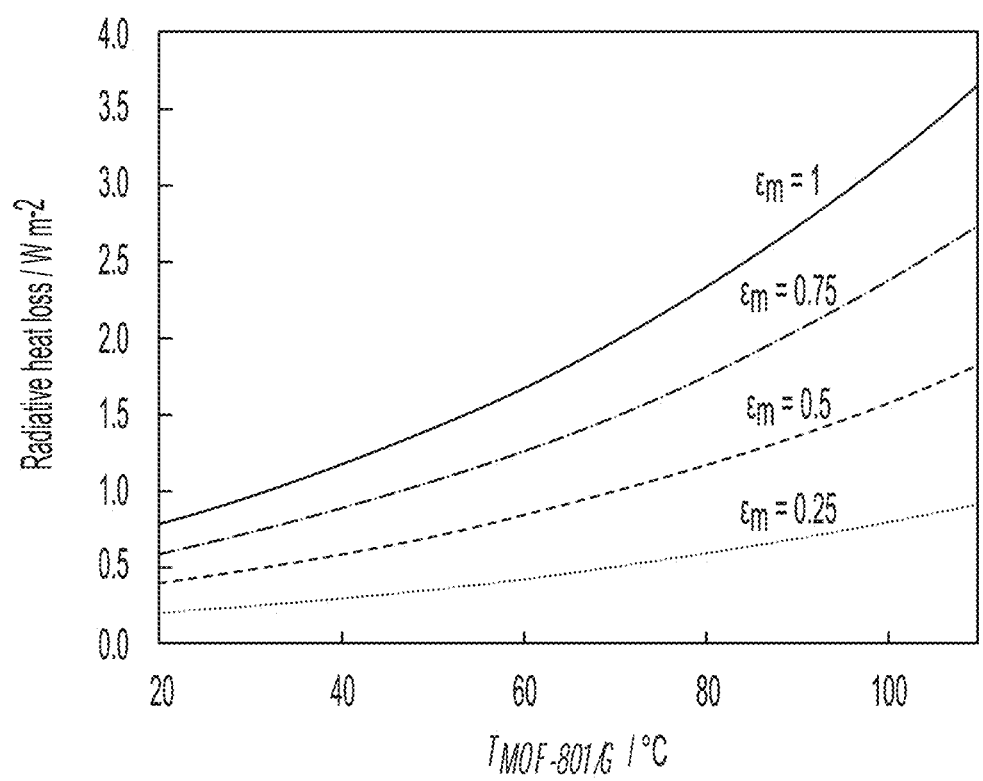
FIG. 72 depicts variations of radiative heat loss with MOF-801/G temperature for different values of emissivity.

The radiative heat loss from the sorbent surface can be determined by, $$\dot{q}_{radiation} = \varepsilon_m \sigma T_{MOF}^4 \quad (S22)$$

where $\sigma$=5.670×10$^{-8}$/W m$^{-3}$ K$^4$ is the Stefan-Boltzmann constant and $\varepsilon_m$ is the hemispherical emissivity of the sorbent. Variations of $\dot{q}_{radiation}$ with the temperature and emissivity are shown in FIG. 72. It can be observed that for the range of temperature required for the release of water from MOF ($T_{release}$<80° C.), the heat loss due to radiation is negligible (<4 W m$^{-2}$) compared to the received flux (~250-500 W m$^{-2}$), even if the MOF is considered a blackbody emitter ($\varepsilon=1$). In the calculations of incident flux, the maximum value of 4 W m$^{-2}$ was considered for the radiative heat loss.

The heat loss from the MOF surface to the cover due to convection was determined by, $$\dot{q}_{convection} = \bar{h}(T_{MOF} - T_{cover}) \quad \text{(S23)}$$

where $\bar{h}$ is the average convective heat transfer coefficient over the length of the MOF surface and $T_{cover}$ is the surface temperature of the cover. The Rayleigh number was calculated using the following equation, $$Ra_L = \frac{g\rho\beta(T_{MOF} - T_{cover})\delta^3}{\alpha_T \mu} \quad \text{(S24)}$$

where $\beta$, $\alpha_T$, and $\mu$ are the volumetric thermal expansion coefficient, thermal diffusivity, and dynamic viscosity of the air, respectively, and g is the gravitational acceleration. To determine the value of $\beta$, $\alpha_T$, and $\mu$, air was considered as an ideal gas and the following relations and correlations were used, $$\rho = \frac{P}{RT} \quad \text{(S25)}$$

$$\beta = \frac{1}{T} \quad \text{(S26)}$$

$$\mu = \mu_{ref}\left(\frac{T}{T_{ref}}\right)^{3/2}\left(\frac{T_{ref} + 110.4}{T + 110.4}\right) \quad \text{(S27)}$$

where $\mu_{ref} = 1.8205 \times 10^{-5}$ kg m$^{-1}$s$^{-1}$ at $T_{ref} = 293.15$ K, and $$c_p[kJ\ kg^{-1}\ K^{-1}] = \quad \text{(S28)}$$
$$1.05 - 0.365\left(\frac{T}{1000}\right) + 0.85\left(\frac{T}{1000}\right)^2 - 0.39\left(\frac{T}{1000}\right)^3$$

$$k[W\ m^{-1}\ K^{-1}] = \quad \text{(S29)}$$
$$10^{-4} \times [1.52 \times 10^{-7} T^3 - 4.86 \times 10^{-4} T^2 + 1.02T - 3.93]$$

and $$\alpha_T = \frac{k}{\rho c_p} \quad \text{(S30)}$$

Figure 73:
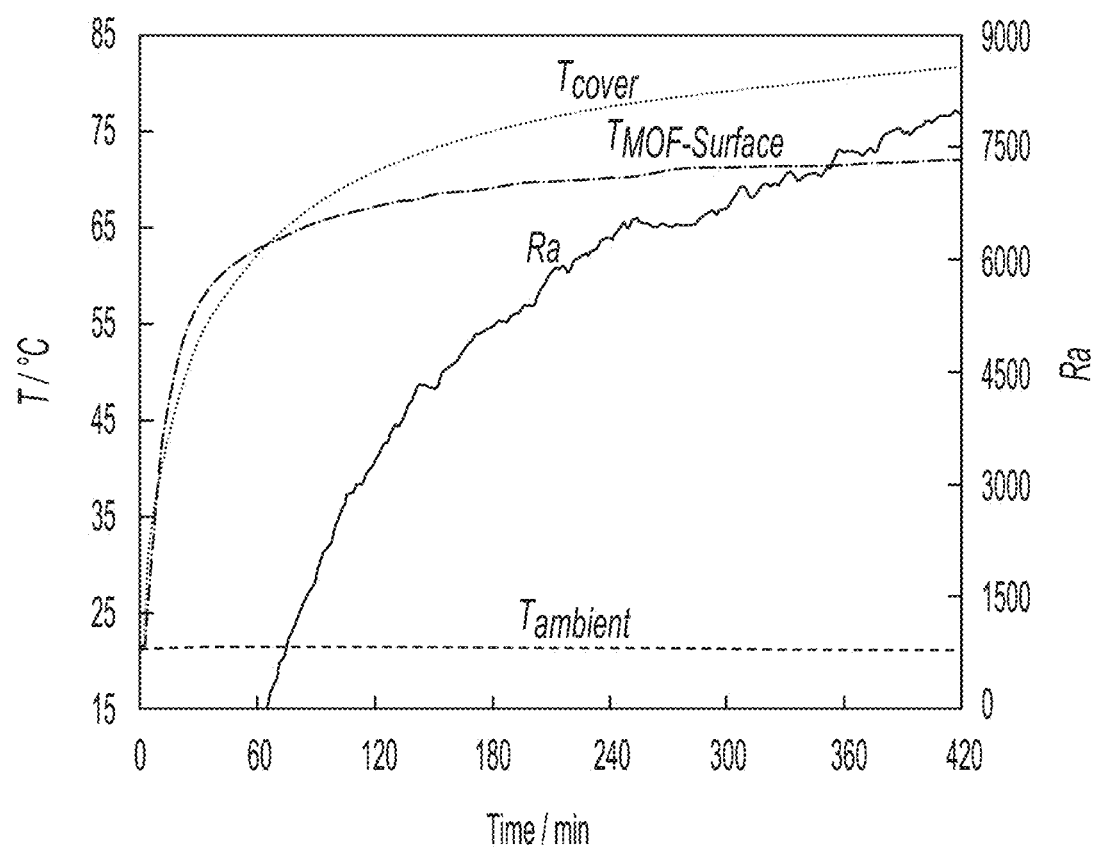
FIG. 73 depicts variations of the temperature of MOF-801/G and the cover. Increase in the Rayleigh number is observed due to the increase in temperature difference. During the first 60 minutes, the cover temperature was higher than that of the MOF with no heat loss.

The Rayleigh number was estimated by taking the temporal measurement of the temperature of the MOF and the inner surface of the cover under low flux radiation. The temperature profile and instantaneous value of Ra are shown in FIG. 73.

For $\delta/L > 12$ ($\delta/L = 14.2$ in the current design), the following correlation (28) was used to determine the Nusselt number (Nu), $$\overline{Nu} = \begin{cases} 1.44\left(1 - \frac{1708}{Ra}\right) + \left(\frac{Ra}{5830}\right)^{\frac{1}{3}} & 1708 < Ra < \sim 10000 \\ 1 & Ra < 1708 \end{cases} \quad \text{(S31)}$$

where the critical Rayleigh number ($Ra_c = 1708$) determines whether buoyancy forces can overcome the resistance imposed by the viscous forces or not. With the known $\overline{Nu}$, $\bar{h}$ as a function of time was found using:

$$\bar{h} = \frac{k\overline{Nu}}{\delta} \quad \text{(S32)}$$

The total energy absorbed by MOF-801/G for the case of low flux is:

$$q_{abs} = \int_{t=0}^{t=end} \dot{q}_{abs} dt = 277W\ m^{-2} \times 7.5h \times 3600s\ h^{-1} = 7479 kJ\ m^{-2} \quad \text{(S33)}$$

The radiative heat loss from the sorbent surface was determined by:

$$q_{radiation} = \quad \text{(S34)}$$
$$\int_{t=0}^{t=end} \dot{q}_{radiation} dt = 4W\ m^{-2} \times 7.5h \times 3600s\ h^{-1} = 108 kJ\ m^{-2}$$

Total heat loss per unit area during the entire release cycle was found by numerical integration of the measured data and calculated $\bar{h}$ using MATLAB R2017a:

$$q_{convection} = \int_{t=0}^{t=end} \bar{h}(T_{MOF} - T_{cover}) dt = 3.4 kJ\ m^{-2} \quad \text{(S35)}$$

Therefore, the total radiative heat loss and the total convective heat loss from the MOF surface are less than 1.5% and 0.05%, respectively. This would result in the total heat loss of less than 1.6%.

Figure 74:
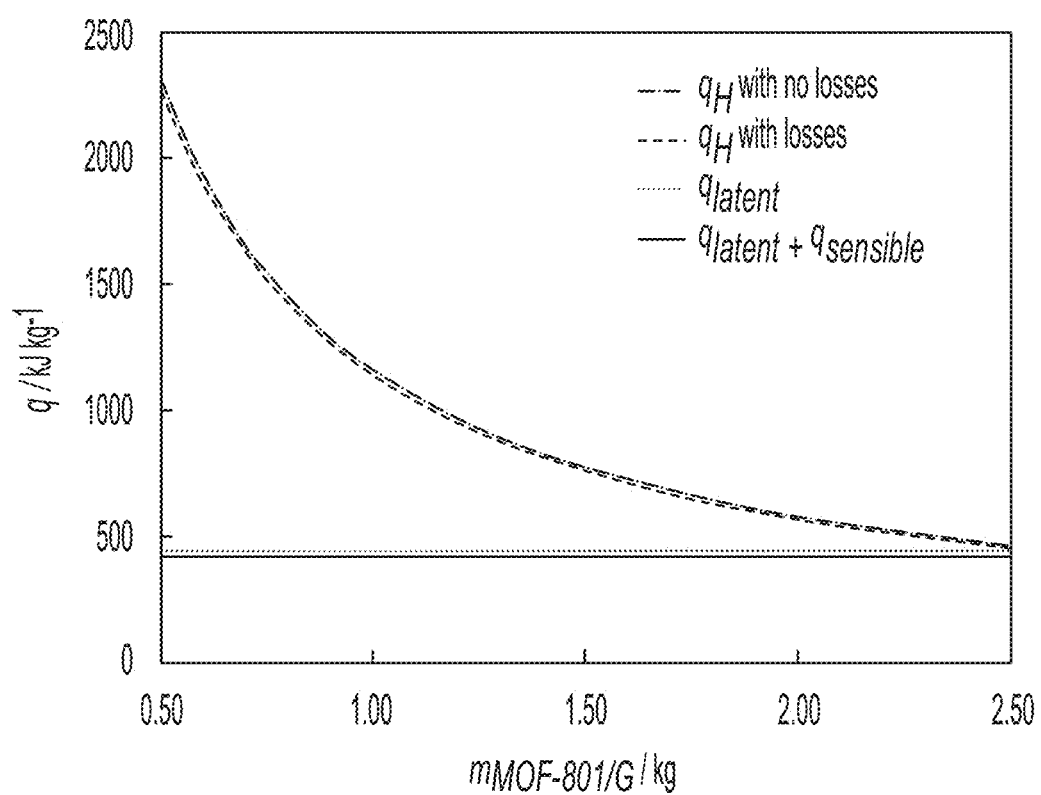
FIG. 74 depicts a graph showing the comparison of $q_H$ (with and without heat losses) and the amount of MOF-810/G to the latent and sensible energy per kg of MOF-801/G.

The total energy required for the release of water ($q_H$) was plotted versus the amount of MOF-801/G with and without the heat losses for and exposed surface of 0.155 m$^2$ (FIG. 74).

In addition, the total energy required to heat up the MOF and release the captured water ($q_{latent} + q_{sensible}$) is also plotted and compared to a $q_{latent}$. The results reveal that up to 2.5 kg of MOF-801/G can be used in this water harvester; below this mass, the incident radiant energy is sufficient to fully release the captured water from the MOF. It should be noted that the same result is achieved by considering no energy losses from the MOF to the surroundings and neglecting the sensible energy. This eliminates the complication in the calculation and allows a simple criterion to be defined, $$q_H \geq q_{latent} \quad \text{(S36)}$$

or $$\left(\frac{1}{\rho_{MOF,dry}}\right)\left(\frac{A}{V_{bed}}\right) \int_{sunrise}^{sunset} (\dot{q}_{abs}) dt \geq \omega_{cp} q_{st} \quad \text{(S37)}$$

Section S9.5 Design Considerations for Water Condensation

In this section, a theoretical approach to estimate the energy requirements for condensation of water released from the MOF is discussed.

$\dot{q}_c$ Considerations:

The energy required for condensation of water vapor is used to decrease the temperature of the released water vapor ($q_{sensible}$), and liquefy water vapor $q_{latent}$) with a portion of it being lost to the surroundings. Thus, the conservation of energy within the condenser over the condensation period is, $$q_{c,sensible} + q_{c,latent} + q_{c,loss} = \tag{S38}$$
$$\omega_{rel} c_{p,wv}(T_{wv} - T_{dew}) + \frac{m_{air}}{m_{MOF}} c_{p,a}(T_a - T_{dew}) + \omega_{rel} h_{fg} + q_{c,loss}$$

where $T_{wv}$, $T_a$, and $T_{dew}$ are the temperature of the water vapor, dry air, and dew temperature, respectively. $c_{p,wv}$ and $c_{p,a}$ are the heat capacity of water vapor and air, respectively. Considering the heat loss to be negligible, thermal equilibrium between the water vapor and dry air ($T_a=T_w$), maximum possible water release, and subsequent condensation of the released water ($\omega_{rel}=\omega_{cap}$), then:

$$q_{c,sensible} + q_{c,latent} = (T_a - T_{dew})\left(\omega_{cap} c_{p,w} + \frac{m_{air}}{m_{MOF}} c_{p,a}\right) + \omega_{cap} h_{fg} \tag{S39}$$

In the case that the condensation process relies solely on natural cooling, the cooling energy can be estimated as follows, $$q_c = \int_{sunrise}^{sunset} \dot{q}_c(t) dt = A_c \int_{sunrise}^{sunset} \bar{h}[T_a - T_c] dt \tag{S40}$$

where $\bar{h}$ is the average convective heat transfer coefficient within the condenser at any given time. Considering that $m_{air}/m_{MOF} c_{p,a} \ll \omega_{cap} c_{p,w}$, the following relation can be obtained:

$$\frac{A_c}{m_{MOF}} \int_{sunrise}^{sunset} \bar{h}[T_a - T_c] dt = (T_a - T_{dew})(\omega_{cap} c_{p,w}) + \omega_{cap} h_{fg} \tag{S41}$$

Figure 75:
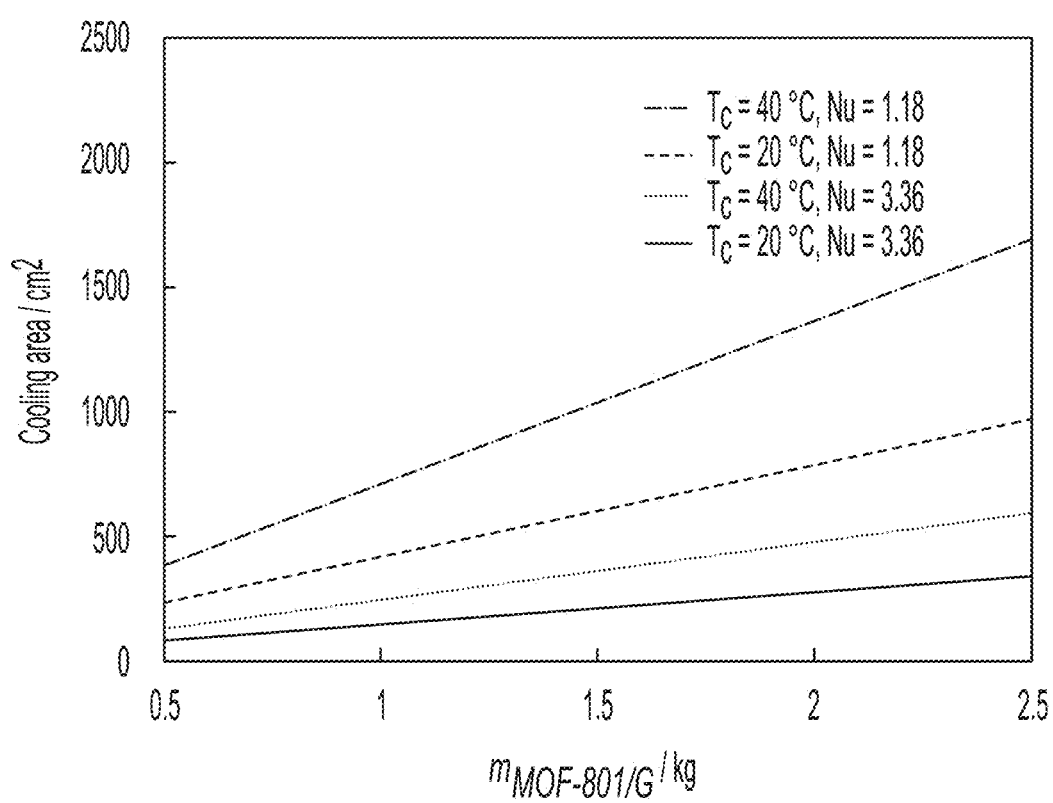
FIG. 75 depicts variations of the size of the cooling surface with the amount of MOF-810/G for a temperature of 65° C. for the released water, a condenser temperature of 20 and 40° C., and average heat condensation Nusselt number of 3.36 and 1.18. The cooling surface of 3100 cm² ensure enough cooling energy at the high condenser temperature (40° C.) and low heat transfer rate (Nu=1.18).

Here, to ensure a sufficiently large condenser surface, a minimum value of h was assumed for the case of film condensation (rather than dropwise condensation with higher heat transfer rate) on a vertical channel by using Nu=3.36 throughout the condensation period using a correlation in the literature (29). It should be noted that accurate calculation of $\bar{h}$ is possible through advanced numerical simulation or experimental measurement with the identical geometrical constrains and boundary conditions which would result in a better estimation of the required cooling energy and condenser design. Here, we considered that the release of water occurred at 65° C. and the condenser temperature was the same as the dew point ($T_c=T_a$). The total area required for condensation versus amount of MOF was calculated for different condenser temperatures and two Nusselt numbers (Nu=3.36 and Nu=1.18) which are plotted in the FIG. 75. In the current design, the total area of 3100 cm² allowed for a sufficiently large case to enclose the water sorption unit and provided an adequately large surface for the condensation of the released water from up to 2.5 kg of MOF-801/G. Less than 1% variation in cooling area was observed by neglecting the sensible cooling. This implies that the minimum cooling energy required for the condensation of released water can be determined by neglecting the sensible cooling as follows:

$$q_{c,min} \geq m_{MOF} \omega_{cap} h_{fg} \tag{S42}$$

Although increasing the size of the cooling surface provides more cooling energy for condensation, there is a theoretical limit for the volume of the condenser. The humidity ratio (w in $kg_{(water)} kg_{(dry\ air)}^{-1}$) in the vicinity of the condenser can be related to the relative humidity according to:

$$w = 10^4 \text{RH}/[e^{5294/(T_c+273.15)} - 1.61 \times 10^4 \text{RH}] \tag{S43}$$

Considering that the RH of 100% is required for the condensation, then:

$$\frac{\omega_{cap} m_{MOF}}{\rho_{air} V_c} = 10^6 /\left[e^{5294/(T_c+273.15)} - 1.61 \times 10^6\right] \tag{S44}$$

With the ratio known for $A_c$ and $m_{MOF}$ from Eqn. S39, the maximum length of the condenser ($L_{c,max}$) can be expressed as follows:

$$L_{c,max} = \frac{\omega_{cap} m_{MOF} \left[e^{5294/(T_c+273.15)} - 1.61 \times 10^6\right]}{A_c \rho_{air} 10^6} \tag{S45}$$

Considering the minimum amount of the MOF of 0.4 kg, $\omega_{cap}$=0.14, $A_c$=3100 cm², $T_c$=30° C., then $L_{c,max}$=3.16 m. In the current design, $L_c$=25.4 cm which allowed to fully saturate the condenser when $\omega_{rel}$=0.08$\omega_{cap}$.

Figure 76A:
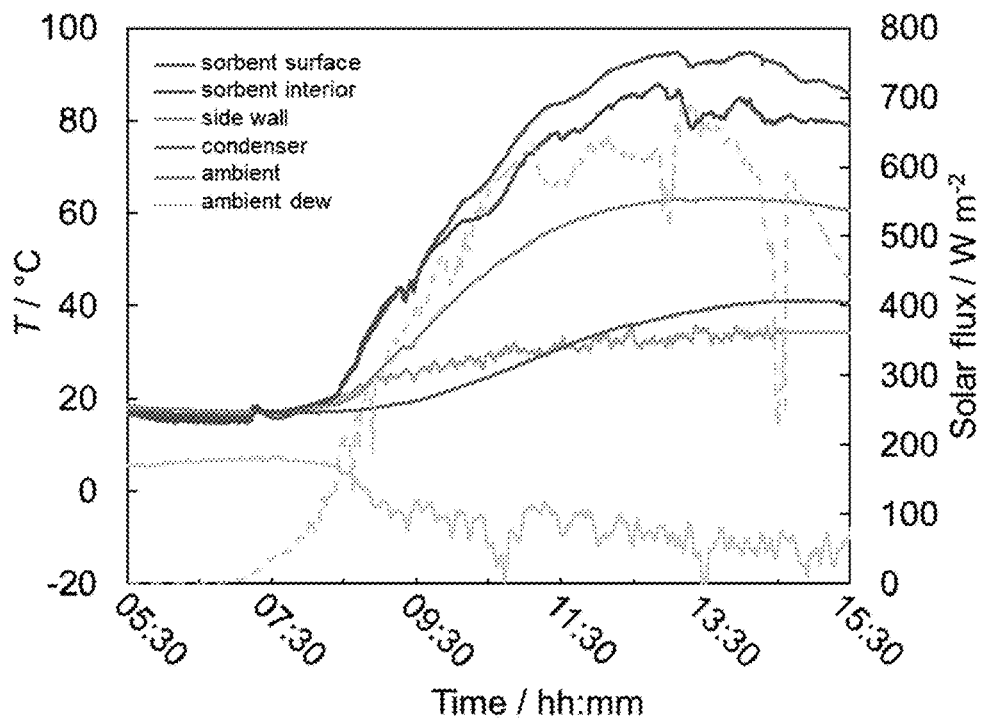
FIGS. 76A and 76B depict the temperature and relative humidity profiles recorded during water harvesting under desert conditions using 1.65 kg of MOF-801/G. 55 g of liquid water was collected. Release efficiency: 94%, collection efficiency: 25%, WHC efficiency: 24%, productivity: 33 g kg$^{-1}$.
Figure 76B:
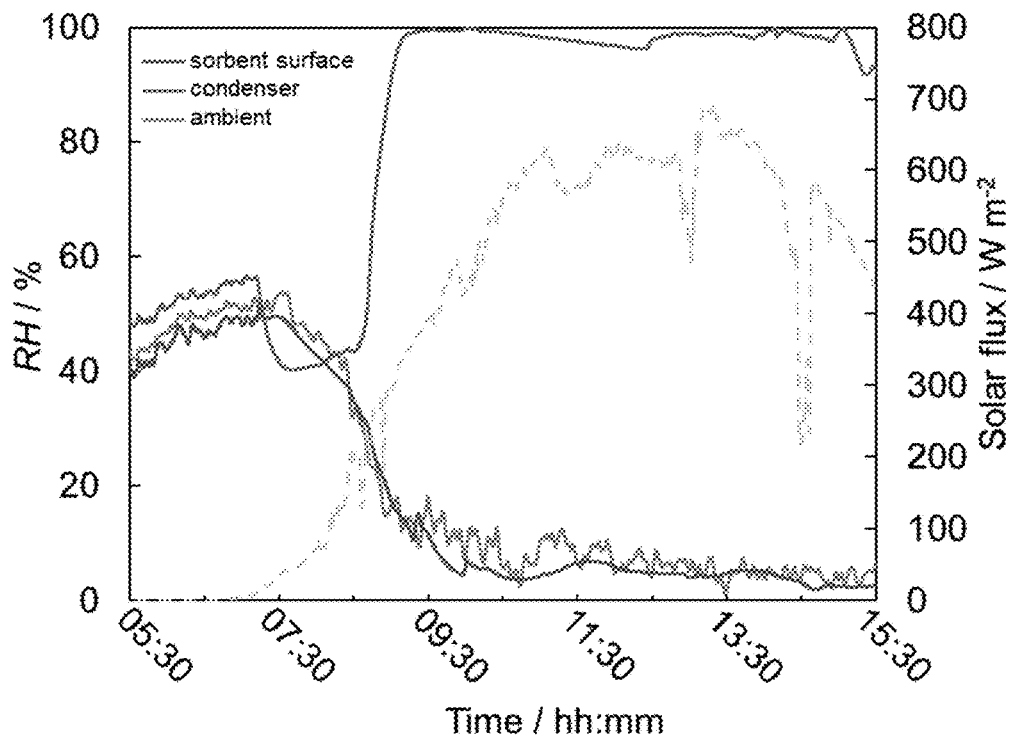
Figure 77A:
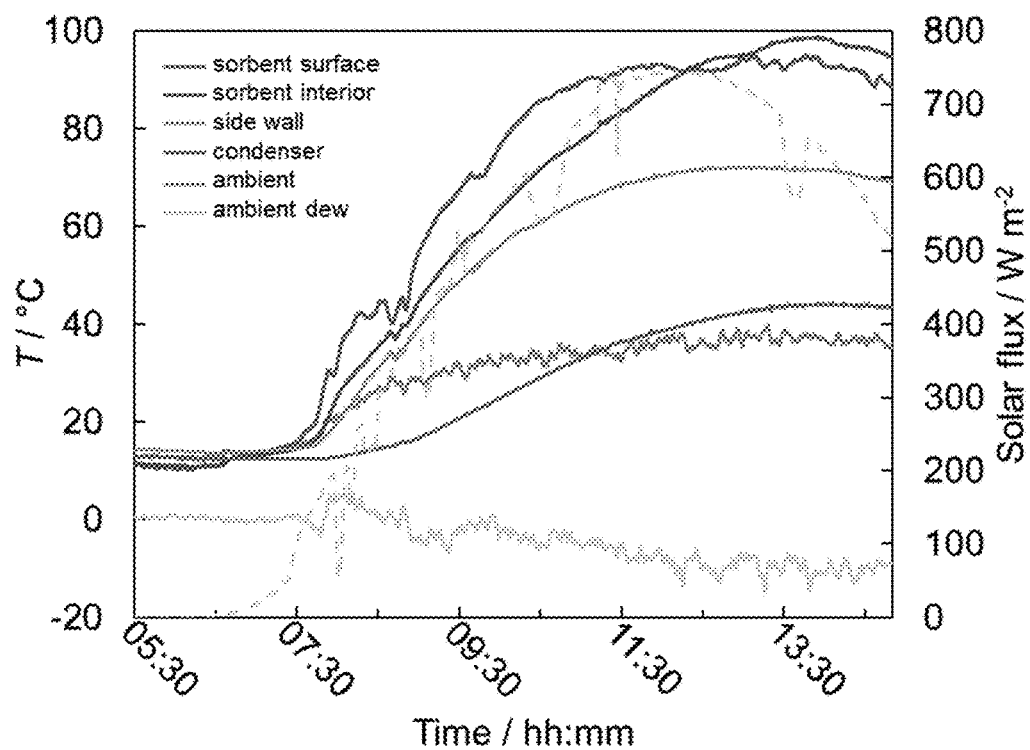
FIGS. 77A and 77B depict the temperature and relative humidity profiles recorded during water harvesting under desert conditions using 0.825 kg of MOF-801/G. 55 g of liquid water was collected. Release efficiency: 92%, collection efficiency: 56%, WHC efficiency: 51%, productivity: 67 g kg$^{-1}$.
Figure 77B:
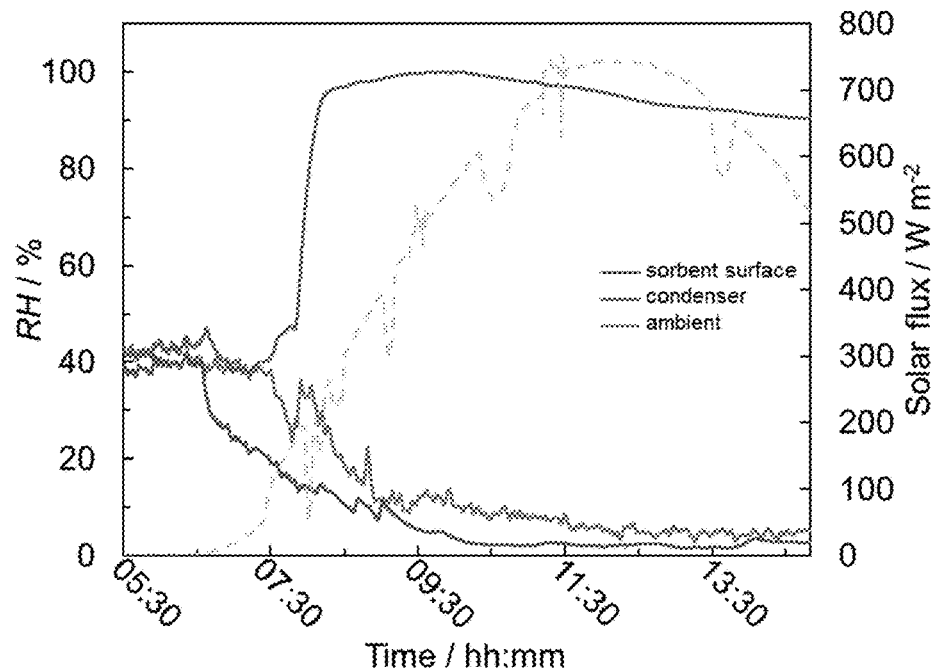
Figure 78:
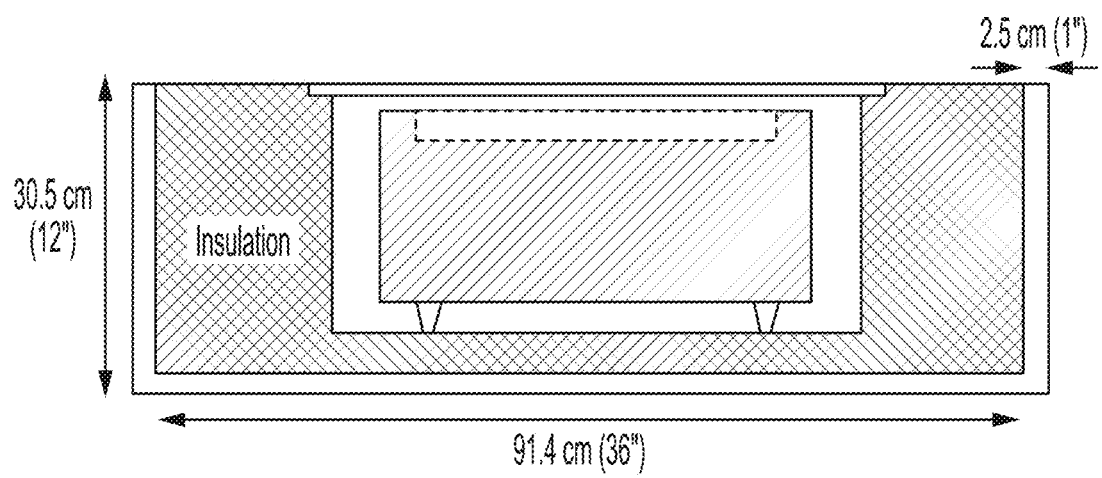
FIG. 78 depicts a schematic of the exterior insulation (soil) surrounding the case of the water harvester in desert climate.
Figure 79:
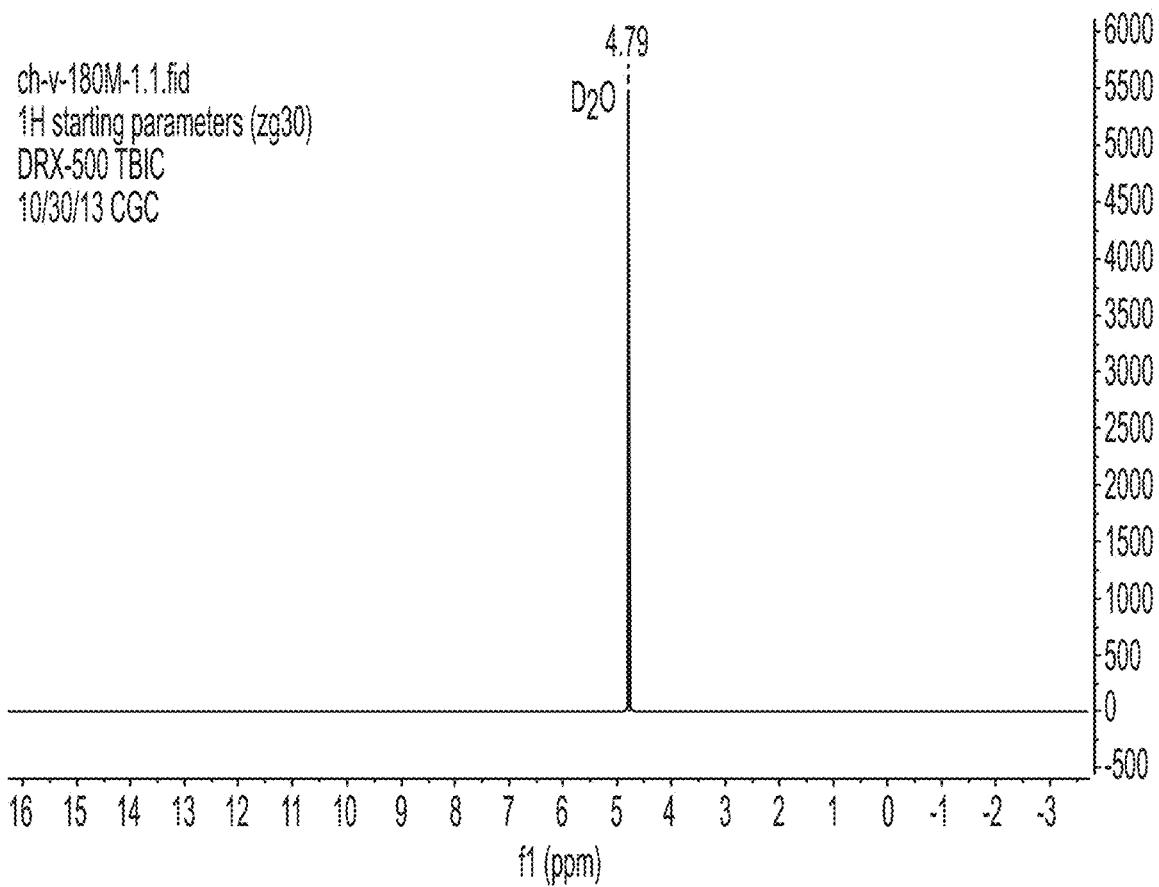
FIG. 79 depicts a ¹H-NMR spectrum of pure $D_2O$ before heating.
Figure 80:
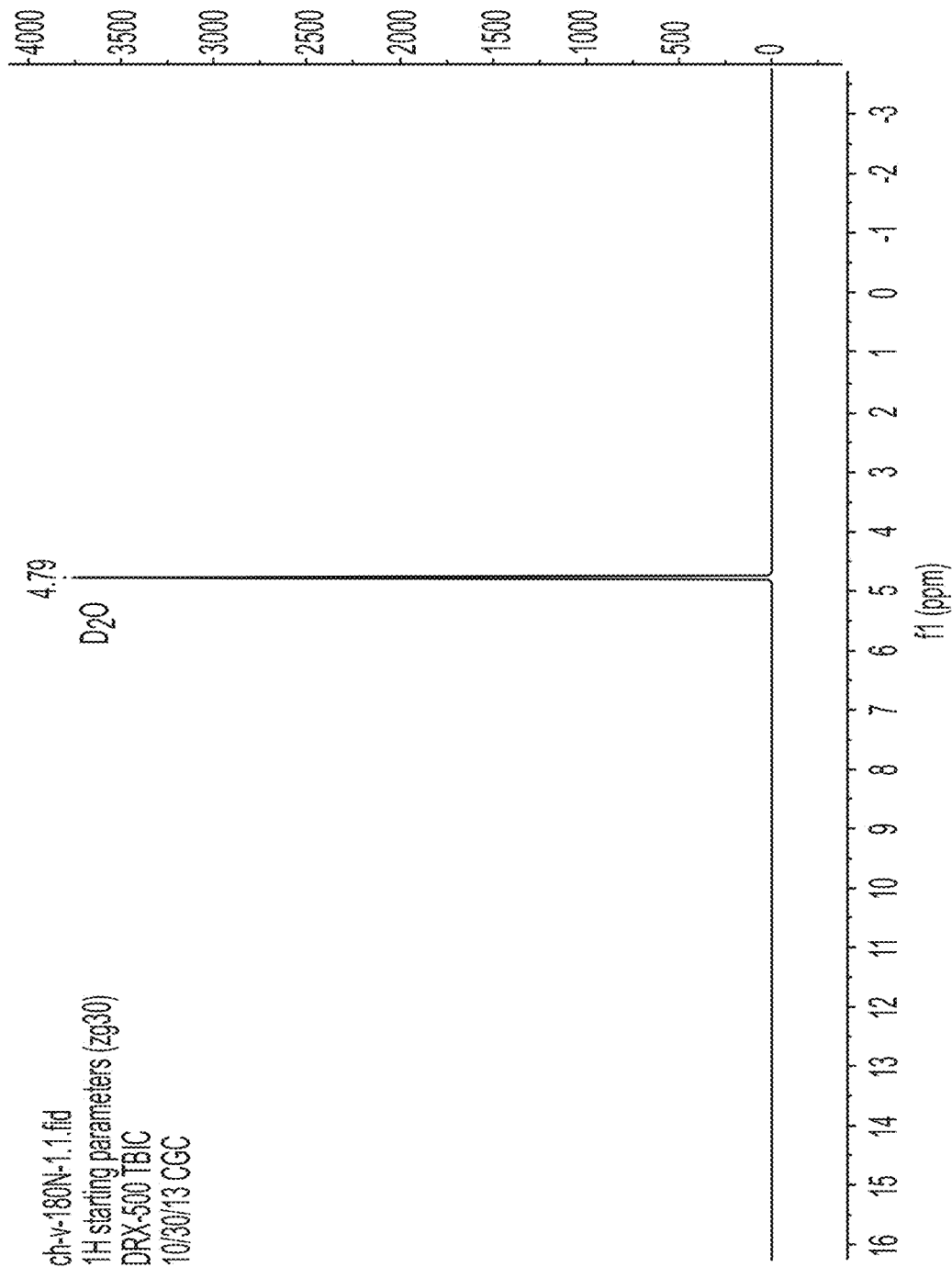
FIG. 80 depicts a ¹H-NMR spectrum of pure $D_2O$ after heating.
Figure 81:
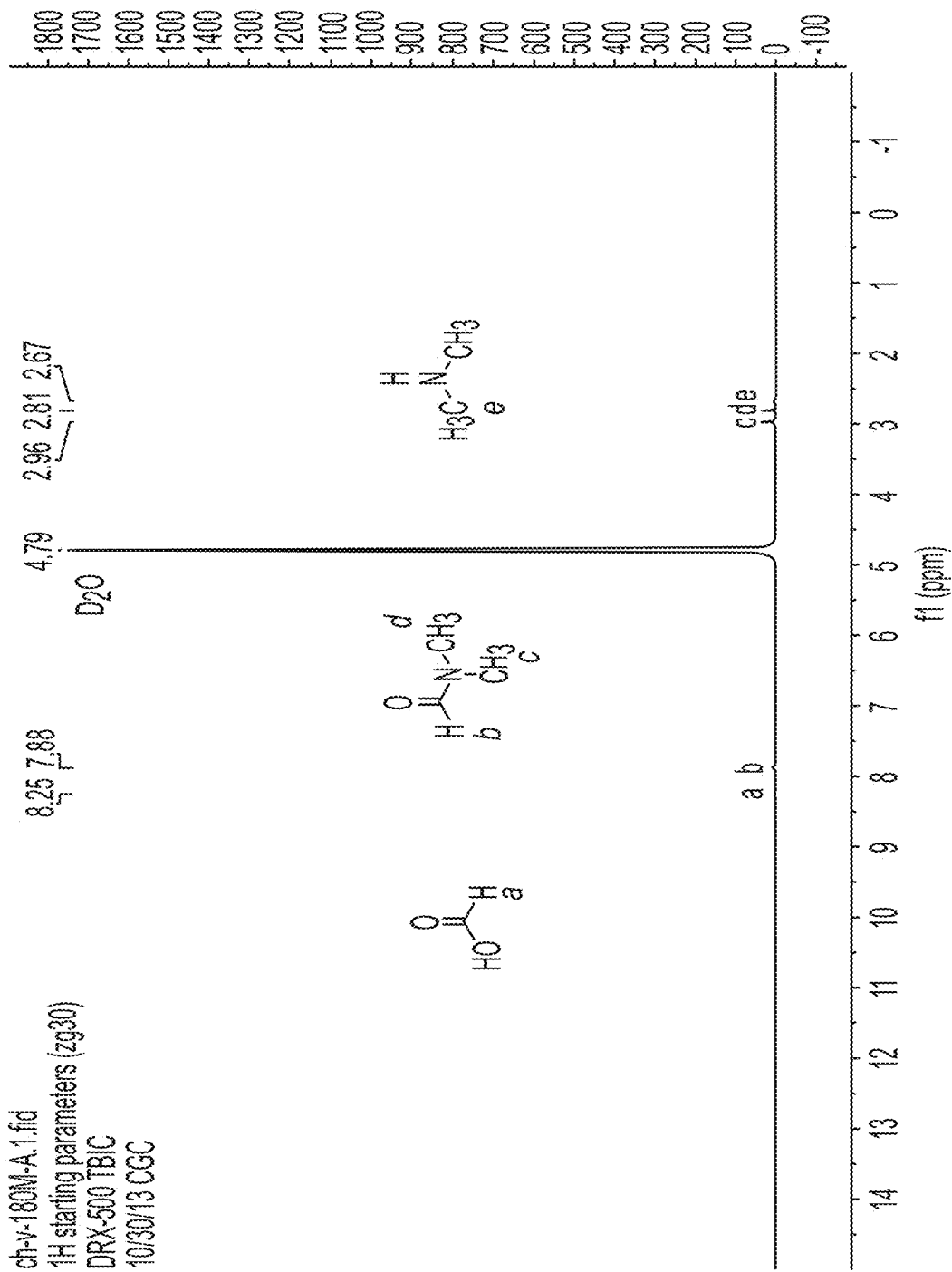
FIG. 81 depicts a ¹H-NMR spectrum of MOF-801 in $D_2O$ before heating. Observed signals: formic acid (8.25 ppm), N,N-dimethylformamide (7.88, 2.96, 2.81 ppm), N,N-dimethylamine (2.67 ppm).
Figure 82:
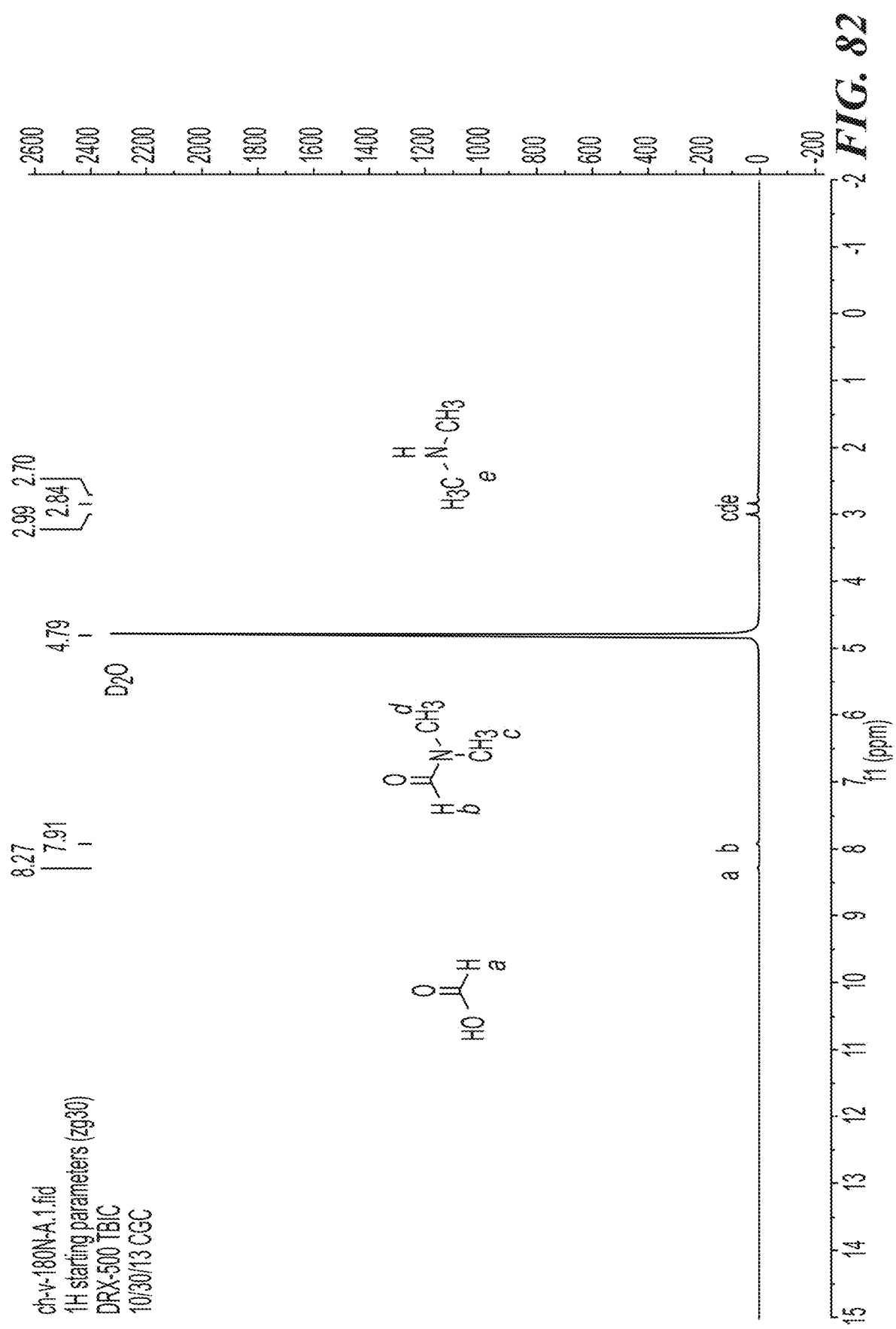
FIG. 82 depicts a ¹H-NMR spectrum of MOF-801 in $D_2O$ after heating. Observed signals: formic acid (8.27 ppm), N,N-dimethylformamide (7.91, 2.99, 2.84 ppm), N,N-dimethylamine (2.70 ppm).
Figure 83:
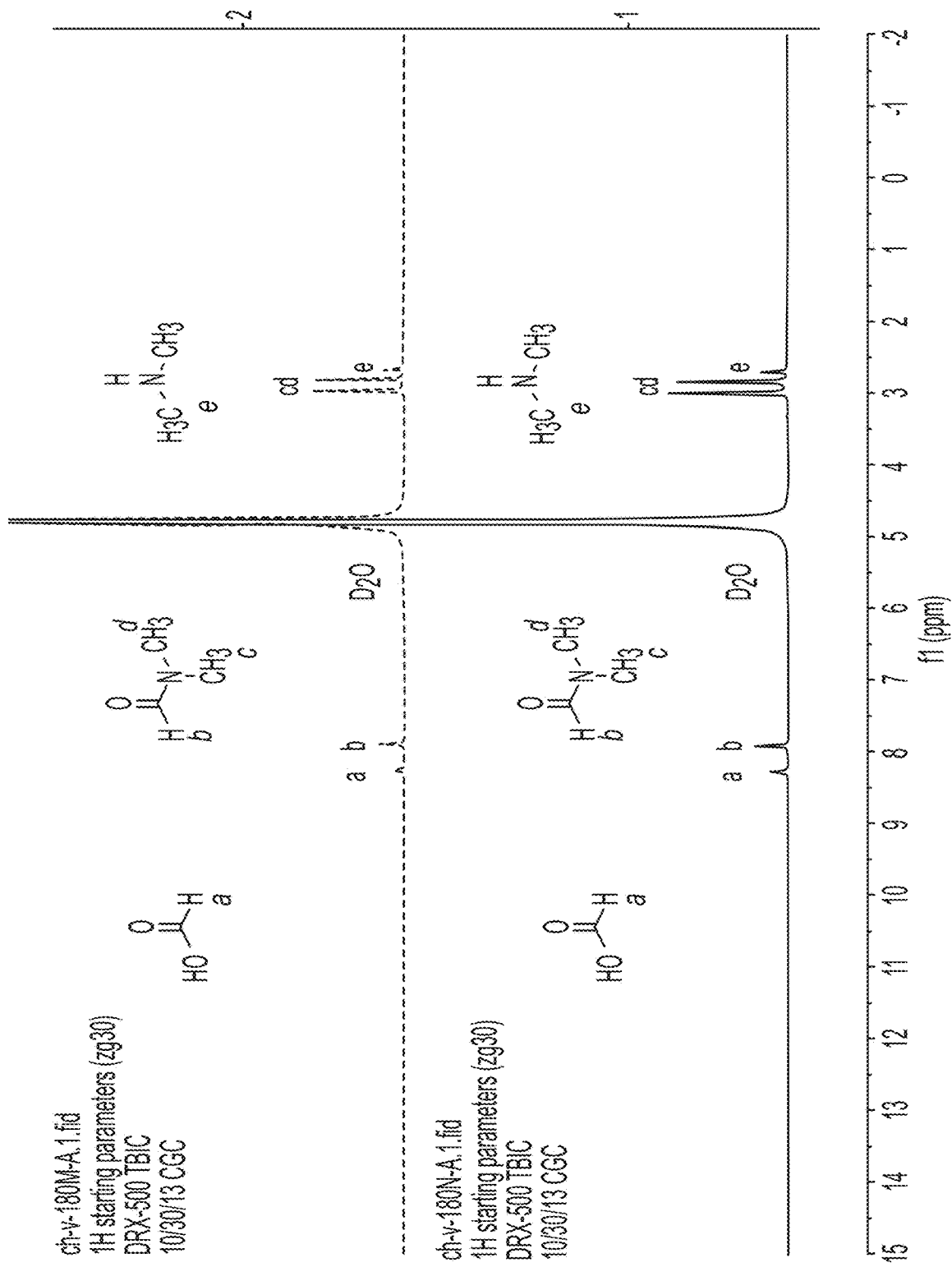
FIG. 83 depicts a ¹H-NMR spectra of MOF-801 in $D_2O$: overlay of before/after heating.
Figure 84:
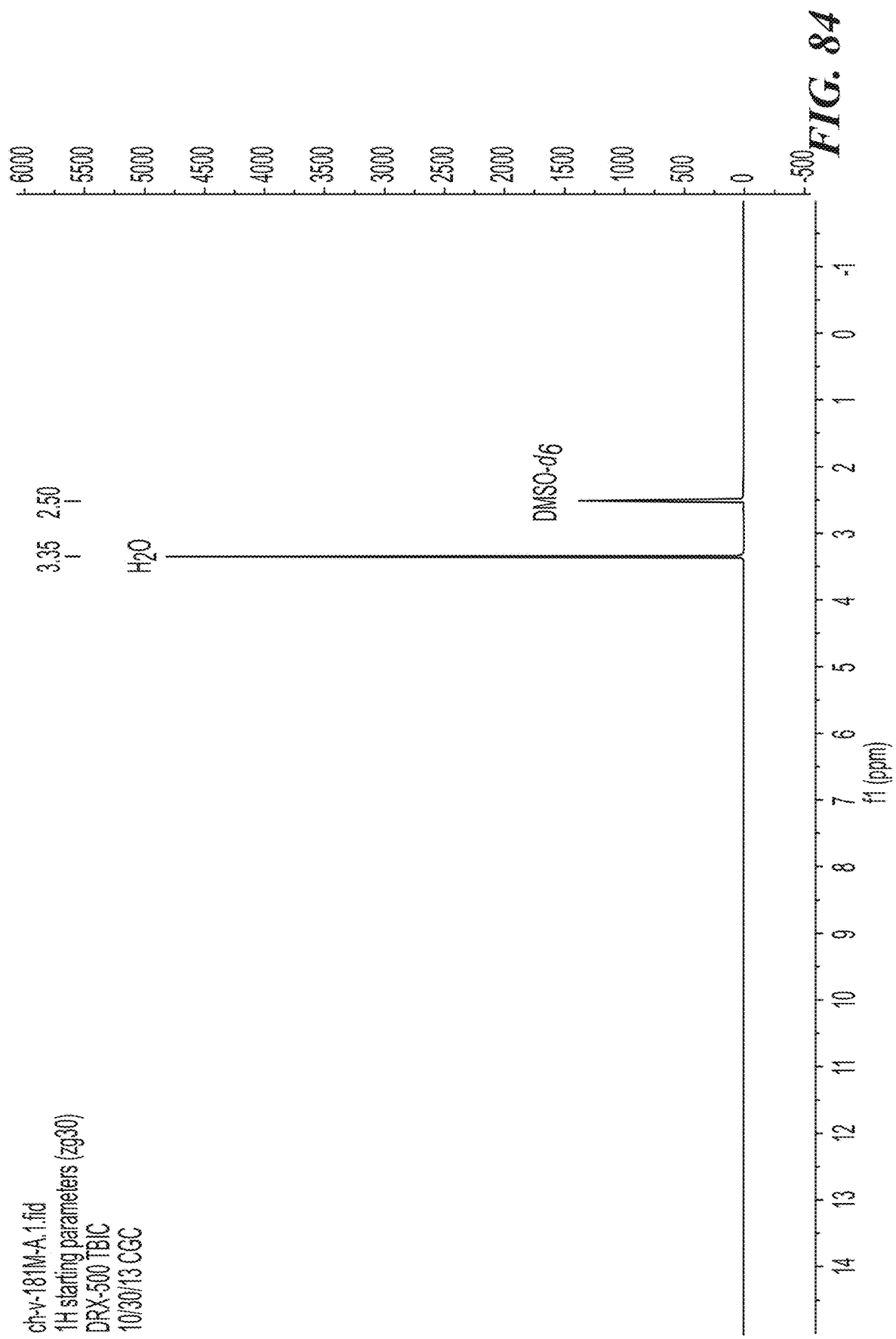
FIG. 84 depicts a ¹H-NMR spectrum of water collected using 0.825 kg of MOF-801/G. Observed signal: water (3.35 ppm).
Figure 85:
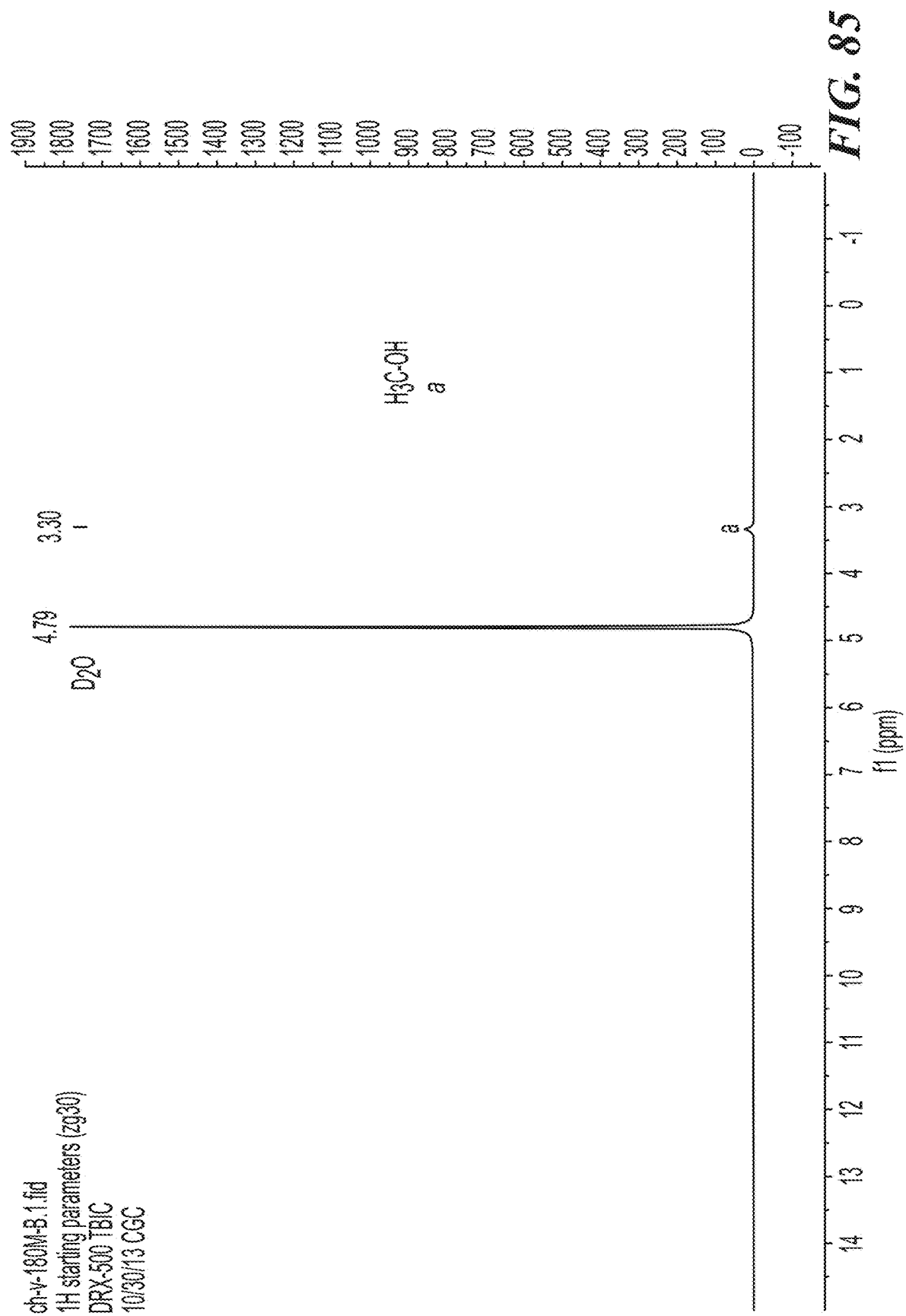
FIG. 85 depicts a ¹H-NMR spectrum of MOF-303 in $D_2O$ before heating. Observed signal: methanol (3.30 ppm).
Figure 86:
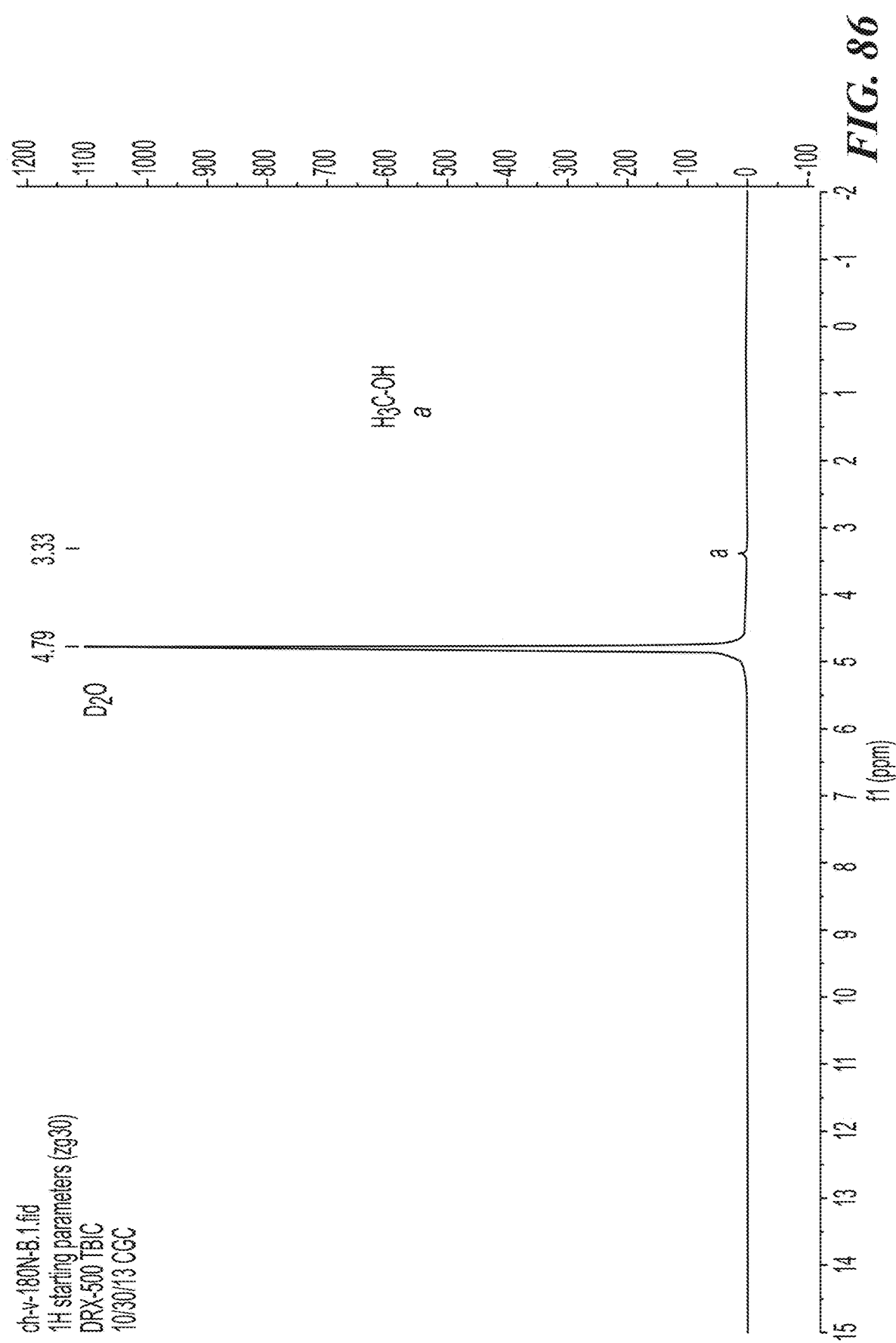
FIG. 86 depicts a ¹H-NMR spectrum of MOF-303 in $D_2O$ after heating. Observed signal: methanol (3.33 ppm).
Figure 87:
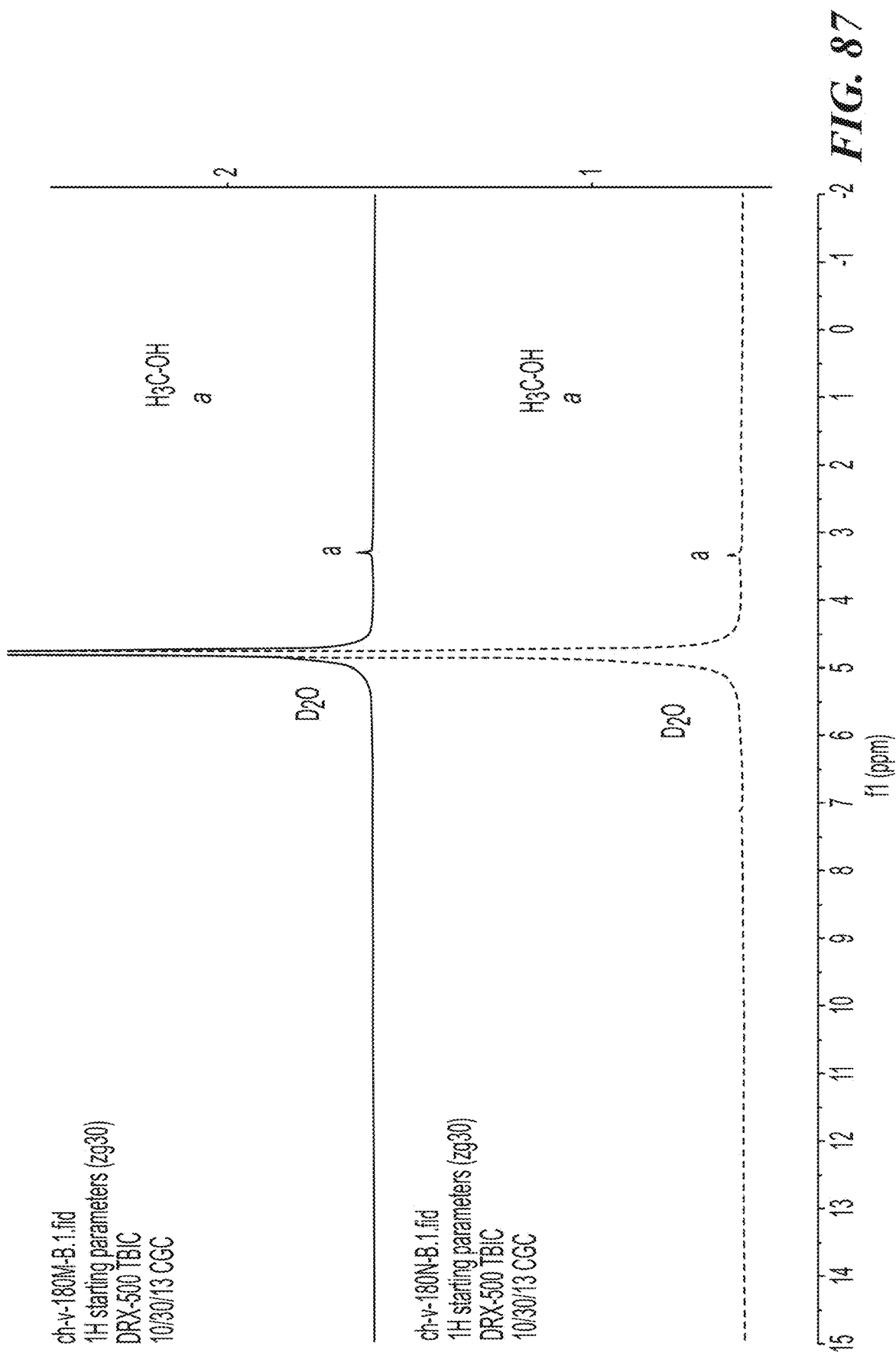
FIG. 87 depicts ¹H-NMR spectra of MOF-303 in $D_2O$: overlay of before/after heating.
Figure 88:
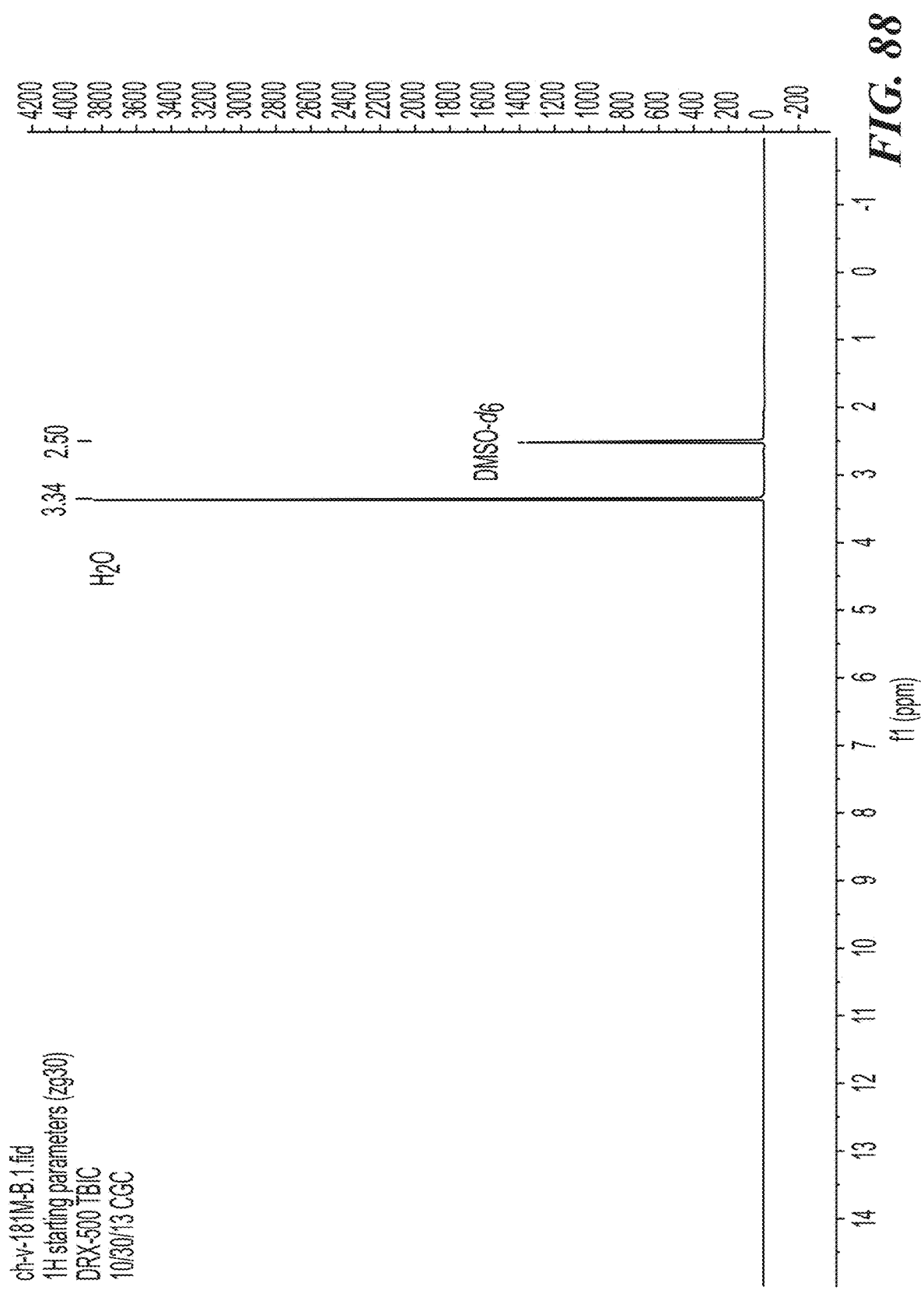
FIG. 88 depicts ¹H-NMR spectrum of water collected using 0.600 kg of MOF-303/G. Observed signal: water (3.34 ppm).
Figure 89:
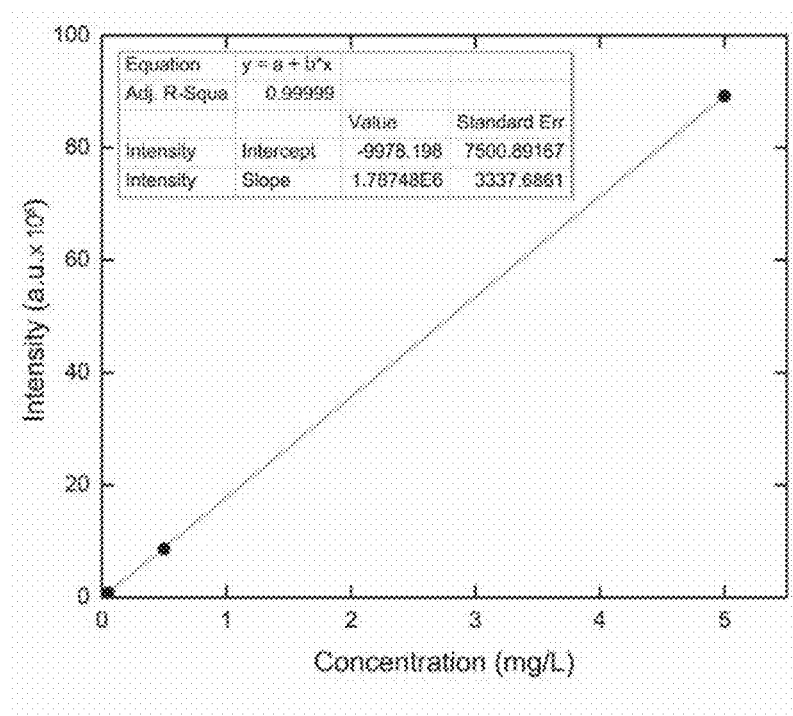
FIG. 89 depicts the calibration curve for zirconium standard solutions. The intensity of zirconium signal for the analyzed sample is 22639.7 a.u.
Figure 90:
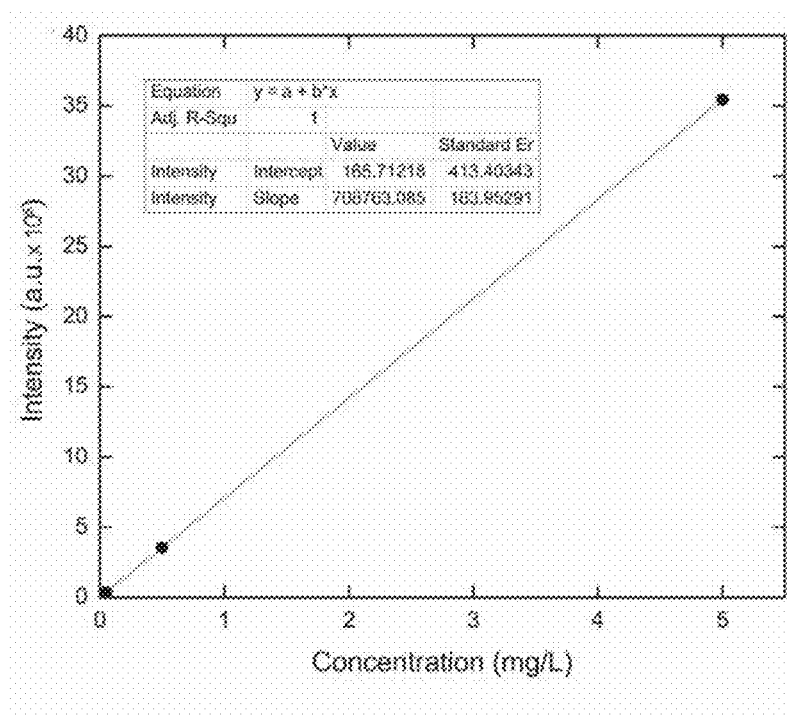
FIG. 90 depicts the calibration curve for aluminum standard solutions. The intensity of aluminum signal for the analyzed sample is 7739.6 a.u.

Section S10. Harvesting Experiments at Scottsdale, Ariz. Under Desert Conditions The description of the setup for the harvesting experiment conducted at Scottsdale, Ariz., United States in late October is described in the main text. FIG. 76-77 show the temperature and relative humidity profile for two runs using 1.65 and 0.825 kg of MOF-801/G, respectively. FIG. 78 describes the exterior insulation used in these experiments.

Section S11. Chemical Analysis of Collected Water Samples and MOF Chemical Stability Activated microcrystalline powder MOF-801 was placed into an NMR tube with $D_2O$. $^1$H-NMR spectra were recorded prior to heating the NMR tube for two hours at 85 C and after heating. Chemical shifts are reported in parts per million (ppm) with reference to the appropriate residual solvent signal from deuterated solvents. $^1$H NMR: $D_2O$ $\delta$: 4.79 ppm, DMSO-$d_6$ $\delta$: 2.50 ppm. Traces of N,N-dimethylformamide, N,N-dimethylamine and formic acid were found to be present in the sample, presumably due to non-ideal activation procedures. After heating the MOF powder in deuterated water, traces of these compounds remained unchanged. No traces of fumaric acid were found leaching out of the MOF, confirming its hydrolytic stability.

4 ml of water were taken out of a 37 ml batch of water collected using 0.825 kg of MOF-801/G under low flux, and placed into a 4 ml vial. The water was evaporated overnight at 100° C. The vial was rinsed with 0.6 ml of DMSO-$d_6$ and an $^1$H-NMR spectrum was recorded. No organic impurities soluble in DMSO were found.

Activated microcrystalline MOF-303 powder was placed into an NMR tube with $D_2O$. $^1$H-NMR spectra were recorded prior to heating the NMR tube for two hours at 85° C. and after heating. Chemical shifts are reported in parts per million (ppm) with reference to appropriate residual solvent signal from the deuterated solvents. $^1$H NMR: $D_2O$ δ: 4.79 ppm, DMSO-$d_6$ δ: 2.50 ppm. Traces of methanol were found to be present in the sample, presumably due to non-ideal activation procedure. After heating the MOF powder in deuterated water, the traces of compounds mentioned above remained. No traces of 3,5-pyrazoledicarboxylic acid were found leaching out of the MOF, confirming its hydrolytic stability.

4 ml of water were taken out of a 105 ml batch of water collected using 0.600 kg of MOF-303/G under high flux, and placed into a 4 ml vial. The water was evaporated overnight at 100° C. The vial was rinsed with 0.6 ml DMSO-$d_6$ and an $^1$H-NMR spectrum was recorded. No organic impurities soluble in DMSO were found.

20 ml of water were taken out of a 65 ml batch of water collected using 1.65 g of MOF-801/G under high flux, and placed into a 45 ml centrifuge tube. The sample was centrifuged for 30 minutes at 12000 rpm. The supernatant was collected and placed into a 20 ml scintillation vial, and the water was evaporated overnight at 100° C. The vial was rinsed with 10 ml of 2% v/v aqueous nitric solution and analyzed with ICP. Next, concentrations of standard zirconium solutions were used for the signal vs. concentration calibration curve: 0, 0.005, 0.05, 0.5, 5 ppm. The amount of zirconium in analyzed sample was found to be 0.009 ppm, indicating that the MOF-801 sample does not decompose during water harvesting.

20 ml of water were taken out of a 105 ml batch of water collected using 0.600 kg of MOF-303/G under high flux, and placed into a 45 ml centrifuge tube. The sample was centrifuged for 30 minutes at 12000 rpm. The supernatant was collected and placed into a 20 ml scintillation vial, and the water was evaporated overnight at 100° C. The vial was rinsed with 10 ml of 2% v/v aqueous nitric solution and analyzed with ICP. Next concentrations of standard aluminum solutions were used for the signal vs. concentration calibration curve: 0, 0.005, 0.05, 0.5, 5 ppm. The amount of aluminum in analyzed sample was found to be 0.005 ppm, indicating that the MOF-303 sample does not decompose during water harvesting.

What is claimed is:

1. An atmospheric moisture harvester system, comprising:
   (a) a moisture sorption unit comprising:
   an insulation compartment containing insulation material, and
   a tray positioned at the top of the moisture sorption unit, above the insulation compartment,
   wherein the tray contains water capture material,
   wherein the water capture material adsorbs moisture from surrounding air during an adsorption phase, and desorbs water vapor during a desorption phase, and
   wherein the bottom surface of the tray in contact with the water capture material is covered with or made from solar absorptive material, and
   wherein the side surfaces of the moisture sorption unit are covered with or made from solar reflective material; and
   (b) a moisture harvesting enclosure with a lid,
   wherein the moisture sorption unit is positioned inside the moisture harvesting enclosure, and wherein space exists between the moisture sorption unit and the moisture harvesting enclosure,
   wherein the moisture harvesting enclosure is transparent,
   wherein the lid, when opened, exposes the water capture material to cold humid surrounding air to adsorb moisture during the adsorption phase, and when closed, heats the water capture material using solar radiation to release water vapor during the desorption phase, and
   wherein the moisture harvesting enclosure is configured to hold the released water vapor upon desorption; and
   (c) a condenser comprising one or more side walls of the moisture harvesting enclosure, or positioned at the bottom of the moisture harvesting enclosure, separated from the moisture sorption unit, and
   wherein the condenser is configured to condense at least a portion of the released water vapor into liquid water during a condensation phase.

2. The atmospheric moisture harvester system of claim 1, wherein the atmospheric moisture harvester system is positioned in the ground, and wherein one or more side walls of the moisture harvesting enclosure are in contact with soil in the ground, and provide surfaces for heat transfer with the soil.

3. The atmospheric moisture harvester system of claim 1, wherein the atmospheric moisture harvester system is positioned on an incline to maximize exposure to direct sunlight.

4. The atmospheric moisture harvester system claim 1, further comprising a water collecting unit configured to collect the liquid water.

5. The atmospheric moisture harvester system of claim 1, further comprising a reflector attached to the lid of the moisture harvesting enclosure, configured to expose only water capture material in the tray of the moisture sorption unit to solar radiation.

6. The atmospheric moisture harvester system of claim 1, wherein the insulation material comprises fiberglass or polystyrene foam, or a combination thereof.

7. The atmospheric moisture harvester system of claim 1, wherein the solar absorptive material is black, and the solar reflective material is white.

8. The atmospheric moisture harvester system of claim 1, wherein the water capture material comprises at least one metal-organic framework.

9. The atmospheric moisture harvester system of claim 1, the moisture harvesting enclosure has one or more side walls made from fiberglass, polystyrene foam, aerogel, soil, cork, rock, slag, or concrete, or any combination thereof.

10. The atmospheric moisture harvester system of claim 1, further comprising at least one solar panel configured to provide energy to the atmospheric moisture harvester system.

11. The atmospheric moisture harvester system of claim 1, further comprising at least one fan configured to cool down the bottom of the moisture harvesting enclosure and speed up condensation.

12. The atmospheric moisture harvester system of claim 1, wherein the atmospheric moisture harvester system is a completely passive system that does not need any energy for water capture and condensation, and only relies on direct sunlight for water release.

13. The atmospheric moisture harvester system of claim 1, wherein the atmospheric moisture harvester system is positioned in the ground, and wherein one or more side walls of the moisture harvesting enclosure are in contact with soil in the ground, and provide surfaces for heat transfer with the soil; and
   further comprising a water collecting unit configured to collect the liquid water;
   further comprising a reflector attached to the lid of the moisture harvesting enclosure;
   configured to expose only water capture material in the tray of the moisture sorption unit to solar radiation;

the insulation material comprises fiberglass or polystyrene foam, or a combination thereof; and the solar absorptive material is black, and the solar reflective material is white.

14. The atmospheric moisture harvester system of claim 1, wherein the atmospheric moisture harvester system is positioned in the ground, and wherein one or more side walls of the moisture harvesting enclosure are in contact with soil in the ground, and provide surfaces for heat transfer with the soil; and further comprising a water collecting unit configured to collect the liquid water;

further comprising a reflector attached to the lid of the moisture harvesting enclosure;

configured to expose only water capture material in the tray of the moisture sorption unit to solar radiation;

the insulation material comprises fiberglass or polystyrene foam, or a combination thereof;

the solar absorptive material is black, and the solar reflective material is white; and the water capture material comprises at least one metal-organic framework.

15. The atmospheric moisture harvester system of claim 1, wherein the atmospheric moisture harvester system is a completely passive system that does not need any energy for water capture and condensation, and only relies on direct sunlight for water release; and further comprising a water collecting unit configured to collect the liquid water;

further comprising a reflector attached to the lid of the moisture harvesting enclosure;

configured to expose only water capture material in the tray of the moisture sorption unit to solar radiation;

the insulation material comprises fiberglass or polystyrene foam, or a combination thereof; and the solar absorptive material is black, and the solar reflective material is white.

16. The atmospheric moisture harvester system of claim 1, wherein the atmospheric moisture harvester system is a completely passive system that does not need any energy for water capture and condensation, and only relies on direct sunlight for water release; and further comprising a water collecting unit configured to collect the liquid water;

further comprising a reflector attached to the lid of the moisture harvesting enclosure;

configured to expose only water capture material in the tray of the moisture sorption unit to solar radiation;

the insulation material comprises fiberglass or polystyrene foam, or a combination thereof;

the solar absorptive material is black, and the solar reflective material is white; and the water capture material comprises at least one metal-organic framework.

17. The atmospheric moisture harvester system of claim 1, further comprising at least one solar panel configured to provide energy to the atmospheric moisture harvester system; and further comprising at least one fan configured to cool down the bottom of the moisture harvesting enclosure and speed up condensation.

18. The atmospheric moisture harvester system of claim 1, further comprising at least one solar panel configured to provide energy to the atmospheric moisture harvester system; and further comprising at least one fan configured to cool down the bottom of the moisture harvesting enclosure and speed up condensation; and further comprising a water collecting unit configured to collect the liquid water;

further comprising a reflector attached to the lid of the moisture harvesting enclosure;

configured to expose only water capture material in the tray of the moisture sorption unit to solar radiation;

the insulation material comprises fiberglass or polystyrene foam, or a combination thereof; and the solar absorptive material is black, and the solar reflective material is white.

19. The atmospheric moisture harvester system of claim 1, further comprising at least one solar panel configured to provide energy to the atmospheric moisture harvester system; and further comprising at least one fan configured to cool down the bottom of the moisture harvesting enclosure and speed up condensation; and further comprising a water collecting unit configured to collect the liquid water;

further comprising a reflector attached to the lid of the moisture harvesting enclosure;

configured to expose only water capture material in the tray of the moisture sorption unit to solar radiation;

the insulation material comprises fiberglass or polystyrene foam, or a combination thereof;

the solar absorptive material is black, and the solar reflective material is white; and the water capture material comprises at least one metal-organic framework.

20. A method of harvesting water from surrounding air using the atmospheric moisture harvester system of claim 1, the method comprising:

opening the lid of the moisture harvesting enclosure during night time, thereby allowing the water capture material to adsorb moisture from surrounding air; and closing the lid of the moisture harvesting enclosure during the following day time, thereby heating the water capture material using solar radiation, releasing water vapor from the heated water capture material, and condensing the released water vapor on the condenser, to produce liquid water.

* * * * *